US011636168B2

(12) United States Patent
Wagner

(10) Patent No.: US 11,636,168 B2
(45) Date of Patent: Apr. 25, 2023

(54) SYSTEM AND METHOD OF ADMINISTERING AND MANAGING EXPERIENTIAL LEARNING OPPORTUNITIES

(71) Applicant: Brianna Wagner, Moreno Valley, CA (US)

(72) Inventor: Brianna Wagner, Moreno Valley, CA (US)

(73) Assignee: The Board of Trustees of the California State University, Long Beach, CA (US)

( * ) Notice: Subject to any disclaimer, the term of this patent is extended or adjusted under 35 U.S.C. 154(b) by 46 days.

(21) Appl. No.: 17/345,400

(22) Filed: Jun. 11, 2021

(65) Prior Publication Data

US 2021/0390154 A1    Dec. 16, 2021

Related U.S. Application Data

(60) Provisional application No. 63/038,904, filed on Jun. 15, 2020.

(51) Int. Cl.
*G06F 16/9538*    (2019.01)
*G06F 21/62*    (2013.01)
(Continued)

(52) U.S. Cl.
CPC ........ *G06F 16/9538* (2019.01); *G06F 16/215* (2019.01); *G06F 16/2358* (2019.01); *G06F 21/6209* (2013.01); *G06Q 50/205* (2013.01)

(58) Field of Classification Search
CPC .............. G06F 16/9538; G06F 16/215; G06F 16/2358; G06F 21/6209; G06Q 50/205
(Continued)

(56) References Cited

U.S. PATENT DOCUMENTS 6,587,668 B1 *   7/2003   Miller ...................... G09B 5/00
                                                            434/350
8,751,231 B1 *   6/2014   Larsen .................... G10L 25/54
                                                            704/250
(Continued)

FOREIGN PATENT DOCUMENTS

CA         3000969 A1 *   6/2014   ............... G09B 5/06
CN         206711158 U  *  12/2017
(Continued)

OTHER PUBLICATIONS

Kannan et al., "Unimate: A Student Information System", 2013 International Conference on Advances in Computing, Communications and Informatics (ICACCI), Aug. 22-25, 2013, IEEE, pp. 1251-1256. (Year: 2013).*

(Continued)

*Primary Examiner* — Phuong Thao Cao
(74) *Attorney, Agent, or Firm* — Andrew D. Fortney; Central California IP Group, P.C.

(57) ABSTRACT

A system, methods and software for administering and managing experiential learning opportunities (ELOs) are disclosed. The system generally includes a database server storing a relational database containing ELO placement data and records and having an interface configured to communicate with a university computer having a student information database thereon, website server, configured to host an ELO website through which users interact with the relational database, and a memory in the website server, storing a content management system (CMS) that comprises modules and a data pool stored in/on storage nodes on the website server. The modules include a forms module for users to enter ELO data and submit ELO requests, ELO proposals, waivers and agreements, and a timelog module to collect and store timelog data and manage the timelog approval process.

20 Claims, 28 Drawing Sheets

(51) Int. Cl.
    *G06Q 50/20*     (2012.01)
    *G06F 16/23*     (2019.01)
    *G06F 16/215*     (2019.01)

(58) Field of Classification Search
    USPC ........................................................ 707/722
    See application file for complete search history.

(56) References Cited

U.S. PATENT DOCUMENTS

| | | | |
|---|---|---|---|
| 10,395,221 B1* | 8/2019 | Price | G06Q 10/20 |
| 10,861,116 B1* | 12/2020 | Onstad | G06Q 30/018 |
| 10,872,519 B2* | 12/2020 | Shaposhnikov | G08B 21/0227 |
| 10,996,933 B2* | 5/2021 | Richardson | H04L 67/306 |
| 2005/0278205 A1* | 12/2005 | Kato | G06Q 10/1053 705/321 |
| 2006/0173726 A1* | 8/2006 | Hall | G06Q 10/0639 705/7.17 |
| 2006/0284838 A1* | 12/2006 | Tsatalos | G06Q 10/10 345/156 |
| 2008/0070206 A1* | 3/2008 | Perilli | G06Q 10/1053 705/321 |
| 2010/0035226 A1* | 2/2010 | Lu | G09B 7/02 434/350 |
| 2010/0217880 A1* | 8/2010 | Venezia | G06Q 10/10 709/229 |
| 2013/0124240 A1* | 5/2013 | Varadarajan | G06Q 50/20 705/7.11 |
| 2014/0095403 A1* | 4/2014 | Hopson | G06Q 10/06 705/325 |
| 2015/0006423 A1* | 1/2015 | Ma | G06Q 10/00 705/327 |
| 2017/0103665 A1* | 4/2017 | Shchegol | G09B 5/14 |
| 2017/0109702 A1* | 4/2017 | Ramnath | G06Q 10/1095 |
| 2017/0265047 A1* | 9/2017 | Royer | H04W 4/12 |
| 2019/0050815 A1* | 2/2019 | Berg | G06F 16/951 |
| 2019/0102853 A1* | 4/2019 | Ratzan | H04L 63/102 |
| 2019/0236180 A1* | 8/2019 | Charles | G06F 3/0617 |
| 2019/0303113 A1* | 10/2019 | Richardson | G06F 9/452 |
| 2021/0110496 A1* | 4/2021 | Kmiec | G06F 16/2315 |
| 2021/0397987 A1* | 12/2021 | Dixit | G09B 5/00 |

FOREIGN PATENT DOCUMENTS

| | | | | |
|---|---|---|---|---|
| CN | 108257055 A | * | 7/2018 | |
| IN | 201821002569 A | * | 7/2019 | |
| KR | 20150000262 A | * | 1/2015 | |
| KR | 20160008834 A | * | 1/2016 | |
| KR | 20180046784 A | * | 5/2018 | ........... G06Q 50/205 |

OTHER PUBLICATIONS

GivePulse Team, "Experiential Learning in Higher Education: What You Need to Know", Oct. 1, 2022, 5 pages, accessed online at <https://learn.givepulse.com/blog/experiential-learning-in-higher-education-what-you-need-to-know-0>. (Year: 2022).*

GradLeaders Career Center, "Streamline Your Entire Co-Op and Internship Process", 1 page, accessed online at <https://www.gradleaders.com/WebFiles/media/GradLeaders-Co-Op-Internship-Overview.pdf> on Mar. 7, 2023. (Year: 2023).*

* cited by examiner

Placement Forms

After you have finished completing all required forms, you must click Finish Placement to complete the process.

*1210*

*1200*

Finish placement

Your placement is not complete until you have filled out all required webforms

*1230*

Start form

*1240*

Program: Service Learning · Course: HCOM 233 (01) Community Engagement · Site: Adoption and Rescue Team · Risk: Accepted

Signup Forms  *1220*

Site Placement Orientation Form — *1222*

Download form — *1224*

This form is required to complete your placement. — *1250*

Site Placement Orientation Form

*Click here to return to the placement process* — 1350

| Start | Safety Orientation | Emergency Contact | Learning Plan | Participation Agreement | Review | Submit |

1312 — 1314 — 1310 — 1316 — 1318

CSU Intern:

Congratulations on securing an internship! Your placement will include the following forms and a copy will be sent to your site supervisor once complete. This form can only be completed once per internship placement. Please ensure all information is accurate prior to submitting.

- Safety Orientation
- Emergency Contact
- Learning Plan
- Participation Agreement

1320

Site Approval

◯ I have met with a site representative and received approval to place in this site. — 1330

[ Begin ] — 1340

HCOM 233 (01): Community Engagement

1510 — View
1512 — Student Forms
1514 — Student Report
1516 — Timetags

Enrolled Students

User Tags
1520

1522 — Apply Filter

Operations — 1538
1534 — Place student(s)

| First Name | Last name | Last login | Forms Completed | Signatures Completed | Placements |
|---|---|---|---|---|---|
| Sally | Student | 03/22/2019 - 1:30pm | No | N/A | • Big Brothers Big Sisters of Point Reyes |
| Susie | Student | 04/11/2019 - 3:00pm | N/A | N/A | No current placements. |
| Ned | Stud | 04/10/2019 - 10:13am | N/A | N/A | No current placements. |

1530
1532
1536 — Place 1500
1502 — Select/Deselect program sites
1504 — Copy program sites from a course 1550 — Limit placements to the sites listed below
1552 — Update 1540 — Program Sites
Highland Elementary School 1542 — Faculty
Flute, Ty 1544 — 
Term: Fall 2019
Program: Service Learning
Max placements per student: 5
1546 — Syllabus  Choose File  No file chosen
Files must be less than 100 MB.
Allowed file types: txt doc docx pdf rtf.

1560 — Upload

Place Sally Student

Program  Service Learning — 1610
Course   HCOM 233 (01): Community Engagement — 1620
Site     Big Brothers Big Sisters of Point Reyes — 1640
Opportunity  No... — 1650
Site staff   Bresaena Jo... — 1660
Add new site staff — 1670
Expected number of hours
45 — 1680

Term  Fall 2019 — 1630
Submit — 1690

FIG. 17

Dashboard — 1700

Dashboard Actions — 1710
- Manage Programs — 1712
- Manage Sites — 1714
- Manage Site Staff/Partners — 1716
- Manage Opportunities — 1718

Site Summary by Program

| Program — 1720 | Active Sites |
|---|---|
| Academic Internships — 1722 | 3 |
| Alternative Break — 1724 | 2 |
| Service Learning — 1726 | 14 |
| Student Activities — 1728 | 3 |

Newest Proposals

| Form | Name of Organization — 1730 | Approval Status |
|---|---|---|
| Poi | Point Reyes Wildlife Refuge | Needs Review |

View all (1) proposals — 1742

Recently updated sites

| Site — 1740 | Date |
|---|---|
| Highland Elementary School | Wednesday, August 21, 2019 - 11:49am |
| Adoption and Rescue Team | Wednesday, April 17, 2019 - 10:17am |
| Lambda Theta Nu Sorority, Inc. | Monday, April 15, 2019 - 1:26pm |
| Lambda Sigma Gamma Sorority, Inc. | Monday, April 15, 2019 - 1:26pm |
| American Cancer Society Fundraising | Monday, April 15, 2019 - 1:23pm |
| Point Reyes Behavioral Health | Thursday, February 28, 2019 - 8:33pm |
| Make-A-Wish Foundation | Thursday, February 28, 2019 - 8:22pm |
| Habitat for Humanity, Point Reyes | Thursday, February 28, 2019 - 8:20pm |
| Big Brothers, Big Sisters of Point Reyes | Thursday, February 28, 2019 - 8:20pm |

— 1742

View list of Parent Sites — 1750

FIG. 18

Edit Program Service Learning  1800

- View  1811
- Edit Program Settings  1812
- Students Opportunities  1813
- Closed  1814
- 1810

Program Name
Center for Community Engagement

Program Type  1830
Service Learning

1820

Student Placement Process (click to open)  1850

- ☐ Students can place with this program
- ☐ Students can identify a course after creating placement
- ☐ Allow Faculty to manage Placements without a course
- ☒ During sign-up, ask students to estimate their service hours
- ☒ During sign-up, ask students to select their site staff
- ☐ Hide Sinyant Button
- ☐ Hide Place Button

1852

Learning Outcomes/Performance Assessments (click to open)  1860

General Info (click to open)  1870

1840

- Sign-up Forms (click to open)  1841
- End of Service Forms (click to open)  1842
- Other Forms (click to open)  1843
- Download Forms (click to open)  1844
- Notification Messages (click to open)  1845
- Time Tracking Settings (click to open)  1846

FIG. 19

Course Summary Report

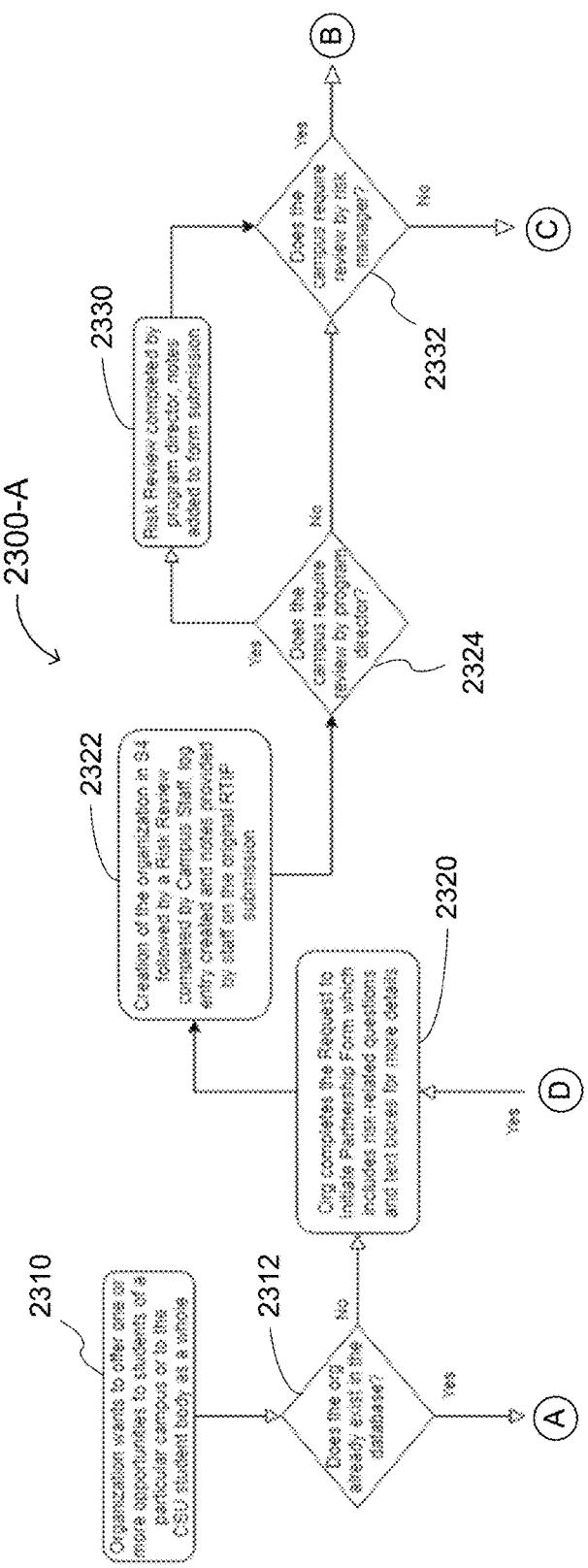

FIG. 26

SYSTEM AND METHOD OF ADMINISTERING AND MANAGING EXPERIENTIAL LEARNING OPPORTUNITIES

RELATED APPLICATION(S)

This application claims priority to U.S. Provisional Pat. Appl. No. 63/038,904, filed Jun. 15, 2020, incorporated herein by reference.

FIELD OF THE INVENTION

The present invention generally relates to the field of administering and managing experiential educational activities. More specifically, embodiments of the present invention pertain to online systems and methods for administering and managing (e.g., tracking and assessing) experiential learning opportunities, such as student internships and externships.

DISCUSSION OF THE BACKGROUND

Extracurricular learning opportunities, such as student internships and externships, offer students a unique and valuable experience to learn aspects of particular educational disciplines or fields of study that are not available in courses or in the classroom. However, many students are not aware of such opportunities. Conversely, many opportunity providers are unaware of the processes for participating in such activities, which can be useful for recruiting employees having certain skills, abilities and vocational inclinations, or for simply obtaining volunteer labor for certain activities that provide some societal benefit, but for which there is typically no expectation of monetary compensation.

Various systems for tracking student progress or achievement are known. However, to date, extracurricular (e.g., off-campus) experiential activities have not been formally or thoroughly monitored, especially background information concerning organizations or institutions that offer internships, ways to communicate student accommodations to such organizations or institutions, in a way that complies with applicable laws and policies, and ways of managing risk on behalf of students, their universities, and the participating internship organizations or institutions if an emergency or other safety event arises.

The California State University system (CSU) is the largest four-year public university system in the United States. CSU includes 23 campuses and eight off-campus centers enrolling 484,300 students, supported by 26,858 faculty and 25,305 staff. Coordinating experiential activities for such a large and extensive university system presents enormous challenges. For example, CSU has used for several years a system to coordinate experiential learning opportunities known as "CalState S4." However, the decentralized nature of the prior system at CSU lacked sufficient uniformity and interconnectivity to enable facile and efficient use of the information in the system across campuses, and in some cases, even on a single campus.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a system, computer-implemented methods and computer-readable media for administering and managing experiential learning opportunities (ELOs). The system generally comprises (1) at least one database server storing a relational database containing ELO placement data and records, (2) at least one website server, configured to host an ELO website through which users interact with the relational database, and (3) a memory in the website server(s), storing a content management system (CMS) that comprises a plurality of modules and a data pool stored in or on storage nodes on the website server(s). The database server includes an interface configured to communicate or exchange data with a university computer having a student information database thereon. The ELO placement data and records comprise student names, academic term(s), student course enrollment, student contact information, student accommodations, university name, university or campus location(s), course names or identifier numbers, course faculty, faculty contact information, names of ELO hosts or sponsors, ELO site locations, ELO placement proposals including identification of risks at corresponding one(s) of the ELO site locations and coverage for such risks, ELO participation agreements between (i) the university or campus and (ii) the ELO hosts or sponsors, at least one agreement form or template for the ELO participation agreements, background information for each of the ELO hosts or sponsors, ELO host or sponsor contact information, program types, safety information, risk analysis notes, student liability waivers, and student timelog data. The users comprise student users, faculty users, one or more ELO administrators, university or campus administrators, and the ELO hosts or sponsors. The data pool includes at least a subset of the ELO placement data, and the plurality of modules generally comprise (a) a forms module accessible by (i) the student users to input the student names, the student contact information, and the student accommodations, and to sign and submit student placement requests and liability waivers, (ii) the ELO administrator(s) to input the risk analysis notes and other risk assessment information, and (iii) the ELO hosts or sponsors to provide and edit their background information, their name and contact information, the ELO site locations, and to complete and submit the ELO placement proposals and the ELO participation agreements, (b) a timelog module accessible by the student users, the ELO hosts or sponsors, and the faculty users to collect and store timelog data and to manage the timelog approval process, and (c) an optional third module accessible by the ELO hosts or sponsors, the ELO administrator(s) and/or the university or campus administrators to monitor student location and time information and to provide emergency notifications to students in an emergency event.

In some embodiments, each of the modules comprises a set of computer-readable instructions that provides functions of the corresponding module to the ELO website, and is turned on by installing the corresponding module in the CMS and turned off by uninstalling the corresponding module from the CMS. In other or further embodiments, the modules may further comprise one or more of a context module, a display suite module, an entity module, a features module, a feeds module, a relation module, a token module, a views module, and a webforms module. For example, the context module may display content and/or blocks based on the user, a program type, and/or a location on the website; the display suite module may be configured for the ELO administrator(s) to customize one or more displays of fields, menus, and/or content on content pages of the ELO website, and/or customize a corresponding edit form of the content; the entity module may be configured for the ELO administrator(s) to modify non-fieldable content to function as a node; the features module may be configured to retain a configuration of the ELO website or a subset of pages of the ELO website; the feeds module may be configured to import university and/or campus data from external sources (e.g., the student information database); the relation module may be configured to combine related entities into a single unique record; the token module may be configured to insert specific data in the relational database into one or more predetermined fields using a corresponding site-wide variable; the views module may be configured to generate lists, tables, and exportable reports to predetermined pages of the ELO website to allow the user to view captured and/or filtered data; and/or the webform module may be configured to create customized or customizable online forms.

In some embodiments, the CMS may further comprise a blocks and menus layer, a user permissions layer, and/or a site theme layer. The blocks and menus layer may be configured to provide output from each of the plurality of modules, place the output in predetermined locations or regions in the website, provide links to all of the pages on the ELO website, and define (i) a plurality of paths for placement of the output in the ELO website and (ii) the content in the output available in each of the paths. The user permissions layer may be configured to determine which of a plurality of different kinds or types of users have permission to access, enter data in, and/or edit each of pages of the website and each of the fields in predetermined ones of the pages of the website. The site theme layer may comprise a computer code or computer language description of the pages of the ELO website, so that the content is placed in the corresponding designated or defined locations on the ELO website.

In other embodiments, the modules may further comprise one or more of a data and document archiving module, a content creation module, a complex content creation module configured to permit access to one or more predetermined forms or fields therein based on one or more attributes of the users, a data importing module, a user notification module, a campus settings and permissions module, a safety module that includes one or more templates for safety information, and a risk module and/or emergency module that generate(s) risk management reports if an emergency or other safety event arises/for managing student safety risk, university and/or campus liability risk, and ELO host/sponsor liability risk. For example, the risk module may be accessible by the university and/or campus administrators and/or one or more university and/or campus risk managers to input one or more separate sets of risk analysis notes, and the other risk assessment information may comprise (1) an approval or disapproval of a corresponding ELO placement proposal based on one or more (sets of) risk analysis notes, and/or (2) a waiver of the risk analysis by the university and/or campus administrators and/or risk manager(s).

In various embodiments, the ELO placement data may further comprise student years, student personal data, course identifier numbers, course credits, mission statements for each of the ELO hosts or sponsors, ELO host or sponsor type, and/or signup form data; the safety information may comprise safety orientation information and/or data; the student timelog data may comprise ELO work or service dates, ELO work or service times, ELO work or service hours, ELO work or service text descriptions, timelog submission status, and/or timelog approval data; the faculty contact information may comprise a faculty telephone number and a faculty email address; and the student contact information may comprise a student telephone number, a student email address, and student emergency contact information.

In other or further embodiments, the modules may further comprise a risk assessment module and/or a reporting module. The risk assessment module may be accessible by the student users, the ELO hosts or sponsors, the ELO administrator(s) and university or campus administrators to collect risk information about the ELO site from the ELO hosts or sponsors, provide the risk information to the ELO administrator(s) and the university or campus administrators and at least some of the risk information to the students, and assess student safety risks, university and/or campus liability risks, and ELO host or sponsor liability risks. The reporting module may be accessible by the faculty, the ELO administrator(s) and the university or campus administrators to generate reports on student placements and ELO host or sponsor participation.

In some embodiments, the users may further include a university and/or campus risk manager, procurement officer, and the ELO host/sponsor may be one or more ELO supervisors at one or more ELO sites.

One computer-implemented method comprises receiving student ELO placement data into a relational database in a database server, providing a plurality of fillable forms from a plurality of modules in a content management system (CMS) on a website server to a plurality of users, storing in the relational database the fillable forms completed by one or more of the users, providing a timelog from a first module to the student users, the ELO hosts or sponsors, and the faculty users to collect and store timelog data and to manage the timelog approval process, and optionally, monitoring student location and time information (e.g., in or from the relational database) and providing emergency notices to students in an emergency event. The database server further comprising an interface configured to communicate or exchange data with a university computer having a student information database thereon. The ELO placement data comprises student names, academic term(s), student course enrollment, student contact information, student special accommodations, university name, university or campus location(s), course names or identifier numbers, course faculty, faculty contact information, names of ELO hosts or sponsors, ELO site locations, background information for each of the ELO hosts or sponsors, ELO host or sponsor contact information, program types, safety information, and risk analysis notes. The website server is configured to host an ELO website through which the users interact with the relational database. The users comprise student users, faculty users, one or more ELO administrators, university or campus administrators, and the ELO hosts or sponsors. The fillable forms include ELO placement proposals (which include identification of risks at the ELO site location[s] and ELO host/sponsor coverage for such risks), ELO participation agreements between (i) the university or campus and (ii) the ELO hosts or sponsors, at least one agreement form or template for the ELO participation agreements, and student liability waivers. Other fillable forms include fields configured to receive the ELO placement data and information identifying and assessing risks at corresponding ELO site locations and coverage for such risks.

The ELO placement data and the completed fillable forms in the relational database are searchable by permitted users. For example, student users may be permitted to search ELO host/sponsor data, ELO site data, and course and faculty information, but not risk assessment information or ELO participation agreement information. In some embodiments, timelog data and information may not be searchable.

In many respects, the method may generally comprise those steps or actions that include one or more functions of the system. Similarly, the computer-readable medium generally comprises a set of instructions (e.g., software) embodying one or more of the inventive concepts disclosed herein.

Thus, in one or more embodiments of the present method, providing the fillable forms comprises executing a set of non-transitory computer-readable instructions in one or more of the modules, the non-transitory computer-readable instructions being adapted to provide function(s) of the corresponding module(s) to the ELO website. In further embodiments, the present method may further comprise installing the corresponding module(s) in the CMS.

In other or further embodiments, the method may further comprise (a) providing output from each of the modules, (b) placing the output in predetermined locations or regions in the website, (c) providing links to all of the pages on the ELO website, (d) defining (i) a plurality of paths for placement of the output in the ELO website and (ii) the content in the output available in each of the paths, (e) granting or denying permission to different users to access, enter data in, and/or edit each of pages of the website and each of the fields in certain or predetermined pages of the website, and/or (f) creating or providing a computer code or computer language description of the pages of the ELO website, so that the content is placed in the corresponding predetermined (e.g., designated or defined) locations or regions on the ELO website.

In other or further embodiments, similar to the system, the modules may comprise one or more of a context module, a display suite module, an entity module, a features module, a feeds module, a relation module, a token module, a views module, and a webform module. Thus, the method may further comprise (a) displaying content and/or blocks based on the user, the program type, and/or the location on the website (e.g., using the context module); (b) customizing one or more displays of fields, menus, and/or content on content pages of the ELO website (e.g., using the display suite module); (c) customizing a corresponding edit form of the content (e.g., using the entity module); (d) modifying non-fieldable content to function as a node (e.g., using the entity module); (e) retaining a configuration of the ELO website or a subset of pages of the ELO website (e.g., using the features module); (f) importing university and/or campus data from external sources into the relational database (e.g., from the student information database, using the feeds module); (g) combining related entities (e.g., one or more ELO hosts or sponsors and a common parent organization) into a single unique record (e.g., using the relation module); (h) inserting specific data in the relational database into one or more predetermined fields using a corresponding site-wide variable (e.g., using the token module); (i) generating lists, tables, and exportable reports to predetermined pages of the ELO website to allow the user to view captured and/or filtered data (e.g., using the views module); and/or (j) creating customized or customizable online forms (e.g., using the webform module).

In other embodiments of the method, the modules further comprise one or more of a data and document archiving module, a content creation module, a complex content creation module configured to permit access to one or more predetermined forms or fields therein based on one or more attributes of the users, a data importing module (e.g., similar to the feeds module described above), a user notification module, a campus settings and permissions module, a safety module that includes one or more templates for safety information, a risk module that generates risk management reports when an emergency or other safety event arises and/or that manages student safety risk, university liability risk, and ELO host or sponsor liability risk, and an emergency notification module accessible by the ELO administrator(s) and optionally the university or campus administrators and/or the ELO hosts or sponsors to monitor student location and time information and to provide emergency notifications to students in an emergency event. When the method includes the emergency notification module, the method may further comprise monitoring the student locations and time information and providing emergency notices to students in the emergency event.

As for the present system, the ELO placement data in the present method may further comprise student personal data, campus program, ELO host or sponsor site location, ELO site supervisor name, the campus term(s) in which the placement will be performed, signup form data, and end of placement form data. Similarly, the safety information may comprise safety orientation information and/or data; the student timelog data may comprise ELO work or service dates, ELO work or service times, ELO work or service hours, ELO work or service text descriptions, timelog submission status, and timelog approval data; the faculty contact information may comprise a faculty name and a faculty email address; the student contact information may comprise a student name and a student email address; and the background information for each of the ELO hosts or sponsors may comprise a telephone number, an email address, and a physical address for each of the ELO host or sponsors.

The present non-transitory computer-readable medium comprises a set of instructions encoded thereon and adapted to administer and manage student experiential learning opportunities (ELOs). When executed by a processing device, the set of instructions is configured to (i) receive student ELO placement data through a secure website on a website server that includes a content management system (CMS) with a plurality of modules therein into a relational database in a database server, (ii) provide a plurality of fillable forms from a plurality of modules in a content management system (CMS) on the website server to a plurality of users, (iii) store in the relational database the fillable forms completed by one or more of the users, (iv) permit predetermined users to search the ELO placement data and the completed fillable forms in the relational database, (v) provide a timelog from a first module to the student users, the ELO hosts or sponsors, and the faculty users to collect and store timelog data, and to manage the timelog approval process, and optionally, (vi) provide emergency notices to students in an emergency event, based on student location and time information in the relational database. The database server further comprises an interface configured to communicate or exchange data with a university computer having a student information database thereon. The ELO placement data comprises student names, academic term(s), student course enrollment, student contact information, student accommodations, university name, university or campus location(s), course names or identifier numbers, course faculty, faculty contact information, names of ELO hosts or sponsors, ELO site locations, background information for each of the ELO hosts or sponsors, ELO host or sponsor contact information, program types, safety information, and risk analysis notes. As for the method, the website server is configured to host an ELO website through which the users interact with the relational database. The users comprise student users, faculty users, one or more ELO administrators, university or campus administrators, and the ELO hosts or sponsors, and may further comprise one or more university or campus risk managers and ELO supervisors and the ELO sites. The fillable forms include ELO placement proposals, ELO participation agreements between (i) the university or campus and (ii) the ELO hosts or sponsors, at least one agreement form or template for the ELO participation agreements, and student liability waivers. Other fillable forms include fields configured to receive the ELO placement data and information identifying risks at corresponding ELO site locations and ELO hosts or sponsor coverage for such risks.

As for the present system and method, the modules in the present computer-readable medium may comprise one or more of a context module, a display suite module, an entity module, a features module, a feeds module, a relation module, a token module, a views module, and a webform module. Thus, as for the system, in the present computer-readable medium, the context module may display content and/or blocks based on the user, a program type, and/or a location on the website; the display suite module may be configured for the ELO administrator(s) to customize one or more displays of fields, menus, and/or content on content pages of the ELO website, and/or customize a corresponding edit form the content; the entity module may be configured for the ELO administrator(s) to modify non-fieldable content to function as a node; the features module may be configured to retain a configuration of the ELO website or a subset of pages of the ELO website; the feeds module may be configured to import university and/or campus data from external sources (e.g., the student information database); the relation module may be configured to combine related entities into a single unique record; the token module may be configured to insert specific data in the relational database into one or more predetermined fields using a corresponding site-wide variable; the views module may be configured to generate lists, tables, and exportable reports to predetermined pages of the ELO website to allow the user to view captured and/or filtered data; and the webform module may be configured to create customized or customizable online forms.

In some embodiments, the set of instructions in the non-transitory computer-readable medium may be further adapted to provide output from each of the plurality of modules, place the output in predetermined locations or regions in the website, provide links to all of the pages on the ELO website, define (i) a plurality of paths for placement of the output in the ELO website and (ii) the content in the output available in each of the paths, grant or deny permission to different ones of the users to access, enter data in, and/or edit each of pages of the website and each of the fields in predetermined ones of the pages of the website, and/or create or provide a computer code or computer language description of the pages of the ELO website, so that the content is placed in the corresponding predetermined locations or regions on the ELO website.

As for the present system and method, the modules in the non-transitory computer-readable medium may further comprise one or more of a data and document archiving module, a content creation module, a complex content creation module configured to permit access to one or more predetermined forms or fields therein based on one or more attributes of the users, a data importing module, a user notification module, a campus settings and permissions module, a safety module that includes one or more templates for safety information, a risk module that generates a risk management report when an emergency or other safety event arises and/or that manages student safety risk, university liability risk, and ELO host or sponsor liability risk, and an emergency module accessible by the ELO administrator(s) and optionally the university or campus administrators and/or the ELO hosts or sponsors to monitor student location and time information and to provide emergency notices to students in an emergency event. When the modules include the emergency notification module, the set of instructions may be further adapted to monitor the student locations and time information and provide emergency notices to students in the emergency event, based on the student location and time information in the relational database.

Also similar to the present system and method(s), in the present computer-readable medium, the EL(i) placement data may further comprise student personal data, campus program, ELO host or sponsor site location, ELO site supervisor name, the campus term(s) in which the placement will be performed, signup form data, and end of placement form data; the safety information may comprise safety orientation information and/or data; the student timelog data may comprise ELO work or service dates, ELO work or service times, ELO work or service hours, ELO work or service text descriptions, timelog submission status, and timelog approval data; the faculty contact information may comprise a faculty name and a faculty email address; the student contact information may comprise a student name and a student email address; and/or the background information for each of the ELO hosts or sponsors may comprise a telephone number, an email address, and a physical address for each of the ELO host or sponsors.

Another aspect of the present invention concerns methods for creating, assessing, and participating in experiential learning opportunities (ELOs). These methods may comprise logging on to a secure website on a website server that includes a content management system (CMS) with a plurality of modules therein; completing an electronic ELO placement form on the website, the ELO placement form describing a corresponding ELO and requirements of the corresponding ELO; accepting the corresponding ELO when offered; completing all requirements of the ELO; and/or obtaining supervisory signatures approving the student's participation in the ELO. Optionally, the ELO placement form may describe risk information relating to or associated with the ELO and/or the ELO site.

The present invention advantageously provides hardware, software and methodologies for creating, assessing risk in, administering and managing ELOs that apply uniform principles across a university or other organization providing educational opportunities, that assesses and optimally minimizes risks to all participants (thereby, e.g., preventing potential harm to students participating in ELOs), that ensures compliance with the university's or organization's policies, and that reduces or minimizes administrators' and ELO supervisors' administrative efforts and time in managing such activities.

These and other advantages of the present invention will become readily apparent from the detailed description of various embodiments below.

BRIEF DESCRIPTION OF THE DRAWINGS

FIG. 12 is a graphic illustration of an exemplary page or display showing a list of required student forms and progress in the completion thereof during the placement process, according to one or more embodiments of the present invention.

FIG. 13 is a graphic illustration of an exemplary page or display showing components of and progress in completing an exemplary student multipage form, according to one or more embodiments of the present invention.

FIG. 15 is a graphic illustration of an exemplary course page or display accessible to faculty users, according to one or more embodiments of the present invention.

FIG. 16 is a graphic illustration of an exemplary student placement page or display accessible to faculty users, according to one or more embodiments of the present invention.

FIG. 17 is a graphic illustration of an exemplary ELO administrative staff dashboard page or display, according to one or more embodiments of the present invention.

FIG. 18 is a graphic illustration of an exemplary page or display for ELO administrative staff to view, edit and modify program settings and manage the placement program, according to one or more embodiments of the present invention.

FIG. 19 is a graphic illustration of an exemplary course summary report page accessible by ELO administrators, according to one or more embodiments of the present invention.

FIGS. 20-22 are graphic illustrations of exemplary contract negotiation and agreement pages, according to an embodiment of the present invention.

FIGS. 23A-C are a flow chart for an exemplary method of managing risk and forming contracts in experiential learning opportunities, according to one or more embodiments of the present invention.

FIGS. 24-27 are graphic illustrations of exemplary pages in the risk management and contract formation, according to an embodiment of the present invention.

DETAILED DESCRIPTION

Figure 1:
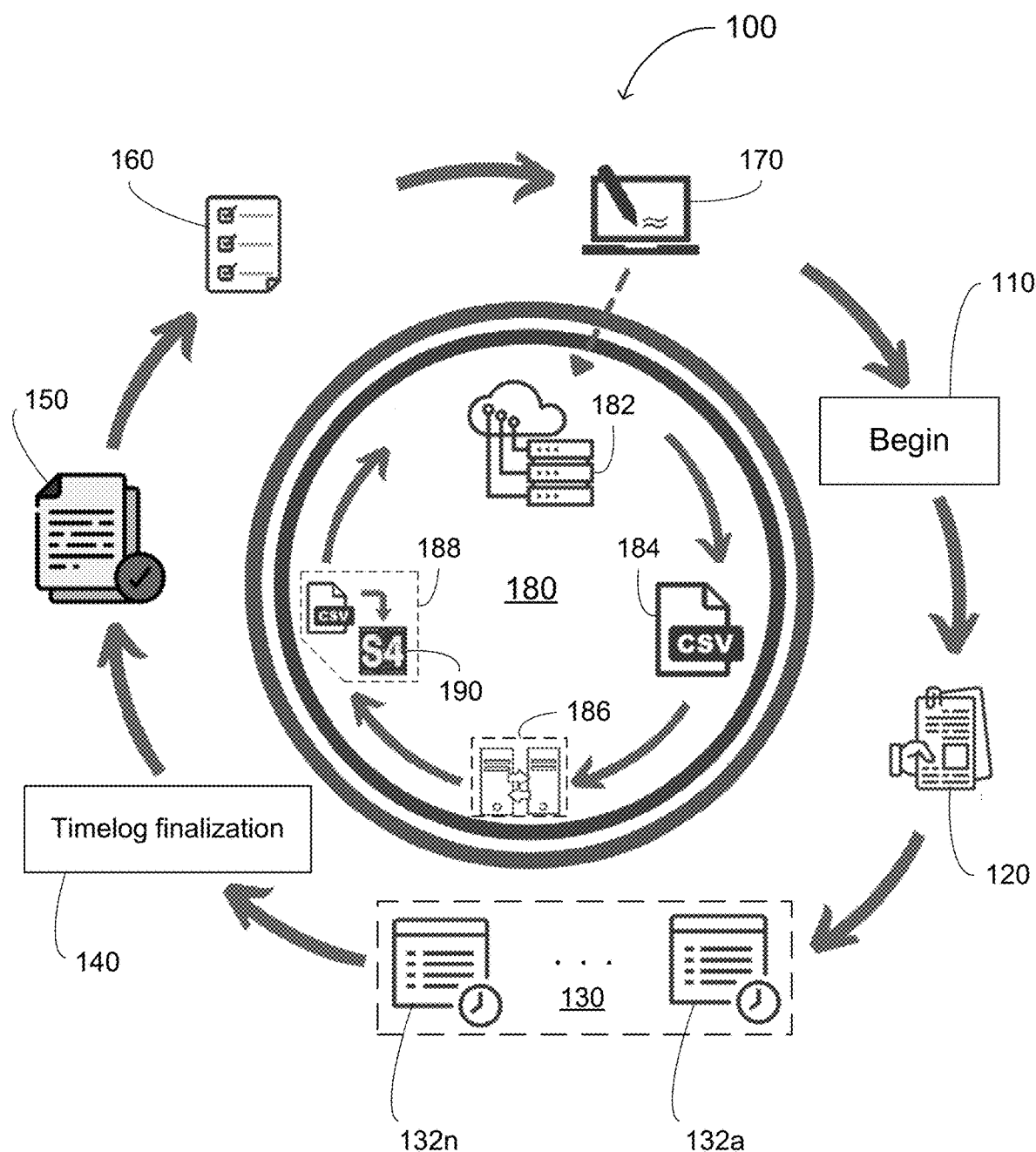
FIG. 1 is a flow diagram showing an exemplary process for administering and managing an exemplary system for matching students with, and placing and monitoring students in, experiential educational activities, according to embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the terms "campus," "university," "organization," and "institution" may be used interchangeably herein, but are generally given their art-recognized meanings. For example, a "university" may have one or more campuses, an "institution" may refer to one or more campuses and/or a university, and an "organization" may be a government, non-profit or business entity other than a campus or a university. Also, for convenience and simplicity, the terms "page," "screen," "window" and "website" may be used interchangeably, as may the terms "link" (verb) and "navigate," the terms "host" and "sponsor," and the terms "connected to," "coupled with," "coupled to," and "in communication with" (each of which includes direct and indirect connections and/or couplings). but these terms are also generally given their art-recognized meanings. In addition, the terms "timelog" and "time log" are interchangeable and have the same meaning.

As used herein, a "program" may refer to an academic program (e.g., nursing, teaching, business administration, another major or specialty, etc.), an ELO program (e.g., service learning [which may include community service], an internship or externship [which may include clinical work], social work, teacher credentialing, etc.), or both. Within the present ELO system and database, a "program" is generally considered to be a taxonomy with a number of associated settings.

As used herein, an "established process" is a defined (and optionally documented) process approved for use at the university or campus by authorized university or campus administration, or which is otherwise known to work for the function or result described (i.e., for which the "established process" is used). Also, a "user" of the ELO system may be a student, a faculty, an ELO administrator, a university or campus administrator, a university or campus risk manager, an ELO host or sponsor (or representative thereof), and/or an ELO supervisor.

The invention, in its various aspects, will be explained in greater detail below with regard to exemplary embodiments.

An Exemplary System for Administering and Managing Experiential Learning Opportunities In one aspect, the present invention relates to a system for administering and managing experiential learning opportunities, comprising a database server storing a relational database containing ELO placement data and records, a website server configured to host an ELO website through which users interact with the relational database, and a memory in the website server, storing a content management system (CMS) that comprises a plurality of modules and a data pool (including at least a subset of the ELO placement data and records) stored in or on storage nodes on the website server. One example of the present system, referred to as "CalState S4," is in use in the California State University system. (The present application describes and claims a number of new features, components and/or capabilities that have not been in use or otherwise disclosed publicly more than one year before the filing date of U.S. Provisional Pat. Appl. No. 63/038,904 [Jun. 15, 2021].) To facilitate an understanding of the system, it may be easier to first understand how the system operates.

FIG. 1 shows an exemplary operational flow diagram 100 according to one or more embodiments of the system. The flow diagram 100 presumes that all forms and templates to be used are already prepared and entered into the system. Parts of or steps in the flow diagram 100 may be explained in greater detail in other drawings.

Although the operations in the flow diagram 100 are carried out substantially continuously and/or in a cycle, and thus the starting point is somewhat arbitrary, one may start at the beginning 110. For purposes of this explanatory example, the beginning 110 may be prior to the beginning of an academic term (e.g., a semester, a quarter or an academic year), but after the end of a preceding academic term. For example, prior to the beginning of the term, courses and program sites for experiential learning opportunities (ELOs) are established by entering course information and program site information (examples of ELO placement data) into a database in the system. The course information may include, e.g., the names of the department offering the course and the faculty member(s) teaching the course, the course number, the course section number, the academic term (e.g., semester or quarter) in which the course is offered, number of units, upper or lower division status, status of the course (e.g., active or cancelled), etc. It is not required, however, that the ELO be associated with a course. Such association is generally required typically when the ELO will be completed over the course of a single academic term.

ELOs generally require designation of a program site. Information about program sites is accessible by students before, during and after creation of the ELO. The information may include, e.g., the name of the organization hosting and/or sponsoring the ELO, the business address of the organization, the address of the ELO site (if different), the name(s) of the person(s) at the organization responsible for and/or supervising the ELO, such person's or persons' contact information (e.g., phone number and email address), organizational priorities (e.g. a focus on animal welfare), preferred and required languages, available opportunities, the state in which the organization is registered or incorporated, the organization's taxpayer ID number, etc. When the ELO is created (e.g., using a framework form such as a Request to Initiate Partnership [RTIP]), much of the program site information may auto-fill or auto-populate. However, the actual ELO site supervisor may differ from the supervisor(s) listed on the framework form(s), and may need to be entered manually (along with such supervisor's contact information). All such information may be automatically saved and stored in the ELO database, so that it can auto-fill or auto-populate on demand or in response to certain prompts or entry/selection of certain information, etc.

After ELO course and program site information is entered, at 120, student placements and signup forms are completed in the system. These activities are completed before or at the start of the academic term. Thus, potential placements (ELOs) and signup forms are also generally made known and available to students and participating organizations prior to 120.

During the academic term, the students track their time and complete additional forms (as needed or required), while the faculty, and program staff (e.g., ELO system administrators) monitor student progress in the system at 130. For example, students may partially or fully complete a series of forms 132a-n, and faculty and/or the off-site ELO supervisor may also complete some information and/or electronically sign the forms 132a-n. An electronic signature from the faculty and/or the ELO supervisor may acknowledge or confirm the accuracy of the information on the form(s) 132a-n. One such form may be a time log, in which the student enters date and time information for time spent at the ELO site, and may identify any particular group(s) helped or served (e.g., people or animals experiencing illness or hardship), the area(s) of focus (e.g., advocacy, public service) of the work performed or service provided, and/or any specific activities performed (which may constitute one or more options from a pre-determined list) at the ELO site on the date during the time spent at the ELO site. The time log may also include a field for entering a description of feedback (e.g., student reflections) regarding their experience, as well as an option to select any learning outcomes (e.g., teacher performance expectations) as identified by ELO program staff and/or academic program staff (e.g., faculty). The forms 132a-n may be completed periodically (e.g., at the beginning and/or end of the term, once per week, once per month, twice per semester, etc.), and each may have a separate deadline. Alternatively, for a given ELO, there may be only one form that the student and faculty, off-site ELO supervisor and/or program staff complete (e.g., by the end of the academic term).

During the last week or weeks of the semester, quarter or academic year, students finalize their time logs and complete end-of-placement forms (if necessary or desired) at 140. The end-of-placement forms may include a summary of the student's achievements during the ELO and an analysis of the ELO and its effectiveness in meeting certain academic objectives, or an optionally confidential evaluation of the student by the ELO supervisor and/or faculty. Generally, the faculty, the off-site ELO supervisor, and optionally, one or more program staff electronically sign (or otherwise acknowledge or confirm the accuracy of the information on) the end-of-placement form. In the case of a non-confidential student evaluation by ELO supervisor or faculty, the student may electronically sign the end-of-placement form.

At the end of the academic term, the time log and other completed forms 150 are partially locked, and students can no longer modify them. If desired, to allow students an additional window for completion of time logs, ELO administrators can provide a grace period of a predetermined number of days (e.g., 5-10) after the end of the term. Additionally, faculty, off-site ELO supervisors, and program staff may have access to the time logs and other completed forms 150 after the end of the term (e.g., for submission of grades or course credit).

After the end of the term and completion of all time logs and other forms 150 by students, faculty and off-site ELO supervisors, the courses in the campus or university student information database that participated in the system during the term are identified by program staff at 160. At this point, all time logs and other forms 150 are typically completely locked, and may not be modified by anyone without program staff authorization (e.g., to override the "locked" status of the time log or form). The campus or university student information database is separate from the database(s) in the system, and usually includes student information (name, student ID number, contact information, etc.), course information (e.g., department, course number, course title, number of credit units), and grade information, among other things. For example, student information databases are commercially available, such as the PEOPLESOFT® relational database/software for human resource management (available from Oracle International Corp., Redwood Shores, Calif.). At 170, program staff may assign attributes to the participating courses associated with the ELOs in the student information database. The cycle 110-120-130-140-150-160-170 then repeats in a cycle (e.g., every semester or every calendar year), although certain steps within the cycle may be repeated (e.g., in an internal loop) more frequently.

Periodically (e.g., nightly, once per week, etc.), relevant data from the student information database is exported at 182 into an information integration loop 180 in the present ELO administration/management system. The data in the student information database may be known as student information system (SIS) data. For example, the query at 182 for the data from the student information database to be exported into the loop 180 uses the attributes identified at 170 to identify the ELO program in the export file. Additional details about this process are included in FIG. 4 and the corresponding discussion thereof.

At 184, the computer (e.g., a server, network computer or workstation) on which the student information database resides converts the data exported from the student information database into a delimited text file, such as a comma-separated values (CSV) file 184. That computer then sends the delimited text file through an interface to a secure website server (e.g., a secure file transfer protocol [SFTP] server, such as an SFTP GATEWAY server available through Amazon Web Services, Seattle, Wash.) that saves uploaded files to the ELO administration/management system thereon at 186. The website server communicates or exchanges data with the computer having a student information database thereon through the interface on the website server. A similar interface may reside on the student information database server or computer. The computer on which the ELO administration/management system resides then imports the delimited text file into the ELO administration/management system at 188, and the loop 182-184-186-188 then repeats in a cycle (e.g., every night or every week).

Figure 2:
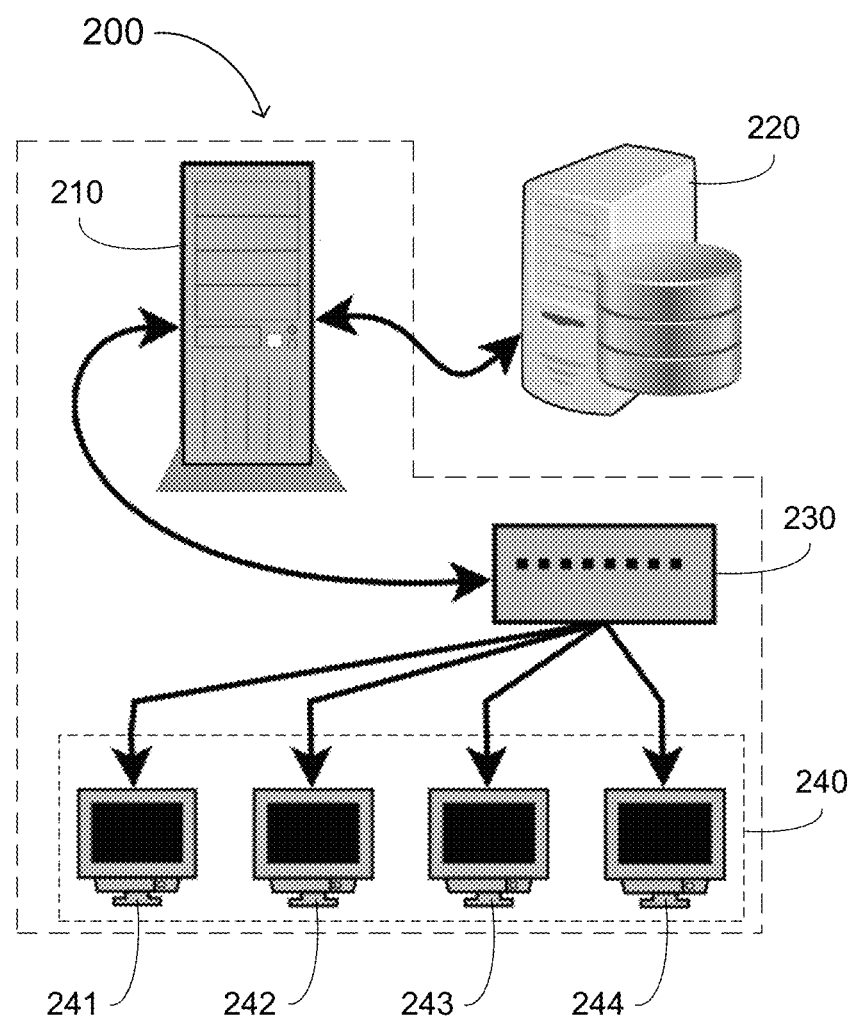
FIG. 2 is a block diagram showing an exemplary system for placing and monitoring students in experiential educational activities, and for administering and managing the system, according to embodiments of the present invention.

FIG. 2 shows an exemplary embodiment of the present ELO system 200, including a web server 210, a router or modem 230, and a plurality of terminals 240. The plurality of terminals 240 includes first through fourth terminals 241-244, but the system 200 is not limited to four terminals. Any positive integer number of terminals may be included. Furthermore, the terminals may be for use by system administrators or system users, although the terminals may be used by essentially anyone.

A website for administering, managing searching, entering data into, retrieving data and documents from, interfacing with the ELO database and the documents (e.g., forms and contracts) therein is on the web server 210. The website may be built using conventional tools. For example, a website for an ELO database may be built using DRUPAL website creation software (available from the Drupal Association, Portland, Oreg.). Site settings, content type data, views, and module dependencies can be retained in the website using the "features" module in DRUPAL software, or the equivalent module in other website creation and/or migration software.

Once created, a theme (either standard/stock or custom) may be installed for the website on the web server 210, along with external or third-party modules and custom modules and feature code. The third-party modules may include context, display suite, entity, features, feeds, relation, tokens, views, and/or webform modules. The context module may display content and/or blocks based on the user role (e.g., ELO host vs. ELO administrator vs. student), location on the website, etc. The display suite module may be used, e.g., to customize the display of fields on content pages and the content's corresponding edit form. The entity module may be used to modify traditionally non-fieldable content to function like a node (e.g., form submission). The features module may retain the website configuration or a default configuration (e.g., for subsequent and/or facile development processes, migration to another platform, installation and set-up at another university or campus, etc.). The feeds module may be used to import campus and/or university data from external sources. The relation module may be used to combine various entities (e.g., parent and subsidiary organizations, different departments within the same organization) into a single unique record (e.g., for ELO placement records). The token module may be used to insert specific data in the database into a field using a corresponding site-wide variable. The views module may be used to generate lists, tables, and exportable reports to certain pages to allow a user to view captured and/or filtered data. The webform module may be used to create customizable online forms. Custom modules and feature code may include modules for archiving data and documents, creating content, creating complex content access permissions based on a user attributes (e.g., role, campus, assigned program[s], etc.), importing data, notifying users of the system that certain events or action items have happened or are due by a certain date, making placements (i.e., placing students in ELOs), creating and filling in placement forms, proposals and reports, identifying and characterizing sites, campus settings and permissions (e.g., "Spaces" in DRUPAL website software), creating time logs, filling in and approving time logs, and identifying and managing users.

In various embodiments, the custom modules and feature code can create and alter content types, including a campus field on all content (except, if desired, any support page[s] and/or other content types that are not campus-specific), set up user roles and permissions, customize taxonomies, and create various custom views and blocks. Content types may include program identity, term (e.g., semester, quarter or academic year), course section (which may optionally refer to, be linked to, or be filtered by the term and program identity selections), the parent organization, the program site (e.g., the location of the ELO, which may refer to, be linked to, or be filtered by the parent site and [possibly multiple] program identity selections), log entries (which may, e.g., capture risk assessment documentation), university-agency agreement(s), general notes (which may refer to, be linked to, be filtered by, or capture certain information about the parent organization, the program site, and optionally, the expiration date), site staff information (which may refer to, be linked to, or be filtered by the program site, and optionally, the user selections), the ELO name (which may refer to, be linked to, or be filtered by the program site and program selections), a support page, one or more custom forms, and a framework or proposal form. As used herein, a "custom" form is a flexible or configurable form, and may be program-specific or campus-level (depending on the intended use), and a "framework" form is a form in which the user provides information and/or data that is then placed or inserted into existing fields (e.g., pre-populated or auto-filled in other forms, reports, etc.) within the ELO system. Custom forms include placement forms, university-agency agreements (contracts), and most other forms in the ELO system. When the custom form is a placement form or related to a placement form, then a program must be selected on the form's "edit" page. In general, selection of more than one program is disallowed. In such cases, when the same custom form is to be used for placements in different programs, the form must be cloned or copied for each program. Examples of framework forms include RTIP and update forms. Taxonomies may include focus areas, focus population(s), organization types, campus name/identity, languages (e.g., required for the ELO or in which the student is fluent), time log activities, and site status. Custom views and blocks may include one or more lists (e.g., of sites, courses, users, etc.), one or more reports, one or more customized buttons (e.g., to indicate a particular selection from a list on a report or form), and one or more forms, as described herein.

The data, information and other content in the website and related database is included in and organized and controlled by a content management system or structure (CMS), which may have a directional flow (e.g., from bottom to top) to control operations and functions within the CMS. At the base of the CMS is a collection of nodes, or the data pool. Before anything can be displayed on the website, it must be input as data, which may be stored in/on storage nodes.

The next layer is a module layer that contains standard, third-party and/or custom modules. Modules are functional plugins that may be part of the CMS core. Alternatively, a module may be a set of software program files that extends site features and/or adds functionality to the website, which can be turned on by installing the module, and turned off by uninstalling the module. Modules allow customizing the data items (fields) on various node types, setting up transactions, and programmatically sorting and displaying content and/or custom output(s), controlled by defined filters.

Figure 3:
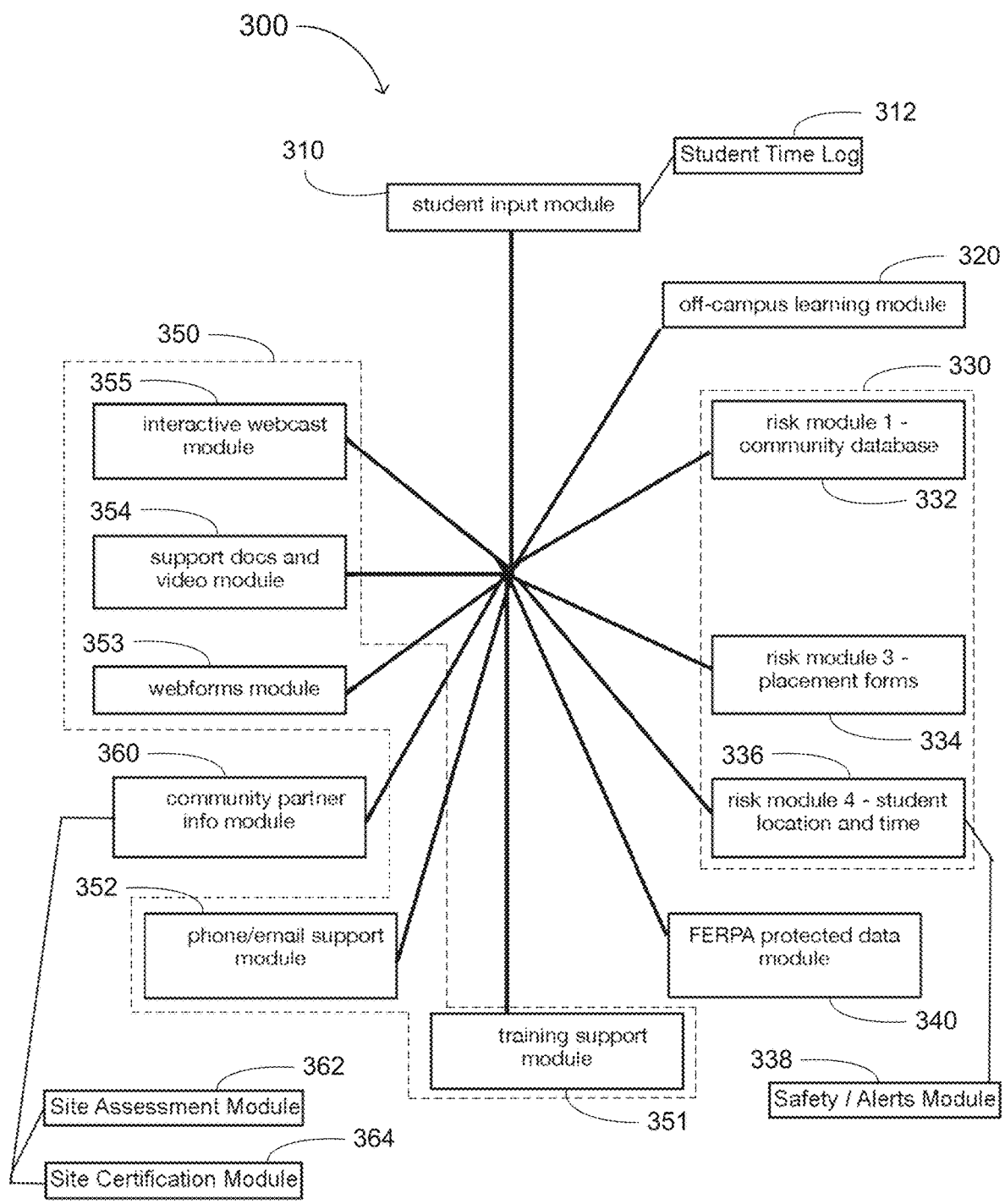
FIG. 3 is a block diagram illustrating exemplary modules that may be available in the present system, according to one or more embodiments of the present invention.

Referring now to FIG. 3, an exemplary module layer 300 illustrates exemplary modules that may be available in the present system, according to embodiments of the present invention. For example, the module layer 300 may include a student input module 310 that receives information about the student and the ELO (e.g., an internship or off-campus opportunity) that the student is seeking or about which the student is interested. In a typical configuration of the ELO system, the student input module 310 is not present, and such information is collected through the corresponding forms module (e.g., placement forms module 334). A student time log module 312 may be associated with or accessed through the student input module 310. An off-campus learning module 320 may gather information about off-campus institutions and organizations that host and/or sponsor internships and ELOs for students.

The module layer 300 may include a plurality of different risk assessment modules 330. A first risk assessment module 332 may include and/or provide risk information about the institutions and organizations in the community. A second risk assessment module 334 contains placement form data. The module 334 may be part of a larger forms module (not shown in FIG. 3). A third risk assessment module 336 contains student location data and time data. A fourth risk assessment module 338 (which may be accessed through, or be a component or part of, the third risk assessment module 336) contains information and/or data for safety notices and alerts, including certain templates for safety information (e.g., to be distributed to all or a subgroup of ELO participants), emergency notices (e.g., in case of an earthquake or other emergency event), etc.

A FERPA protected data module 340 includes and manages data that is compliant with requirements under the Family Educational Rights and Privacy Act (FERPA). The protected data module 340 controls public access to educational information and records. The module may restrict access to a student's educational information to only those persons authorized under FERPA.

The module layer 300 may include a plurality of support modules 350, include an optional training module 351, an optional phone/email support module 352, a web forms module 353, a supporting documentation and video module 354, and an optional interactive webcast module 355. An alternative to the phone/email support module 352 is a ticket service (e.g., Jira Service management, available from Atlassian, Sydney, Australia) with an embedded link (e.g., to a support page on the website) that allows the user to submit a ticket for support via the support page. An alternative to the interactive webcast module 355 may include one or more integrated links on the support page(s) to recorded presentations uploaded to a publicly-accessible website (e.g., YouTube). The forms in the web forms module 353 may be custom forms or standard (e.g., template) forms. Some of the (web) forms in the web forms module 353 are explained in greater detail elsewhere herein, and are a key feature of the invention.

A community partner (e.g., ELO sponsor or host) information module 360 is also included in the module layer 300. Additional modules, such as a site assessment module 362 and a site certification module 364, may be associated with or accessed through the community partner information module 360. In some embodiments, a background check may be conducted as part of the or community partner information module 360 by including a list of items that the ELO host/sponsor organization is required to complete. The list of items may be identified at both the parent and program site level (for example, in an ELO site description page). A background check is one option for items on such a list, along with driver's license check, tuberculosis or other vaccine/infectious disease test, etc. Additional details regarding the content of each module 310-366 may be found elsewhere in this application.

In further embodiments, the module layer 300 in the present ELO system may include an archive module, one or more content modules, an import module (e.g., defining the data to be imported and/or the sources of such data), a notifications module, a placement module, a placement forms module (which may be a submodule of or function in the webforms module 353 or the placement module 334), a proposals module (which may be a submodule of or function in the webforms module 353 or a larger forms module), a reports module, a settings and permissions module, and a users module (e.g., defining different types of users and their permissions, or alternatively, automatically associating particular users with their user type).

In a preferred embodiment, the system includes a signature module that provides for the signing of contracts and placement forms. The signature module may also store signed documents in a document retention storage device (e.g., memory) upon acceptance of a final signature, and display contracts and placement forms for signature in a format that allows an electronic signature and date to be added to the contract or placement form. Herein, an electronic signature (or e-signature) is a mark made by an individual to show intent on the part of the individual to sign a document. An e-signature may be used for agreements deemed by the university (or a campus thereof) to be low risk. For example, e-signature information for the CalState S4 system may be found on the Internet at docs.google.com/document/d/1-sZVkqcA4yHIVMUCvRH4UIRAxanQniydmpWb8HjHEGE, the relevant portions of which are incorporated herein by reference. Alternatively, a digital signature similar to the DOCUSIGN® e-signature app and process (available from DocuSign Inc., San Francisco, (A), may be used.

In various embodiments, the present ELO system includes submodules or functions that permit user options for generating certain forms. For example, ELO administrators may be permitted to generate preplacement, placement, registration and sign-up forms. In some embodiments, faculty may be permitted to modify (and, in some cases, generate) preplacement, placement, registration and sign-up forms. Campus/university administrators, ELO site supervisors/hosts, students, and public users may be prohibited from generating such forms, although some or all such users may have permission to view such forms, and students generally have permission to add data (e.g., enter data into predefined fields) in such forms. Similarly, faculty and ELO administrators may be permitted to generate evaluation forms, and other users may be prohibited from generating evaluation forms, although students have permission to view and add data to such forms. Campus/university administrators may have permission to view evaluation forms, but not to edit or add data to such forms, and public users may be prohibited from accessing such forms entirely. Such user options may also include permissions for students, faculty and ELO site supervisors to complete (e.g., add data to) a time log for a placement, but not campus/university administrators or public users (the latter of which may be prohibited from accessing time logs entirely, except when the ELO site supervisor is approving anonymously, and has been provided a secure link to do so). In general, ELO administrators may be granted permission to view, generate, edit, and add data to any form, except those that are completed and locked from being further modified.

Similar permissions may be designated in a user options module or function for assigning and tracking faculty, tracking students, track student progress during placement, enabling supervisory persons to review time logs, sending bulk emails to students, confirming completion of required paperwork (e.g., forms), reviewing/signing documents (which may be based on program/course requirements), managing course settings, identifying specific program sites, adding course syllabuses, assigning ELO program administrator(s), managing ELO program (e.g., database and/or website) settings, assisting campus or university departments and/or faculty in managing placements, checking the safety and/or status of one or more students at a site in an area affected by natural or human-caused event, maintaining a current list of ELO program and/or parent sites and related contact and site information, and building and maintaining various forms (e.g., contracts, requests to initiate a partnership, site assessments, student forms, etc.).

In various embodiments, the present ELO system may include one or more modules to collect data from one or more campuses, create reports (e.g., from such collected data), perform data comparisons and/or analysis, and analyze systemwide reports of such data. The reports module may include an option for sending a particular report to a specified population of report recipients. In other or further embodiments, the report can include an alert message, such as a safety alert (e.g., a campus-wide or site-specific safety alert), a weather alert, a public safety alert such as a fire alert or earthquake alert, and so forth. It is well within the skills and abilities of those skilled in the art to create such modules, content, forms and reports, once the content, forms, reports and module functions (e.g., data import source[s], timing and content; data storage, field definitions, permissions, etc.) are specified.

The next layer in the CMS is a blocks and menus layer. Blocks provide the output from a module, or can be created for a custom display. Thereafter, the module output or custom display can be placed in various locations (regions) in the website template (theme) or layout. Blocks can be configured to output the information/display in various ways, as well as only showing certain information or displays only on certain defined pages, or only for certain defined users. Menus are navigators, which define the content available in each defined menu path (e.g., relative URL). Menus are a core element that provide links to all of the pages on the website.

The next layer in the CMS is a user permissions layer. Settings in the user permissions layer are configured to determine which users (among a plurality of different kinds or types, such as student users, faculty users, ELO administrators, campus/university administration users, public users, etc.) have permission to access, enter data in, and/or edit which pages of the website and which fields in specific pages of the website. Permissions are defined for various roles, and in turn, the different kinds or types of users are assigned to these roles to grant them the defined permissions.

The top layer in the CMS is the site theme layer (the "skin"). This layer comprises predominantly HTML, JavaScript and CSS code/language descriptions for building webpages, so that CMS-generated content can go in the appropriate spots. In some embodiments, some Twig variables may be intermixed with the code/language descriptions. Alternatively, the site theme layer may be described in Java, Python, SQL, or other programming language suitable for website descriptions and/or definitions. Also included with each site theme is a set of functions that can be used to override standard functions in the other modules in order to provide relatively complete control over how the modules generate their markup (e.g., output) at output time. Templates can also be assigned on-the-fly (e.g., on demand), depending on particular user permissions.

Referring back to FIG. 2, each instance of the system 200 (e.g., for an organization, such as a university, a government agency, or a corporation that wishes to administer and manage external learning opportunities) or space within a larger system (e.g., for an individual campus, or a department within a larger corporation) should be configured separately. For example, each campus or university may create its own taxonomy terms, set up a single sign-on (SSO) mechanism for accessing the system, create an account for uploading student information and/or data from the web server 210 to a student information database server 220, and review data feeds to import student information and/or data from the external student information database 220 to the web server 210. The website on the website server 210 also includes an ELO database for storing and accessing imported student information and/or data, as well as campus/university data, academic data, ELO data, and various forms (such as time logs and contracts) that must be constructed and/or populated prior to use.

Taxonomy terms that may be unique to a campus or university may include domain information, a campus name or identifier, etc. An SSO mechanism may be integrated into the system 200 using, for example, SHIBBOLETH open source secure identity, authentication software, avail able from the InCommon Federation (www.incommon.org/software/shibboleth). A campus, university or organizational identity and/or access management team (e.g., within an information technology [IT] group) or other individual or group that creates, maintains, and/or supports authentication and related services may set up the SSO mechanism in the system 200, even though they may not be part of the team or group that administers or manages the system 200.

When creating the account for uploading student information/data from the web server 210 to the database server 220, at least one new directory and a plurality of subdirectories may be created on the web server 210. In addition, secure socket shell (SSH) keys or other public-key cryptographic credentials may be generated, added to the system 200, synchronized and deployed using a keymaster module configured to manage the deployment and redeployment of keys, certificates, and other security tokens across nodes, services, applications, and users in the system 200.

Thereafter, campus, university and/or organization data is imported into the system 200 (e.g., from the database server 220). For example, similarly to the process 170→182 shown in FIG. 1, the data may be imported by one-time site imports and/or feeds and/or by manual entering of parent organization and/or program site data. The campus, university and/or organization data may then be repeatedly or "continuously" imported into the system 200 by periodic (e.g., nightly or weekly) data imports, as shown in the process 170→182 in FIG. 1. For example, in such periodic data imports, the keymaster module may allow campus information technology (IT) administrators to add one or more additional SSH keys to campus/university/organization settings, or replace one or more existing SSH keys in such settings. In addition, such periodic data imports may upload various files such as academic term or schedule data, academic course data, user data (e.g., identities, student numbers, contact information, etc.), enrollment data, and faculty assignment data, among other kinds of information that may be collected externally, but which is useful in the system 200.

Administrators and users (e.g., on campus, at the university, with the organization, etc.) may use the system 200 by accessing the website and database on the website server 210 using one of the terminals 240. Each of the individual terminals 241-244 generally includes a monitor for displaying the website and other information, a processor for processing data and information, one or more human interface devices, such as a keyboard, mouse, touchpad, etc., a transmitter for transmitting data and information from the terminal to the website server 210 (e.g., through the router or modem 230), and a receiver for receiving data and information from the website server 210 (e.g., through the router or modem 230).

Various users may include ELO site users, students and other ELO participants/beneficiaries, faculty and other on-campus, university or organization supervisors, and campus/university administration and organization management. ELO site users, for example, may include ELO site staff, community and non-profit organization partners and other ELO sponsors and supervisors. Other ELO participants and beneficiaries may include, for example, organizational employees and volunteers. On-campus and university supervisors may include, for example, supervisors for clinics, laboratories, libraries, etc. Campus/university administration may include, for example, Dean's Office personnel, Chancellor's Office personnel, etc.

ELO site users may have or obtain an SSO or other secure login for accessing the website and parts of the database, but such users may also interact with the website and database anonymously (e.g., as a "Guest"). Such users who have an SSO or other secure login may be designated as "Site Manager" or similar designation, and have access to and authorization to directly edit program/ELO site data (e.g., site description, address information, etc.) in the database. In some embodiments, when a document is to be reviewed, negotiated and/or signed, ELO site users may receive an email or other electronic notification with a link to a website for viewing, signing, and optionally editing documents. For example, such documents may include contracts, placement forms, notices, terms and conditions of use, etc. ELO site users may also receive an email or other electronic notification with a link to a website to view and approve (and optionally edit) a time log.

Students may also access the ELO website using an SSO or other secure login. A typical first step for a student on the ELO website is to sign up or apply for a placement. Including completion of any required forms, the average total time to sign up or apply for a placement is 20 minutes. The placement may be for completion of an academic course, in which case the corresponding student data may already be in the ELO system from SIS nightly imports (see 170→182 in FIG. 1). More details regarding student use of the ELO system can be found in FIGS. 6 and 7 and the corresponding descriptions thereof herein.

Alternatively, the placement may be for completion of an academic program, such as completion of degree requirements or specialized program requirements. If the student is not added to the ELO system based on a course enrollment (e.g., through importation of SIS data into the ELO system), then an ELO administrator or staff member may add the student to the ELO system (e.g., manually, using the ELO website). In some embodiments, automatic addition of the student to the ELO system as a result of course enrollment is allowed only for defined or predetermined academic programs that allow and/or require ELO placements. Such automatic addition may be activated by setting the appropriate and/or corresponding option in the program settings of the ELO website and/or system. When signing up for an ELO placement as part of the academic program, the student may follow a typical or default sign-up process, and the student data may be provided by one or more imports of the corresponding SIS data.

In another alternative, the placement may be as part of an intake process (e.g., into a program that offers optional practical training opportunities, or that has an intake process outside of the standard enrollment process, such as a performing arts program that has an audition requirement for entry). The student completes all necessary intake forms in the ELO system, then follows the standard or default sign-up process for placement in the ELO. In these intake and placement forms, some student data may be provided by the student. More details regarding student ELO sign-up as part of an intake process can be found in FIG. 8 and the corresponding description thereof herein.

When on/in the ELO website, students may complete forms, such as placement forms, signup forms, evaluation forms, time logs, and others. In some embodiments, time logs are not considered forms within the ELO system or database, but rather, are a collection of entities (e.g., a "field collection" in DRUPAL software). Each "entity" is a time entry by the student for the time spent at the ELO site or otherwise in service or at work for the ELO. All such entities or time entries are stored in or attached to a single location (e.g., a node or other piece of contextualized content). In some embodiments, time logs are not in a webform format, but rather, are a custom webpage designed without use of a preconfigured template or other pre-designed page or object code description. In such embodiments, the time logs may not be searchable or accessible through a search. In further embodiments, student users may receive permission to edit only time logs, and no (other) forms or webpages after submission.

In other or further embodiments, the ELO system and website also include preplacement and/or registration forms for students to complete. Such forms may require the student to provide some student data, such as student identification (ID) number, previous schooling/experience (e.g., for programs that require pre-requisite experience or education), and preferred area(s) of focus (e.g., in a clinical program such as social work, area of focus options may include school counseling, patient advocacy, family services, etc.), although more or less information may be required in various embodiments.

In a working example (the CalState S4 ELO system), more than 900 forms, at least some of which include or were created using templates, have been created that meet the needs of a wide variety of experiential learning programs. As of the end of the 2019-20 academic year, information for more than 20,000 education, industry, government and non-profit partners of the CSU are in the CalState S4 ELO system database. The searchable CalState S4 database allows students, agencies and campus staff to find and access all education, industry, government and nonprofit organization data therein. The CalState S4 system's extensive form database and module(s) saves ELO system users significant time. For example, the electronic signature process for ELO service-learning agreements (e.g., contracts) reduced the amount of time spent negotiating and signing contracts and handling procurement issues. It is estimated that about 83% less time is required to process and finalize university-agency agreements for the majority of CSU campuses that are using the CalState S4 ELO system.

After registration, sign-up, and placement, students can also complete a time log related to the ELO placement on/in the ELO website. More details regarding student completion of time logs can be found in FIG. 10 and the corresponding description thereof herein. In the CalState S4 ELO system (the working example), time tracking using time logs enables students to digitally log hours via their placement record and provides partners a secure, digital, accessible process and platform to review and approve student performance records, such as hours worked and activities completed.

Faculty users may access the ELO website using a secure (e.g., SSO) login to manage students (e.g., in courses having an ELO component and/or to whom a faculty role in an ELO has been assigned) and manage academic course settings, among other tasks. When managing students, the faculty user may place one or more students in an ELO, track student progress during and after placement, and acknowledge/sign-off on completion of ELO requirements. For example, tracking student progress may comprise reviewing one or more time logs, sending a bulk email or one or more specific emails to students regarding ELO requirements and/or performance, etc. Acknowledging or signing off on completion of ELO requirements may comprise confirming completion of paperwork, reviewing and/or electronically signing documents as needed, etc. The need to electronically sign a document is based on program/course requirements. Faculty users may manage course settings by, for example, identifying specific program sites, adding course syllabus information, adding resource materials for review by others, etc. Using permission settings, an ELO system administrator may block or prohibit other users from managing course settings, and block or prohibit users other than faculty and ELO site supervisors from managing students.

Campus/university administration users may use the ELO website by accessing the site using a secure (e.g., SSO) login when available. In some embodiments, if a secure ELO login is unavailable, such administration users may login using a campus- or university-authenticated login (e.g., for the student information system). Campus/university administration users are typically authorized or permitted to view forms and reports, collect data from one or more campuses and create reports thereon, and collect, compare and analyze data in the ELO system and database. To protect student privacy, such data may have all student identification information removed therefrom prior to viewing. For example, when collecting, comparing and analyzing data, the administration user may view system-wide reports of campus data.

The present ELO system includes a number of unique features, such as the interface with the student information system (which may use some or all of the same data transfer protocol, data formats, authentication/permission systems, etc.), the single sign-on (SSO) mechanism, risk notification and evaluation documentation, equal opportunity forms and documents (e.g., notices), use of anonymous signatures, extensive (and in some cases exclusive) use of contract templates and electronic signing (such as with an RTIP), site assessment forms, the ability to track service learning (SL) and other programs (which may be co-curricular) that require extracurricular, clinical, or hands-on learning, and the use of web-accessible electronic evaluation forms and templates. Anonymous signatures enable certain ELO website users (e.g., ELO supervisors and hosts/sponsors) to access designated pages of the ELO website (e.g., the placement page, various forms that require a signature, time logs) anonymously using a custom link (with a secure token), thereby avoiding a need to have a login account (e.g., username and password combination), which simplifies the experience for such users and enables a smooth and easy transfer of responsibility for such users (e.g., by forwarding the link to another person newly assigned an ELO responsibility at the ELO host/sponsor organization).

The present ELO system enjoys significant advantages over previous ELO management and administration systems from some or all of these new features. For example, the ELO website and database are compliant with equal opportunity laws and regulations, enable facile compliance with university policies, and can track where students are participating in off-campus academic learning experiences for easily notifying the student (and, in some embodiments, their emergency contacts) of the occurrence of potential risks associated with nearby natural or man-made dangerous or catastrophic events.

The present ELO system enables flexible reporting, which allows campuses to assess the impact of ELOs on student success (see, e.g., U.S. patent application Ser. No. 16/599,114, filed Oct. 10, 2019 and entitled "Method and System for Distribution of University Student Degree Completion Data," the relevant portions of which are incorporated herein by reference). The present ELO system facilitates tracking information relating to student placement in ELOs, while also enabling others to learn about community partners, thereby creating efficiencies and fostering successful collaborations. The present ELO system includes an ability to download reports that allows for relatively extensive analysis (e.g., of the ELO system and its benefits to students, ELO sites, and the campus and university) to occur at the campus and system level.

Figure 4:
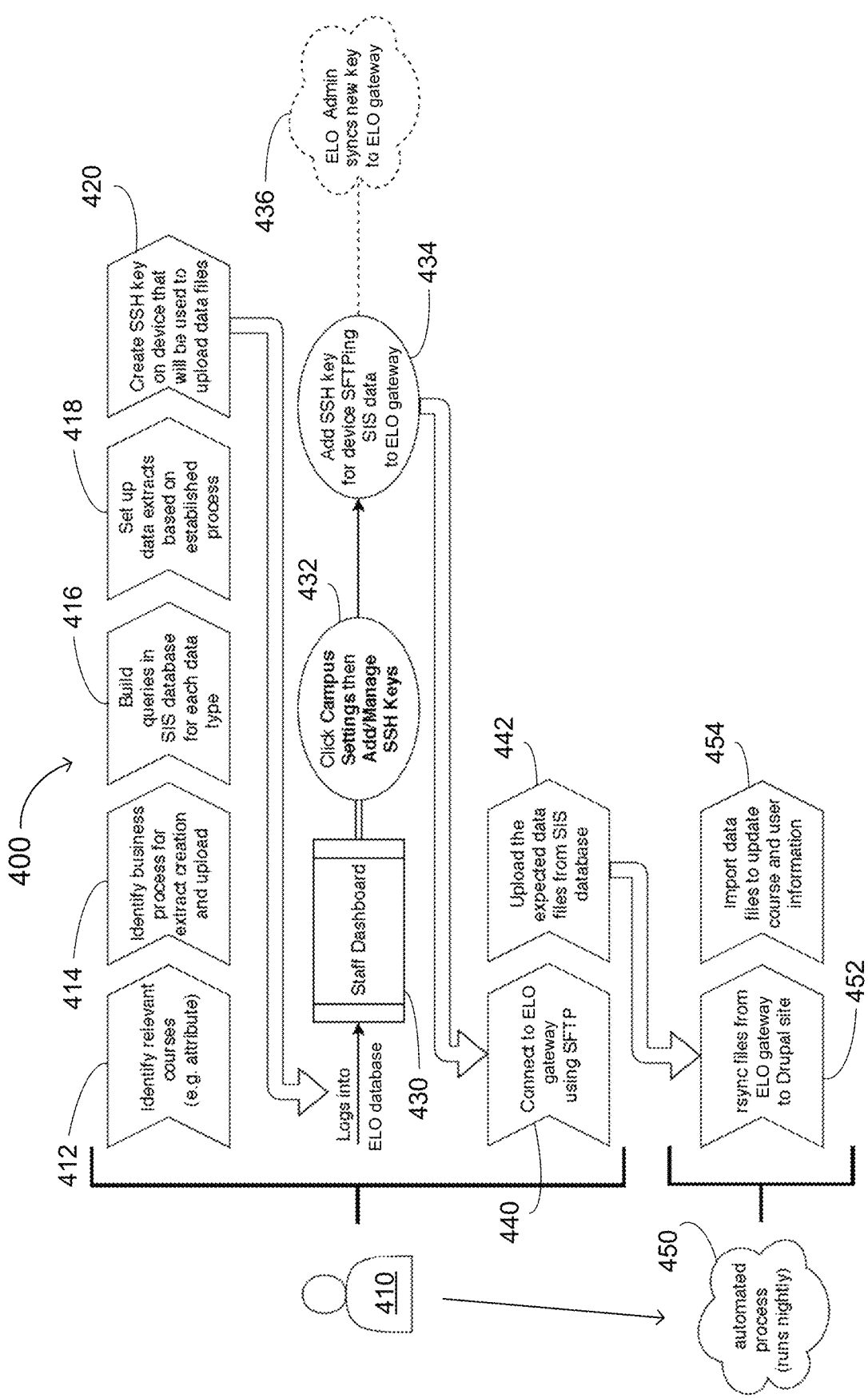
FIG. 4 is a flow diagram showing an exemplary process for campus staff to populate the present system with data, according to one or more embodiments of the present invention.
Figure 5:
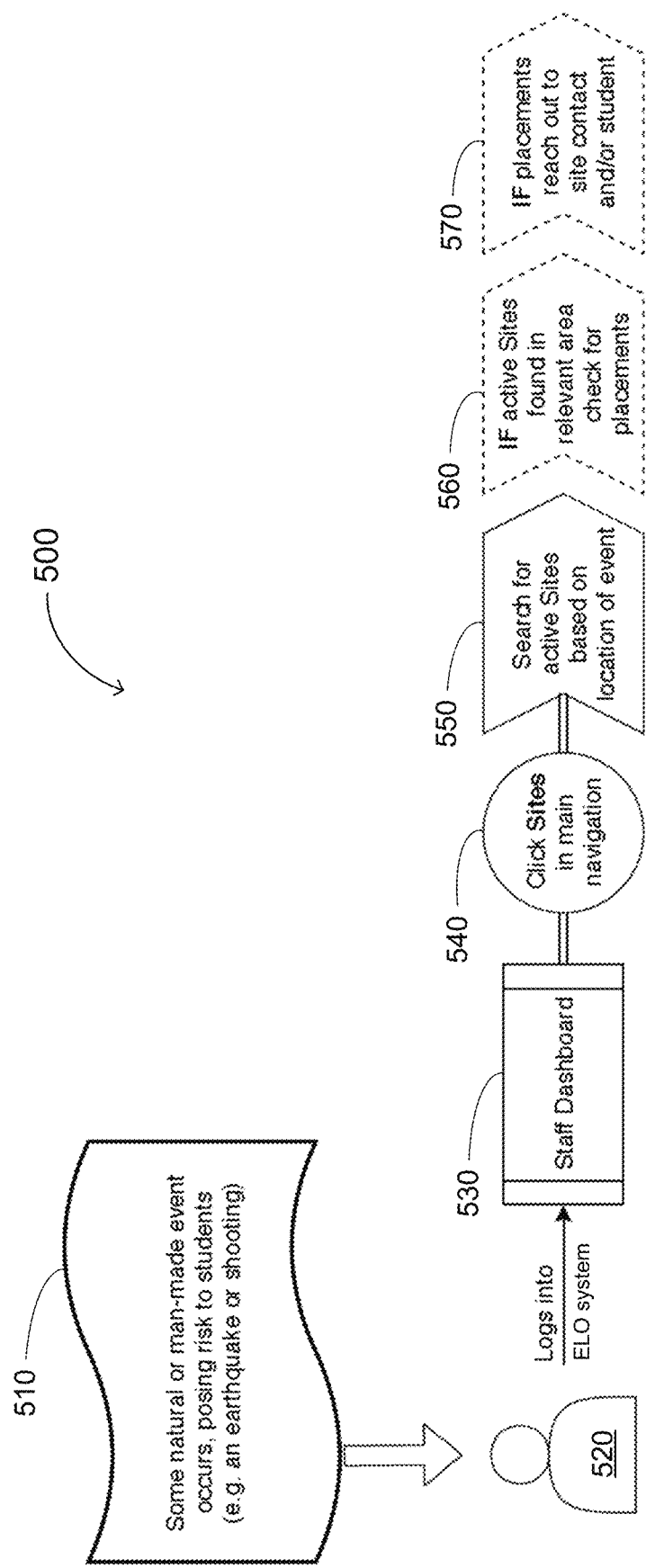
FIG. 5 is a flow diagram showing an exemplary event interruption process, according to one or more embodiments of the present invention.

Exemplary Methods of Administering and Managing Experiential Learning Opportunities In another aspect, the present invention concerns one or more computer-implemented methods of administering and managing ELOs and assessing and managing risks therein that includes receiving ELO placement data into a relational database in a database server, providing fillable forms from modules in a content management system (CMS) on a website server to users, storing the fillable forms completed by one or more of the users in the relational database, providing a timelog from a first module to student users, the ELO hosts or sponsors, and faculty to collect and store timelog data and to manage the timelog approval process, monitoring student location and time information (e.g., in or from the relational database), and providing emergency notices to students in an emergency event such as a natural disaster (e.g., a hurricane, snowstorm, earthquake, flood, etc.) or man-made hazard (e.g., a chemical leak, an explosion or terrorist attack, etc.). FIGS. 4-5 show exemplary processes for administering or managing certain aspects of the present ELO system.

FIG. 4 is a flow diagram for an exemplary process 400 by which one or more ELO program administrators may populate the ELO system with data, in accordance with embodiments of the present invention. The process 400 assumes that the ELO system, including the website and CMS, has been created and is active and available. The process 400 is generally available only to ELO program administrators (i.e., ELO administrative users) and campus/university administrators, and not to other users (e.g., students, faculty, or ELO site sponsors or supervisors).

The process 400 may start prior to the beginning of an academic semester, quarter or year with a campus or university administration staff member 410 identifying relevant courses for an ELO from all courses offered by the campus, university or institution at 412, for example by assigning an attribute to such courses. In other examples (e.g., when the organization managing the ELO system is a business, company, non-profit organization or government agency or bureau), the administration staff member 410 may be a member of the organization administration or management. Alternatively or in addition, the campus administration staff 410 may request assistance from faculty and/or campus or university administration to identify courses for ELOs.

At about the same time or shortly thereafter, the campus or university administration staff 410 may identify a business process for extract creation and uploading to the ELO system at 414. The extract creation and uploading process at 414 is an internal process for a university or campus for creating the query to the SIS database (e.g., for the student information to be exported) and defining the configurations for that query (e.g., how they identify the appropriate program for a course) and the export of the SIS data (e.g., as a CSV file) to the ELO gateway server, as well as to determining or identifying who is responsible for the process. The extract creation and uploading process is not required every cycle of the data population process 400, but it is conducted during or prior to the very first cycle so that it is in place and can be easily updated or transferred to a new ELO administrator as needed.

The campus administration staff 410 builds queries in the student information system (SIS) database for each data type in the ELO system at 416. The data types may be defined in one or more modules in the CMS (e.g., a settings module, a data classification module, a data importation module, etc.), or they can be identified by one or more bits in the data format that identify the data type. Queries may be built at any time prior to importing data from the SIS database. Typically, after building the queries at 416, the campus administration staff 410 sets up data extracts at 418 based on an established process (e.g., within the campus IT community, or otherwise known to work for extracting data from the SIS database). For example, the established process may assign a particular program to a course, then run the data against a set of if/else statements to manipulate the data extract (such as "if course has attribute NTRN and course number is higher than 300, assign Social Work' to the program field, else if course has attribute NTRN, assign 'Internships' to the program field").

The campus administration staff 410 also creates a security key (e.g., an SSH key) at 420 on the device that uploads data files (e.g., the device hosting the SIS system/database). Ideally, the steps 414, 416, 418 and 420 are conducted only once, and perhaps revisited or updated when a new program is added, updates to the SIS database are made, or if the course identification at 412 changes. For example, the extract creation and uploading process at 414 may build the extract with a single attribute to identify the proper program, instead of relatively complicated if/else statements such as those used in the established process at 418.

After all of 412-420 are substantially complete, the campus/university administration staff 410 logs into the ELO system (e.g., using a campus/university administration staff interface, or "staff dashboard," 430). The campus/university administration staff 410 may access a main menu to select "campus settings" at 432, and then select "Add/Manage SSH Keys." Alternatively, if a security system that does not use SSH keys is employed, another public-key cryptographic credentials may be generated at 420. At 434, the campus administration staff 410 adds the SSH key or other public-key cryptographic credential for the device importing SIS data to the ELO system gateway (e.g., website and/or database server). At 436, the campus/university administration staff 410 synchronizes a new security key to the ELO system gateway.

At 440, the campus/university administration staff 410 connects the device hosting the SIS system/database to the ELO system gateway (e.g., using a secure file transfer process [SFTP]). Afterwards, at 442, the expected data files are uploaded from the SIS database to the ELO system gateway. At this point, the same data transfer operation can be automated (e.g., run on a schedule, such as every night at a fixed or predetermined time) at 450. At 452, the files uploaded onto the ELO system gateway from the SIS system are transferred or copied (e.g., using the rsync file copying tool) to the CMS site in the ELO system. The final step at 454 is to import the downloaded and copied/transferred data files into the ELO database to update course and user information. However, an ELO administrator or person working under the direction of the ELO administrator may copy or transfer the downloaded files at 452 and import the files at 454.

In further embodiments, the ELO administrator accesses the ELO website using a secure sign-in (e.g., SSO) to manage various ELO program settings, assist various departments and/or faculty in managing placements, check on the safety and/or status of one or more students at an ELO site in an area affected by a natural or human-caused event (explained in greater detail with regard to FIG. 5), maintain a current list of ELO sites (and optionally, parent organizations) and related contact and site information, and build and maintain forms (e.g. contracts, requests to initiate a partnership, site assessments, student forms, etc.). In some embodiments, other users may not have permission to perform such tasks or functions.

FIG. 5 is a flow diagram showing an exemplary event interruption process 500, according to one or more embodiments of the present invention. The process 500 illustrates how a natural or man-made event 510 may occur, posing a risk to students. The process 500 is generally available only to ELO administrative users, and not to other users (e.g., students, faculty, campus/university administrators, or ELO site sponsors or supervisors, although in some embodiments, faculty may have limited access to view event interruption information, for example within the context of their courses, but not to search at 550 or as otherwise described herein).

The process 500 allows an ELO administrator 520 to login to the ELO system (e.g., through the ELO website) and access the ELO administrator interface (or "staff dashboard") 530. The staff dashboards 430 and 530 in each of FIGS. 4-5 are substantially the same. The ELO administrator 520 can use the main navigation menu on the interface 530 to select a "Sites" page at 540. On the "Sites" page, the ELO administrator 520 can search for active ELO sites at risk at 550, based on the location of the event and the proximity of the ELO site to the event. If one or more active ELO sites are found in the relevant area, the ELO administrator 520 can check for student placements at those sites at 560. This allows the ELO administrator 520 to contact the students (who may be at the ELO site or scheduled to be at the site in the near future) at 570 by sending a notice to the ELO site contact and/or student. The notice may be sent by email, text message, voice (telephone, voice-over-Internet-protocol [VOIP, which may be enabled in the ELO system]), etc.

At times, campus or university electronic security personnel (who may be part of the campus or university information technology group, and/or who may be known as a "keymaster") may access the ELO website or system using a secure sign-in (e.g., SSO) to assign one or more security keys, manage passwords for the ELO website, etc. The exact functions and tasks to be performed by campus or university electronic security personnel may vary by institution, but generally this position assists with technical aspects of website and database security at the campus level. For example, the campus or university electronic security personnel may troubleshoot or assist troubleshooting SIS data imports (e.g., when data importation operations are not working) and other technical issues that might arise.

Exemplary Methods of Using the Exemplary System to Participate in Experiential Learning Opportunities In another aspect, the present invention concerns methods of creating, assessing, and/or participating in ELOs that may include logging on to a secure website on a website server that includes a content management system (CMS) with a plurality of modules therein, completing an electronic ELO placement form on the website, accepting the ELO when offered, completing requirements of the ELO, and obtaining supervisory signatures approving the student's participation in the ELO. The ELO placement form describes the ELO and includes information such as the ELO site, requirements of the ELO, and potential risks associated with the ELO. FIGS. 6-9 show exemplary processes for students to use the present ELO system, including to sign-up for or request an ELO placement and to add data to and/or complete a time log. The processes exemplified in FIGS. 6-9 are generally available to student users and ELO administrative users, although faculty, ELO site sponsors or supervisors, and campus/university administrators can view and have limited permissions to edit documents created or included in these processes. The processes exemplified in FIGS. 6-9 are generally not available to public users.

Figure 6:
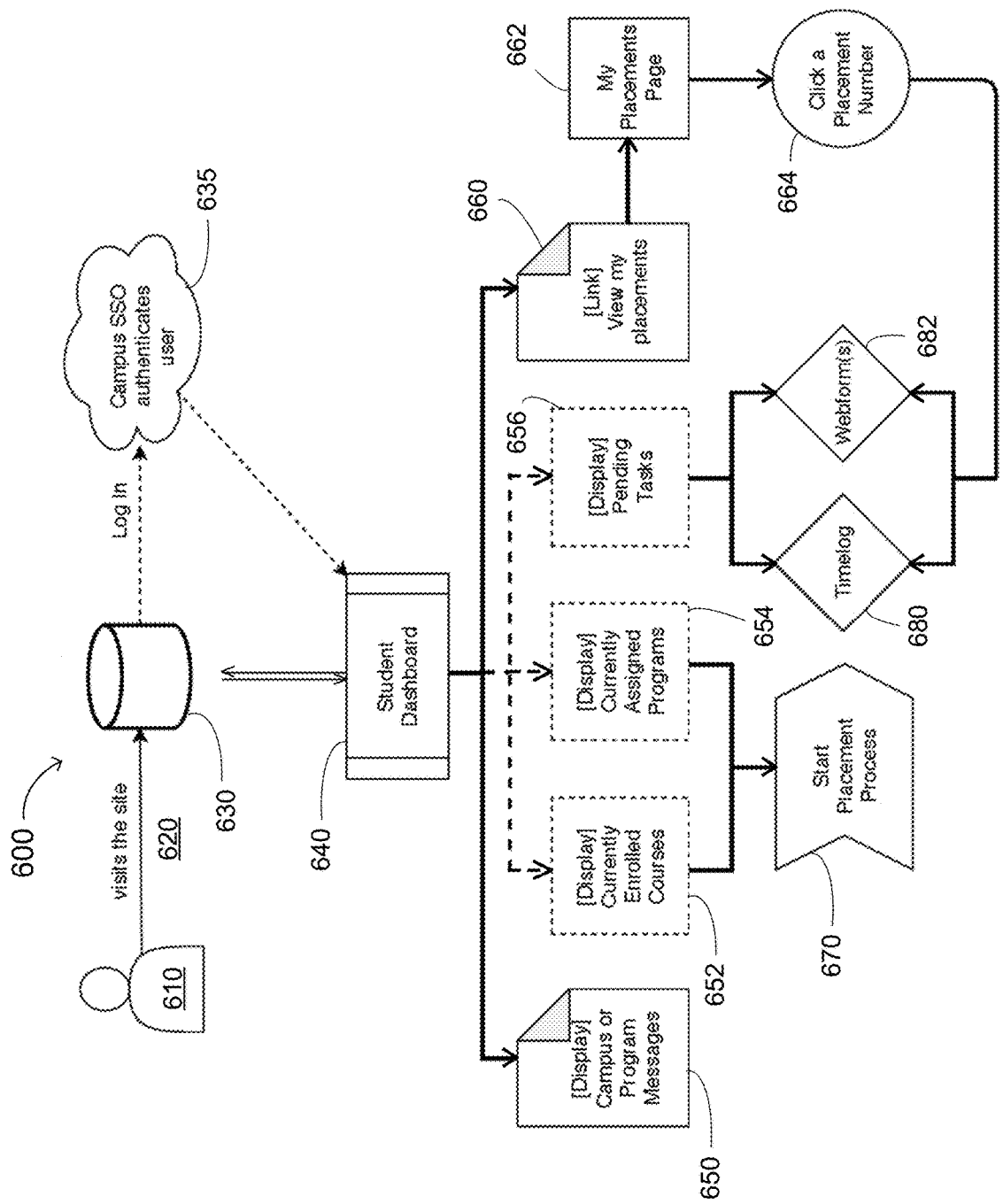
FIG. 6 is a flow diagram showing an exemplary process for students to populate the present system with data, according to one or more embodiments of the present invention.

FIG. 6 is a flow diagram showing an exemplary process 600 for students to populate the present ELO system with data, according to one or more embodiments of the present invention. The process 600 illustrates how a student 610 can visit the website 630 for the ELO system and login at 620, allowing the campus secure sign-on (SSO) mechanism optionally to authenticate the student 610 at 635. Successful sign-on allows the student 610 to access the website interface for students (e.g., a "student dashboard") 640. The student dashboard 640 includes and displays campus or program messages at 650 and a link or menu selection 660 for viewing the student's ELO placements. Optionally, student dashboard 640 includes and displays courses in which the student 610 is currently enrolled at 652, programs to which the student 610 is currently assigned at 654, and pending tasks at 656. Selecting the "View my placements" link or menu selection at 660 opens or links to a page displaying the student's placements at 662. The placement process can be started at 670 from either or both of the currently enrolled courses at 652 and currently assigned programs at 654, assuming that at least one of the courses and/or programs for which the student is currently enrolled or assigned includes an ELO, and the program settings in the ELO system allow for student placement. For example, some programs may require (i) faculty and/or ELO administrative staff to create the ELO placement record, and (ii) students only to login to complete certain forms (e.g., placement forms) and their time log. The pending tasks window at 656 allows access to the time log forms at 680 and to other web forms at 682. The page displaying the student's placements at 662 allows the student to select one of their placements at 664 by selecting a corresponding placement number. However, a placement may be selected by any of a number of other techniques, such as selecting the ELO host or sponsor name, the course name or number, an icon representing the ELO, course name or number, etc.

Figure 7:
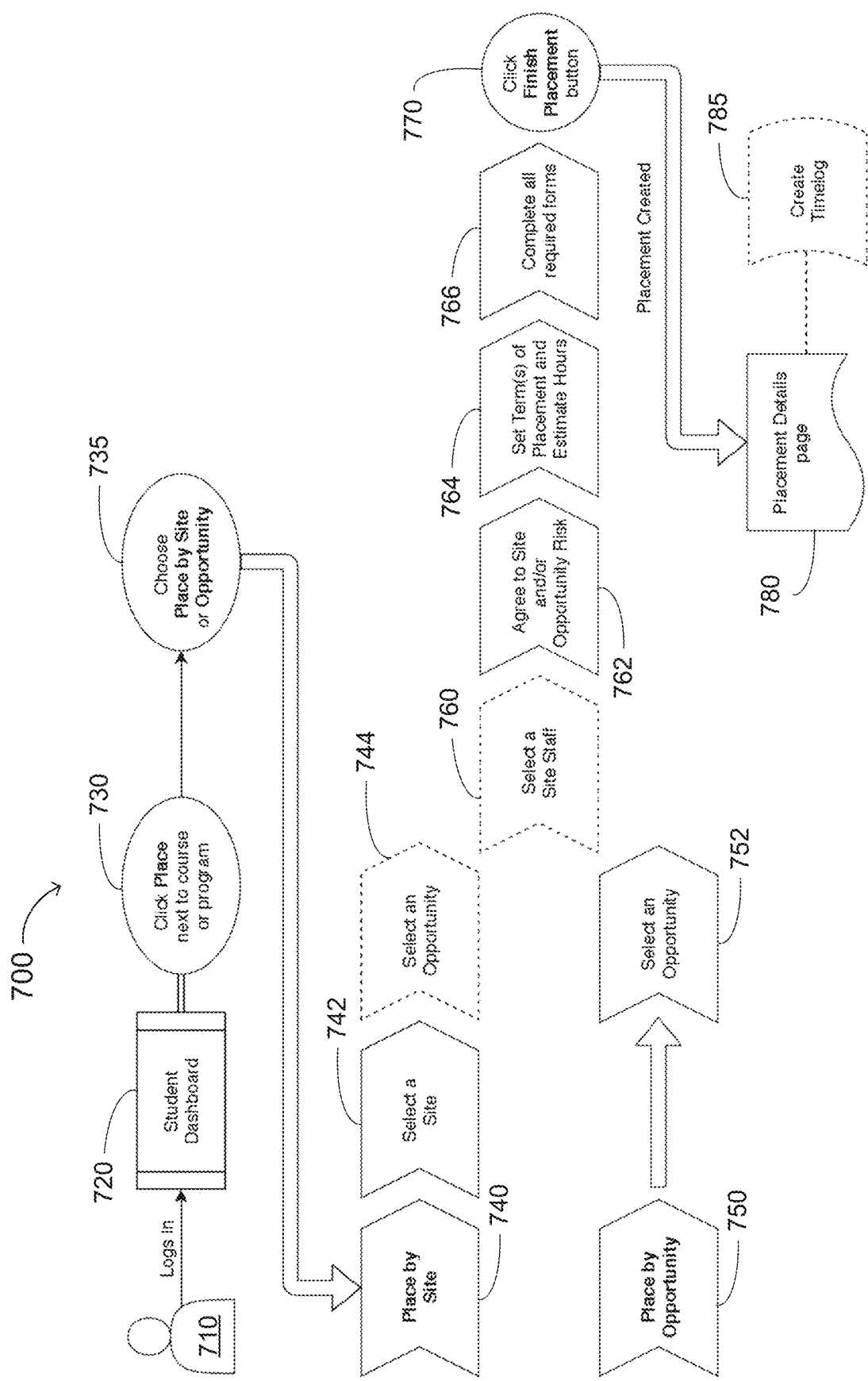
FIG. 7 is a flow diagram showing an exemplary process for placement and agreement, according to one or more embodiments of the present invention.

FIG. 7 is a flow diagram showing an exemplary process 700 for student placement and agreement, according to one or more embodiments of the present invention. FIG. 7 illustrates the process of a student 710 logging into the student dashboard 720. To select a particular ELO for placement, the student may select "Place" at 730 from the student dashboard 720 next to the course for which the student is currently enrolled or the program to which the student is currently assigned (see FIG. 6) that offers or requires an ELO. Thereafter, the student may navigate to or select a page or window for choosing a particular placement from one or more possible ELOs for the given course or program from a "Place by Site or Opportunity" window, page or display at 735.

At the "Place by Site or Opportunity" window, page or display (735), the student selects a placement by site at 740 or by opportunity at 750. To select a placement by site (740), the student may first select a site at 742 from one or more sites listed or displayed (e.g., using a menu), then select an opportunity (ELO) at 744 from one or more opportunities listed or displayed for the selected site. Alternatively, to select a placement by opportunity, the student can simply select an opportunity at 742 from one or more opportunities listed or displayed on the menu. When the site and/or opportunity (ELO) has/have been selected, the student can optionally select an ELO site staff at 760, agree to the ELO site and/or opportunity risk at 762, set one or more terms of the placement and propose or estimate a schedule (e.g., the hours to be worked or served throughout the academic semester, quarter or year) at 764, and complete any/all remaining required forms at 766. For example, the student may agree to the ELO site and/or opportunity risk at 762 by reviewing one or more displayed lists or notices of general risks associated with ELOs and specific risks associated with the particular ELO and/or site, and electronically initialing next to each risk and/or electronically signing the displayed list(s) or notice(s). In addition, the student may set one or more terms of the placement at 764 by selecting from one or more options or choices from a menu (e.g., selecting a start date, an end date, one or more days during the week on which the student is expected to provide work or service, a method of compensation [if applicable], acceptance of restrictions on disclosure about the site and/or the business of the ELO host, an agreement to assign intellectual property rights, etc.).

After all remaining forms are completed at 766, the student can complete the placement (e.g., by clicking on a "Finish Placement" button) at 770. Once the placement is completed, details of the placement are generated and displayed on a "Placement Details" page at 780, and a time log may be created at 785. For example, the time log may be created simply by clicking on a "Create Time Log" button on the "Placement Details" page. Dashed-line blocks in FIG. 7 indicate an optional or conditional step, which may depend on availability of the ELO and/or the program settings of the ELO system (e.g., for the particular ELO).

Figure 8:
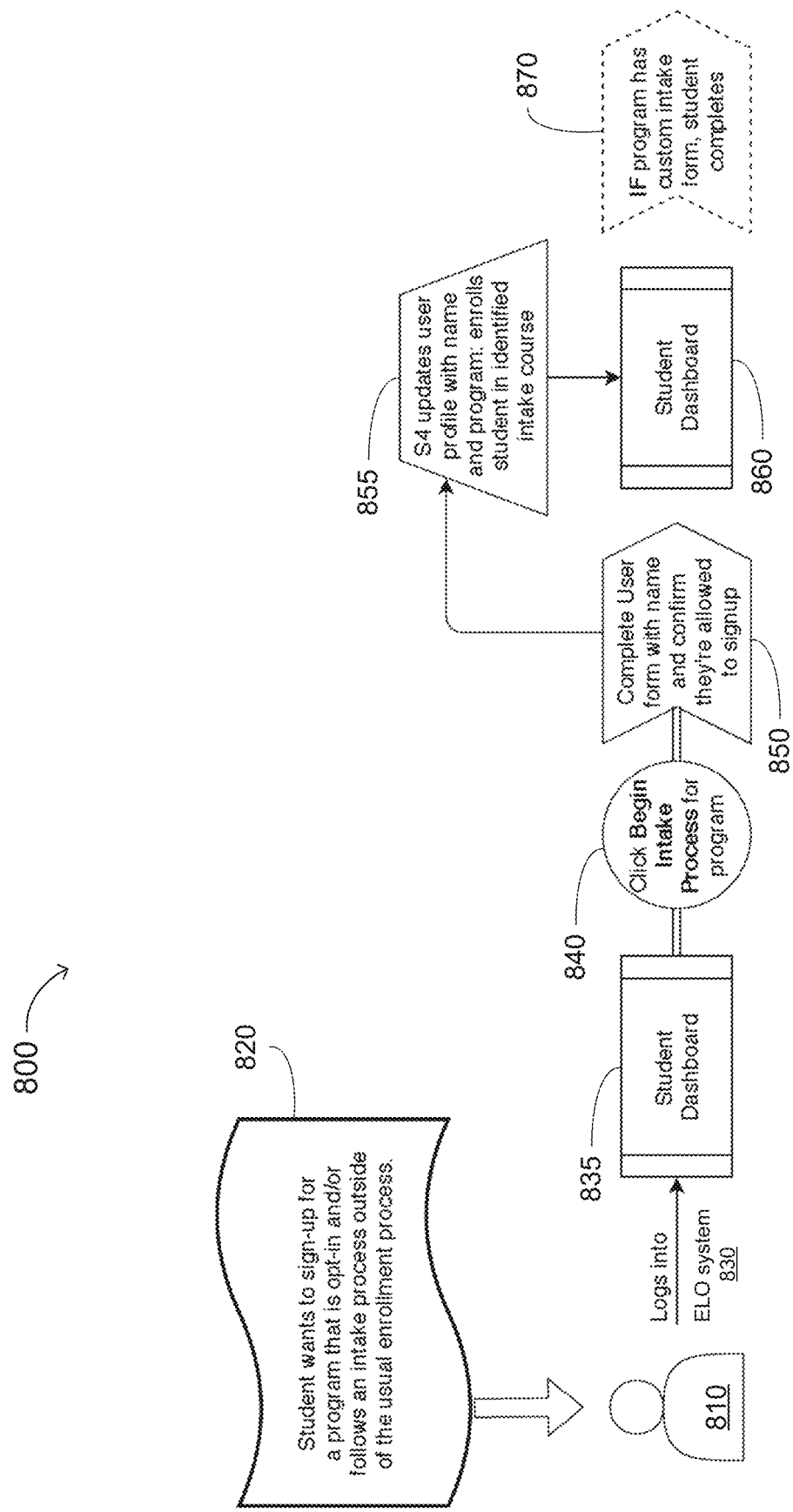
FIG. 8 is a flow diagram showing an exemplary opt-in and profile updating process, according to one or more embodiments of the present invention

FIG. 8 is a flow diagram showing an exemplary student opt-in and profile updating process 800, according to one or more embodiments of the present invention. FIG. 8 illustrates an option 820 in which a student wants to sign up for an ELO (or a program or course offering an ELO) that is opt in and/or that follows an intake process outside of the usual enrollment process. In this example, the student logs into the ELO system at 830 and accesses the student dashboard 835. From here, the student may begin the ELO opt-in or intake process at 840 by selecting an appropriate item or choice on the student dashboard 835. For example, the student may click on a button labelled "Begin Intake Process," which links or navigates to a sign-up page or display for the ELO program. However, other alternatives, such as selecting an option or choice from a pull-down or other menu, or selecting an appropriate icon on the display, are also suitable. At 850, the student then completes a user form with the student's name thereon (which may autofill on the user form as a result of that student signing in at 830) and/or in which the student provides an identifier (such as a name) for the ELO, and confirms they have appropriate permission(s) to sign up for the ELO. At this point, the ELO system updates the student's user profile with the name (e.g., for the ELO) and the relevant program (when applicable), and enrolls the student in the identified ELO (or the corresponding course or program) at 855. The student dashboard is updated at 860. In addition, when the program has a custom intake form, the student completes the program's custom intake form at 870.

Figure 9:
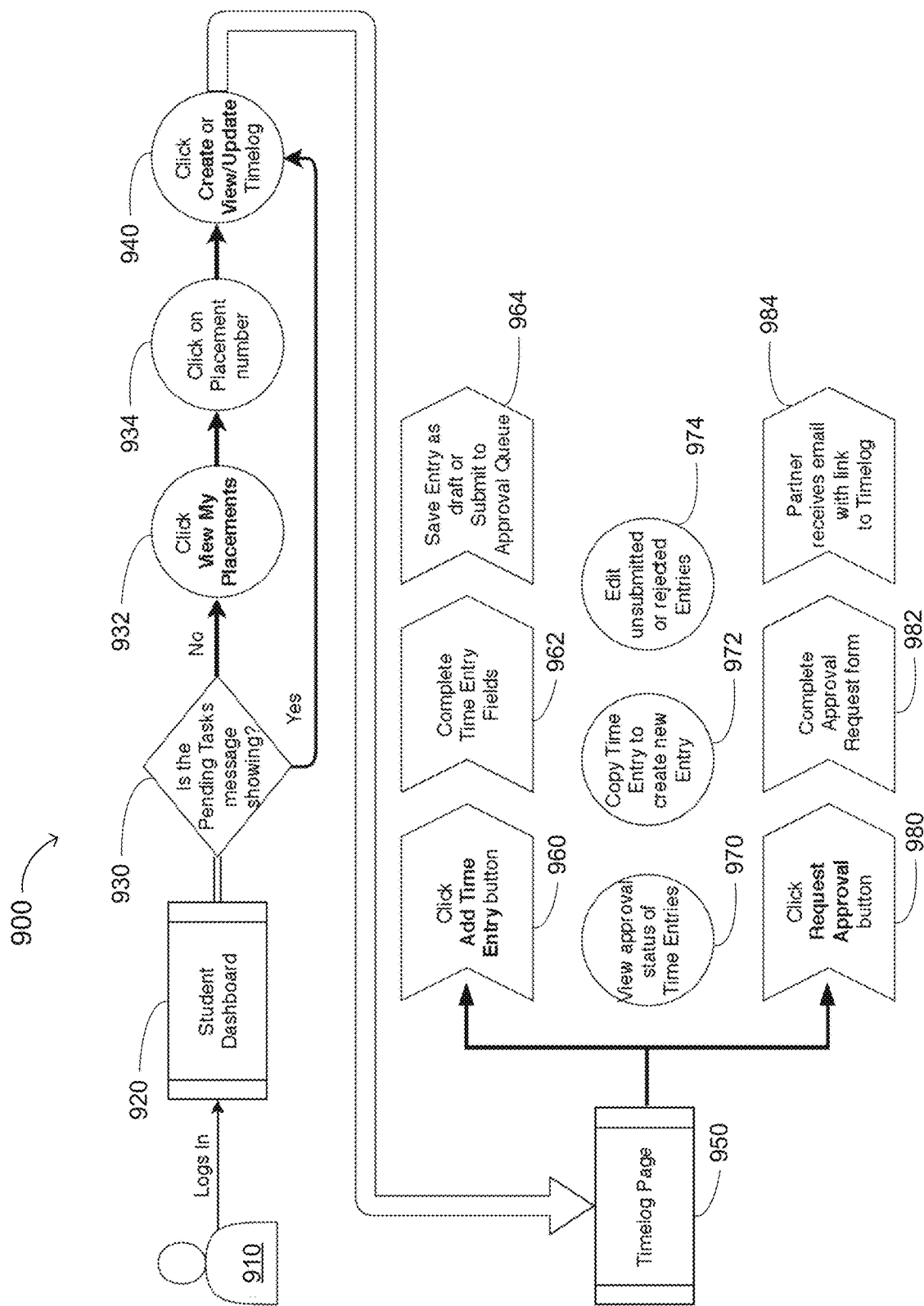
FIG. 9 is a flow diagram showing an exemplary time logging process, according to one or more embodiments of the present invention.

FIG. 9 is a flow diagram showing an exemplary time logging process 900, according to one or more embodiments of the present invention. In the process 900 shown in FIG. 9, a student 910 logs into the student dashboard 920 to determine whether there are any pending tasks at 930. In each of FIGS. 6-9, the student dashboards 640, 720, 835 and 920 are substantially the same. If there are one or more pending tasks for the student in their ELO, a "pending tasks" message is displayed in the student dashboard 920.

If there are no pending tasks, the student 910 may view their ELO placement(s) at 932, e.g., by clicking on a "View My Placements" button or other selection option, at which point the ELO system navigates to and/or loads a page with the ELO placement(s) of the student 910 thereon. From this page, the student 910 can choose a particular placement at 934, e.g., by clicking on a button, menu item, icon or other selectable indicator with placement number or other identifier thereon or therein. The student 910 then may create a time log, or separately, or review and/or update a time log at 940, for example by clicking on a corresponding button or selecting a corresponding menu item. If the "Pending Tasks" message is showing at 930, the student 910 is taken to 940 to create or view/update a time log.

When the student 910 selects an item to create a time log at 940, a time log page 950 is generated. When the student 910 selects an item at 940 to review or update a time log, the student 940 may be navigated or taken to a different time log page 950 with a list of existing, unapproved time logs or time log events thereon to select one of the time logs to review or update. The time log page 950 includes a mechanism for the student 910 to begin or open a new time log or time log entry, such as an "Add Time Entry" button or menu selection at 960. This option allows the student to complete time entry fields at 962 and to save the entry as a draft or submit it for approval (e.g., by adding it to an approval queue) at 964. The time log page 950 also provides the user (e.g., the student 910, a faculty member, or an ELO program administrator) with the option to view the approval status of the student's time entries at 970, copy a time entry to create a new time entry at 972, and edit an unsubmitted or rejected entry at 974. The time log page 950 also allows the user to request approval for a particular time log entry (e.g., by clicking a "Request Approval" button at 980 and completing an optional approval request form at 982), which then notifies a partner in the ELO (e.g., the faculty member and/or ELO supervisor) that approval for the time log entry has been requested at 984. For example, the faculty member and/or ELO supervisor may receive an email at 984 with a link to the time log entry or entry page submitted for approval. In some embodiments, students may be limited to requesting approval a maximum of one time every 7 days to limit excessive emails to partners. In other or further embodiments, students can manually copy the link (e.g., from the approval request form page at 982) and forward it to the ELO host or supervisor upon request, even within the 7-day period after the maximum one request for approval has been made.

Exemplary Software for Administering and Managing Experiential Learning Opportunities The present disclosure also includes algorithms, computer program(s), computer-readable media and/or software, implementable and/or executable in a general-purpose computer or workstation equipped with a conventional digital signal processor, and configured to perform one or more of the methods and/or one or more operations of the hardware disclosed herein. Thus, a further aspect of the invention relates to algorithms and/or software that create and/or implement part or all of any method disclosed herein. For example, the computer program or computer-readable medium generally contains a set of instructions which, when executed by an appropriate processing device (e.g., a signal processing device, such as a microcontroller, microprocessor or DSP device), is configured to perform the above-described method(s), operation(s), and/or algorithm(s).

The computer-readable medium may comprise any medium that can be read by a signal processing device configured to read the medium and execute code stored thereon or therein, such as a floppy disk, CD-ROM, magnetic tape or hard disk drive. Such code may comprise object code, source code and/or binary code. The code is generally digital, and is generally configured for processing by a conventional digital data processor (e.g., a microprocessor, microcontroller, or logic circuit such as a programmable gate array, programmable logic circuit/device or application-specific integrated circuit [ASIC]).

Thus, an aspect of the present invention relates to a non-transitory computer-readable medium, comprising a set of instructions encoded thereon and adapted to administer and manage student experiential learning opportunities (ELOs). When executed by a processing device, the set of instructions is configured to (i) receive student ELO placement data through a secure website on a website server that includes a content management system (CMS) with a plurality of modules therein into a relational database in a database server, (ii) provide fillable forms from modules in a content management system (CMS) on the website server to users, (iii) store in the relational database the fillable forms completed by one or more of the users, (iv) permit predetermined users to search the ELO placement data and the completed fillable forms in the relational database, (v) provide a timelog from a first module to students, the ELO hosts or sponsors, and faculty to collect and store timelog data, and to manage the timelog approval process, and (vi) provide emergency notices to students in an emergency event, based on student location and time information in the relational database. The database server further comprises an interface configured to communicate or exchange data with a university computer having a student information database thereon. The ELO placement data comprises student names, academic term(s), student course enrollment, student contact information, student special accommodations, university name, university or campus location(s), course names or identifier numbers, course faculty, faculty contact information, names of ELO hosts or sponsors, ELO site locations, background information for each of the ELO hosts or sponsors, ELO host or sponsor contact information, program types, safety information, and risk analysis notes. The website server is configured to host an ELO website through which the users interact with the relational database. The users comprise students, faculty, one or more ELO administrators, university or campus administrators, one or more university or campus risk managers, the ELO hosts or sponsors, and/or the ELO supervisors at the ELO sites. The fillable forms include ELO placement proposals, ELO participation agreements between (i) the university or campus and (ii) the ELO hosts or sponsors, at least one agreement form or template for the ELO participation agreements, student liability waivers, and/or risk assessment forms. Other fillable forms include fields therein that receive (1) at least some of the ELO placement data and (2) information identifying risks at corresponding ELO site locations and ELO hosts or sponsor coverage for such risks.

In essence, the set of instructions encoded on the computer-readable medium may implement substantially any function of any hardware described herein, and may perform any part of any method described herein that is performed by the ELO system, website and database.

Example and Results

FIGS. 10-18 show examples of pages of a version of the CalState S4 system that was implemented at a CSU campus during the 2019-2020 academic year. The example is hypothetical, but other than the names of the student, the ELO host/sponsor, and the course, the object code as implemented for use with actual students at the campus is similar or identical to that shown in FIGS. 10-18.

Figure 10:
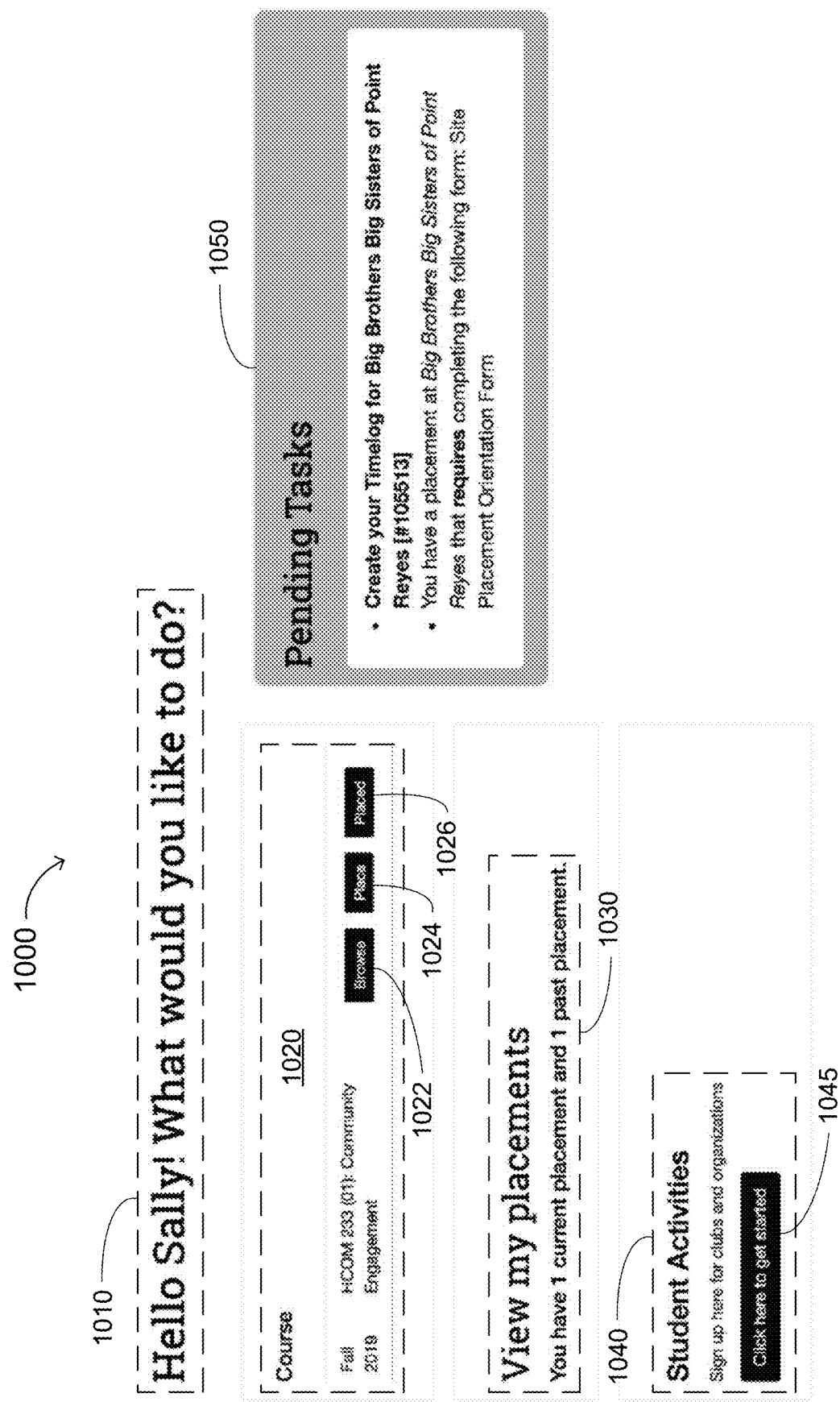
FIG. 10 is a graphic illustration of an exemplary ELO information page or display in a student dashboard, according to one or more embodiments of the present invention.

FIG. 10 is a graphic illustration of a page 1000 from an embodiment of a student dashboard according to the present invention. The student dashboard is generally fully available only to student users, although campus/university administrators and ELO administrative users can view and have limited permissions to edit information on the student dashboard, faculty users can generally view student dashboards, and ELO site sponsors or supervisors may have limited permission to view certain information on student dashboards. The student dashboard is generally not available to public users.

The student dashboard page 1000 in FIG. 10 shows a query dialogue 1010 intended to gather information from the student. FIG. 10 shows a course listing 1020 with the name(s) of the course(s) offering an ELO for which the student has enrolled, opted in, been taken in, or applied to enroll, opt in, or be taken in. In some embodiments, the course listing 1020 includes the term in which the course is offered. The course listing 1020 may also include links to pages or websites listing sites offering ELOs (e.g., "Browse" button 1022) that are available to the student in context of the course (e.g., within the same program), those courses that the student has previously identified and/or selected to apply or opt-in for placement (e.g., "Place" button 1024), and/or those courses that have a placement record already created (e.g., "Placed" button 1026).

FIG. 10 also shows a box 1030 for the student's placements, where the student can elect to view their current and past placements. The placements box 1030 may include a menu listing their current and past placements, or buttons or icons that (i) link or navigate to pages or sites listing the student's current placements (on one page or site) and the student's past placements (on a different page or site), or that display a pull-down or other menu listing the student's current or past placements. FIG. 10 also shows a student activities box 1040 where the student can sign up for clubs and organizations. For example, the student activities box

1040 may include a button or icon 1045 that links or navigates to a page or website listing various clubs and organizations available for student participation. FIG. 10 also shows a pending tasks dialog box 1050 that shows various tasks for the student to do or complete as part of their ELO placement. The pending tasks box 1050 may include buttons, icons or links to facilitate the student in completing the corresponding task.

Figure 11:
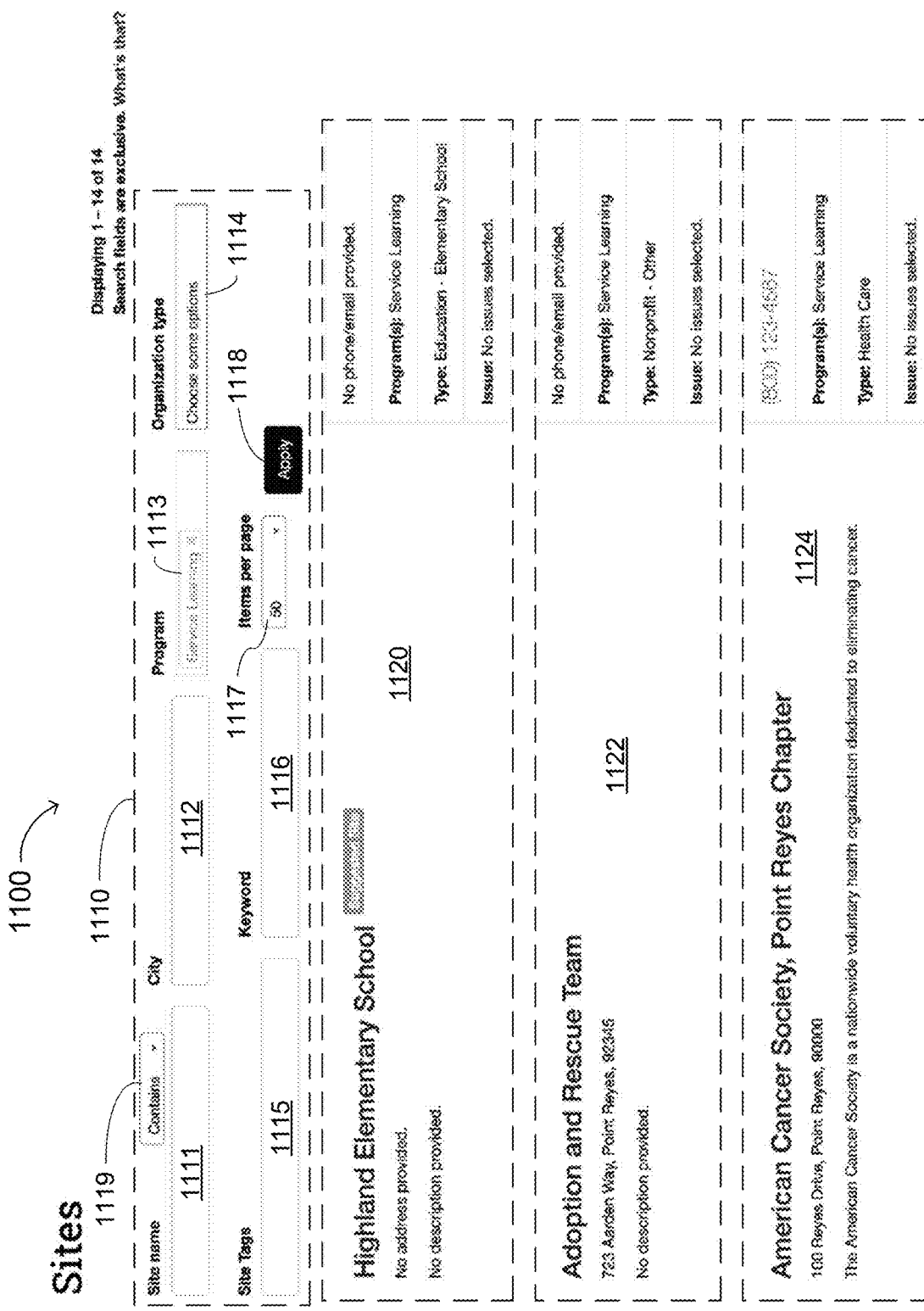
FIG. 11 is a graphic illustration of an exemplary page or display showing a list of available ELO sites during the placement process, according to one or more embodiments of the present invention.

FIG. 11 is a graphic illustration of an exemplary student site list page 1100 from an embodiment of the CalState S4 ELO system, according to the present invention. The student site list page 1100 is another page or screen in the student dashboard, and can be accessed by selecting or clicking on the "Browse" button 1022 in FIG. 10. Such a link, button or icon may be included in a section of the more general student dashboard page that presents general information about the ELO program, and may be labelled "Available Placements," "ELO Opportunities," or something similar thereto.

The student site list page 1100 in FIG. 11 shows a search dialog box 1110 and list of site descriptions 1120-1124. The search dialog box 1110 includes fields for searching using the site name 1111, the city 1112 in which the site is located, the program type 1113, the ELO host/sponsor organization type 1114, certain tags for the site 1115, and/or certain keywords 1116. A filter menu 1119 and a displayable item number menu 1117 may also be present to facilitate the site search and review of the search results, respectively. The program type field 1113, the organization type field 1114, displayable item number menu 1117, and the filter menu 1119 may comprise pull-down menus having a list of selectable pre-defined choices, options or items. A "search" function button may be present, to instruct the ELO system to conduct the search. A function button 1118 to apply the maximum number of items per page selected in 1117 may also be present.

The student site list page 1100 may display a list of site descriptions 1120-1124 found or identified in a search of ELO sites using the ELO database and website. Each site in the list may contain certain information about that site. For example, the site descriptions 1120-1124 include the site name and may include the site address, a brief description of the institution or organization operating the site, phone and/or email contact information, the program type with which the ELO is associated, the organization type, and one or more types, identities or very short descriptions (e.g., 1-5 words) of the issues with which the institution or organization is involved.

FIG. 12 is a graphic illustration of an exemplary student forms page 1200 from an embodiment of the CalState S4 ELO system, according to the present invention. The student forms page 1200 in FIG. 12 shows various placement forms and sign up forms 1220 that the student can or is required to fill out to complete their placement request during the placement process. The student forms page 1200 may be a page or screen in the student dashboard, or it can be a page or screen on the ELO website. The student forms page 1200 may be accessed by selecting or clicking on the site description 1120, 1122 or 1124 (or the site name therein) in FIG. 11. Alternatively, the student forms page 1200 can be accessed by selecting or clicking on a link, button or icon on a more general ELO website page that navigates to the student forms page 1200 (e.g., within the pending tasks dialog box 1050 in FIG. 10).

The student dashboard page 1000 in FIG. 10 includes a list of one or more placement forms that the student must complete to request or apply for an ELO placement, such as an application or ELO request form. If the student is accepted for a particular ELO, the student forms page 1200 in FIG. 12 may include an agreement form listing the terms and conditions of the placement, a site placement orientation form 1222, a risk acknowledgement form, etc. The student forms page 1200 also typically includes one or more notice blocks 1210 and 1250, which may provide instructions to the student (e.g., at 1210) or indicate whether a particular form is required or optional (e.g., at 1250). If the student wishes to reset the forms or the form list (e.g., to start over) for any reason, a function button 1240 for doing so may be provided. When all required forms for the placement are completed, the student may indicate this to the system using status or function button or icon 1230.

FIG. 13 is a graphic illustration of a specific student form page 1300 from an embodiment of the CalState S4 ELO system, according to the present invention. The student form page 1300 is a page or screen on the ELO website that can be accessed by selecting or clicking on the site placement orientation form link, button or icon 1222 in the placement and sign up forms section 1220 in FIG. 12, or a more general ELO website page that navigates to the student placement orientation form page 1300.

The specific student form page 1300 in FIG. 13 includes a progress bar 1310 providing the student with progress information about completion of different components of the placement orientation form. These components include a safety orientation 1312, an emergency contact 1314, a learning plan 1316, and a participation agreement 1318, each of which may be its own form on a separate page or site. A list of the form components and/or additional/separate forms can be found in a component form list 1320 (which may also include links to such components and/or forms). FIG. 13 also shows an agreement and/or acknowledgement radio button 1330 that confirms that the student has met with a site representative and that indicates that the student has received all necessary approvals to be placed in the ELO at the associated site. The student may begin the form completion process by selecting (e.g., clicking on) a button or icon 1340 that navigates to a next page in the form completion process. The student may also return to a previous page or site (e.g., the student dashboard page 1000 in FIG. 10, the site list page 1100 in FIG. 11, or the student forms page 1200 in FIG. 12) by selecting (e.g., clicking on) a return button, icon or link 1350.

Figure 14:
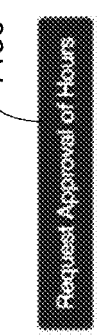
FIG. 14 is a graphic illustration of an exemplary student timelog page or display, according to one or more embodiments of the present invention.

FIG. 14 is a graphic illustration of a student timelog page 1400 from an embodiment of the CalState S4 ELO system, according to the present invention. The student timelog page 1400 is another page or screen on the ELO website, and can be accessed by selecting or clicking on a link, button or icon in the pending tasks box 1050 in FIG. 10 or on a more general ELO website page or screen that navigates to the timelog page 1400.

The student time log page 1400 in FIG. 14 includes an information block 1420 with the name of the student, a placement number or other identifier (e.g., a placement name), the type or name of the program, the course associated with the placement, and the site of the placement. The student time log page 1400 also includes a time entry area, with two examples shown for purposes of illustration. The time entry area includes fields for date and time worked/served 1430*a-b*, the number of hours spent 1432*a-b*, a text description of the work performed or service provided 1434*a-b*, and a status of submission 1436*a-b*. Dates and times in the fields 1430*a-b* can be selected from a pull-down or scrolling menu, or can be manually entered. The number of hours in fields 1432*a-b* can be automatically calculated or manually entered. The text descriptions in fields 1434*a-b* may automatically wrap when a line of text exceeds a certain length or a predetermined number of characters, or have word or character limits. The submission status in fields 1436*a-b* is typically either submitted or submitted, and these options can be selected from a pull-down menu.

Adjacent to the fields for information entry in the time entry area are a number of function buttons or icons to enable or cause certain actions to be taken with regard to an individual time entry on the timelog page 1400. The number of buttons or icons and the corresponding function may differ, depending on the status of the time entry. For example, a submitted time entry (see 1436*a*) can be deleted at 1438*a* or copied at 1438*b*. However, an unsubmitted time entry (see 1436*b*) can be submitted for approval (e.g., by the ELO supervisor and/or the faculty) at 1439*c* or further edited at 1439*d*, in addition to being deleted at 1439*a* or copied at 1439*b*.

The student time log page 1400 in FIG. 14 provides the opportunity for the students to add time entries and to request approval of those hours. Student time tracking can be used to create workers compensation reports (e.g., by the ELO host/sponsor), reports for faculty, campus/university administrators, or the ELO host/sponsor, for class credit, and/or for calculating or determining compliance with requirements for a major area of study or degree completion.

FIG. 15 is a graphic illustration of a course page 1500 for faculty from an embodiment of the CalState S4 ELO system, according to the present invention. The faculty course page 1500 is accessible only by faculty users of the ELO system, typically after the faculty user logs into the ELO system or another system securely linked thereto.

The faculty course page 1500 includes the name of the course 1505, a list of students enrolled in the course, and various placement information and functions. The faculty course page 1500 may show the name of the program site or sites for the faculty member at 1540, the name of the faculty member assigned to the course at 1542, and other course information at 1544. The other course information may include the term in which the ELO placement is offered, the type of program, the maximum number of placements per student for the course, and/or a syllabus upload option. The syllabus file may be selected after clicking on function button 1546, and uploaded to the ELO system and database at 1560. The faculty member may limit placements of the enrolled students to the site(s) listed in 1540 by selecting or clicking on an on-off type filter at 1550. The filter (for limiting placements to enrolled students) can be separately applied by clicking on the function button or icon 1552.

At the top of the course page 1500 are a number of selectable tabs 1510-1516 that enable the faculty user to view different screens or windows of the course page 1500. For example, the "View" screen or window 1510 is shown in FIG. 15. However, selecting the "Student Forms" tab 1512 allows the faculty user to view a screen or window providing links to various student forms. In some embodiments, the student forms are unfilled, template forms. In other embodiments, the student forms are those for the enrolled students, and those forms can be completed, partially complete, or blank. Selecting the "Student reports" tab 1516 allows the faculty user to view a screen or window providing a list of students and links to any placements that have been created as part of the course. The placements may be past or present, for the course(s) listed in 1540 or for all courses for the faculty user having ELO placement opportunities or requirements, and/or for enrolled students or for all students who have submitted a placement form. Such student reports can be filtered using known filtering techniques. In some embodiments, custom student reports may be created on the screen or window associated with the "Student reports" tab 1516 using a system and method similar or identical to that described in U.S. patent application Ser. No. 16/599,114, the relevant portions of which are incorporated herein by reference. In some embodiments, certain university/campus and ELO administrators may have access to a tab that allows the user to view a screen or window on which the faculty user can configure the display on the "View" screen or window 1510. The configuration affects the display for all courses in the ELO system, so access to this feature is restricted.

The enrolled students are individually listed in rows 1530. On the exemplary page 1500, three enrolled students are listed. One or more individual students may be selected for a further action by clicking on the corresponding selection box or button 1532, or all students can be selected (or deselected) by clicking on an "all students" selection box or button 1534. The information in the list for each student includes the student's name, the student's last login to the ELO system, the completion status (e.g., "No" or "incomplete," "Yes" or "complete," "N/A" or "not applicable," "In part," "Incomplete," etc.) for the forms required to be completed by the student, the completion status (e.g., "No" or "incomplete," "Yes" or "complete," N/A" or "not applicable," "In part," "Incomplete," etc.) for the signatures required to be obtained by the student, and any placement(s) made or completed for the student or, in some embodiments, for which the student has applied. The student may be placed in ELO at the site in 1540 or, in some embodiments, the placement shown in 1530 by selecting or clicking on the "Place" function button 1536.

FIG. 16 is a graphic illustration of a faculty placement page 1600 from an embodiment of the CalState S4 ELO system, according to the present invention. The faculty placement form 1600 allows the faculty member to assign a student to an ELO that is affiliated with a specific program and course, at a specific site, and with specific assigned site staff (ELO supervisor[s]). The faculty placement page 1600 is also accessible only by faculty users of the ELO system.

For example, the ELO/academic program may be selected (e.g., from a pull-down menu) at 1610, the course may be selected (e.g., from a pull-down menu) at 1620, the academic term may be selected (e.g., from a pull-down menu) at 1630, the ELO site may be selected (e.g., from a pull-down menu) at 1640, the opportunity may be selected (e.g., from a pull-down menu) at 1650, and the site staff may be selected (e.g., from a pull-down menu) at 1660. Selection by opportunity is optional, and enables a student to be placed based on the activities or type of activities that the student will perform at a particular ELO site. Alternatively, the ELO/academic program, the course, the term, the ELO site, the opportunity, and the site staff may auto-fill (e.g., from information entered or present in a previous page, form or screen), and selecting or clicking on the corresponding block or field allows the faculty to edit the field, if desired or necessary.

The faculty may add additional or new site staff names by selecting or clicking on the corresponding function button or icon 1670. The faculty enters the expected number of hours for the student to work or serve in the ELO (e.g., at the ELO site) in the number field 1680. When all required fields are complete, the faculty may submit the placement to the ELO supervisors (e.g., for final approval and implementation) by selecting or clicking on the corresponding function button or icon 1690.

In the faculty placement form 1600, the fields for the term, the site, and the expected number of hours are required, but the invention is not limited to these requirements. Other embodiments, may require fewer or more fields, and may include other fields, such as faculty name, starting and ending dates, etc., or alternative fields, such as the minimum number of hours that the student is required to perform in order to receive credit for the placement.

FIG. 17 is a graphic illustration of an ELO administrator (e.g., ELO program staff) dashboard page 1700 from an embodiment of the CalState S4 ELO system, according to the present invention. The ELO staff dashboard page 1700 is accessible only by ELO administrators, and optionally by campus/university administrative users of the ELO system, typically after the administrator/user logs into the ELO system or another system securely linked thereto.

The dashboard page 1700 provides a number of menus or lists, including a menu of different program management actions 1710, a menu or list of different ELO site summaries 1720 separated or segregated by program type, a menu or list of the most recent proposals 1730, and a menu or list of recently updated ELO sites 1740. The program management actions menu 1710 can include a link 1712 to a page or screen for managing different ELO programs (see, e.g., the menu 1720 listing different types of ELO programs), a link 1714 to a page or screen for managing ELO sites, a link 1716 to a page or screen for managing ELO site staff and partners (e.g., ELO supervisors), and a link 1718 to a page or screen for managing actual and/or potential ELO offers and other opportunities.

The ELO site summary menu or list 1720 lists summaries of ELO sites by program type, and optionally, the number of active sites for each program type. The program types in the menu or list 1720 can include academic internships 1722, alternative break 1724, service learning 1726, and (other) student activities 1728. In the context of the ELO system, "alternative break" refers to an ELO performed during a scheduled break from classes (e.g., spring break, winter break), typically a single day of service, but which can be as long as seven days. Frequently, alternative break ELOs are created by service learning and community engagement programs, but separate from course-related service learning and community engagement. When the ELO site summary menu or list 1720 is a menu, the text for each program type can indicate a button or link to another page or screen in the ELO system, where additional details for the program can be viewed, actions can be taken, and/or information can be entered about the program that is applicable to all sites in that particular program. When the ELO site summary menu or list 1720 is a list, the list 1720 simply provides summary-level information about the type of ELO program and the number of active sites in that program type. The menu or list 1720 can also include additional information, such as the number of inactive sites or the total number of sites in the program, the name of the responsible ELO and/or campus/university administrator for the program, contact information for the ELO and/or campus/university administrator, etc.

The most recent proposals menu or list 1730 lists the most recent proposals for ELOs, and optionally, status information for those ELOs and a function or toggle button 1732 to see all proposals in the menu or list (or revert back to a shorter list or a single most recent proposal as shown in FIG. 17). When the most recent proposals menu or list 1730 is a menu, the text for each organization name can indicate a button or link to another page or screen in the ELO system, where additional details for the proposal can be viewed, actions can be taken, and/or information can be entered about the proposal. When the most recent proposals menu or list 1730 is a list, the list 1730 simply provides summary-level information about the name of the organization proposing the ELO, the form on which the proposal can be found (e.g., a "framework form"), and the status of the proposal. The menu or list 1730 can also include additional information, such as the date of the proposal, the name of the responsible party at the ELO host/sponsor organization, whether the ELO administrator must take some action on the proposal, etc.

The recently updated ELO site menu or list 1740 in FIG. 17 lists names of recently updated sites and the date and time of the update. When the recently updated ELO site menu or list 1740 is a menu, the text for each site name can indicate a button or link to another page or screen in the ELO system, where additional details for the site and/or the update can be viewed, actions can be taken, and/or information can be entered about the site or update. When the recently updated ELO site menu or list 1740 is a list, the list 1740 simply provides summary-level information about the name of the site and the date (and optionally the time) of the update. The menu or list 1740 can also include additional information, such as the course, ELO identification information (e.g., an ELO number), the name of and/or contact information for the responsible party at the ELO host/sponsor organization, whether the ELO administrator must take some action (e.g., issue a notice) to others affected by the update, etc.

FIG. 18 is a graphic illustration of an ELO program (e.g., service learning) editing and settings page 1800 for ELO program management by ELO administrators from an embodiment of the CalState S4 ELO system, according to the present invention. Typically, only ELO administrators have access to ELO program editing and settings pages; other users, such as students, faculty, ELO hosts/supervisors and campus/university administrators typically do not have access to ELO program editing and settings pages. The service learning editing and settings page 1800 is reached by the ELO administrator selecting or clicking on the "Service Learning" text or button 1726 in FIG. 17.

The ELO program editing and settings page 1800 of FIG. 18 shows a number of menus or lists for managing the Service Learning program. The ELO system, website and database includes other program editing and settings pages for managing other various ELO programs, such as those program types listed in the ELO site summary list or menu 1720 in FIG. 17. FIG. 18 shows a selectable tab section 1810, a program name field 1820, a program type field 1820, a forms and notices menu 1840, and a student placement process menu 1850, an outcomes and assessments button or icon 1860, and a general information button or icon 1870.

The selectable tab section 1810 includes a number of selectable tabs, including a view tab 1811, an edit tab 1812, a revision operations tab 1813, and a developer tab 1814. However, not all of these tabs are necessary or required, and other tabs for different functions or different kinds of information may be present. The page 1800 in FIG. 18 is for the edit tab 1812. Selecting or clicking on any of the other tabs opens a different page or screen including text, graphics, menus, links, selection buttons and/or fields for viewing information for the given program type, taking one or more actions, selecting one or more of a plurality of different ELO system settings (e.g., for ELOs and/or sites of that program type), entering information relating to the program, ELOs and/or sites in the program, etc. For example, the page or screen associated with the view tab 1811 allows the ELO administrator to view summary-level information about the ELOs and/or sites in that program type, and may contain additional links to additional sources of information. A page or screen associated with the revision operations tab 1813 may allow the ELO administrator to configure the procedure by which revisions to various functions and procedures within the ELO system (e.g., student ELO placement requests, contract negotiation and approval, risk management, etc.) are performed. The page or screen associated with the developer tab 1814 allows the ELO administrator to access contextual developer information (e.g. object structure, field names with current values, content settings, etc.) useful for the ELO administrator tasked with theming pages, creating or editing custom module code, and troubleshooting bugs.

In further embodiments, the tab section 1810 may include one or more tabs for managing displays, generating student reports, and/or exporting data from a predetermined node. For example, a page or screen associated with a tab for managing displays allows the ELO administrator to configure various displays for the ELOs and/or sites within the program. A page or screen associated with a node export tab allows the ELO administrator to identify the data nodes for uploading to the campus/university student information system (or, in the case of a business or non-profit organization, a human resources database or information system). A page or screen associated with the node revision operations tab 1813 allows the ELO administrator to view a list of changes made to the node, including revision information (e.g. date of revision and user who made changes), with options to view or compare content.

The forms and notices section 1840 includes a list of different types of forms and notices that can be configured (e.g., edited and/or settings selected) by the ELO administrator. The menu 1840 includes links to different pages for student sign-up (placement request) forms at 1841, end of service forms at 1842, downloadable forms at 1844, and other forms at 1843, but the segregation of form types can be determined by those implementing the ELO according to needs and/or preferences. The menu 1840 includes a link 1845 for configuration and editing of notices ("Notification Messages"), but different types of notices (e.g., emergency, informational, equal opportunity/FERPA, etc.) may be listed in the menu 1840 separately. A link 1846 to a page or window to view, edit or modify settings for time tracking (i.e., time logs) is listed separately in the menu 1840, but it can be grouped with a type of report (e.g., student report forms; not shown). Each page linked to an item in the menu 1840 may include a separate list of links to the configuration pages for each form or notice of the type listed in the menu 1840. Although the forms and notices section 1840 is generally the same for each different program type, the choice of individual form types and notifications for the links listed in the forms and notices section 1840 may also depend on the program type in 1830 and/or the program name in 1820.

In further embodiments, one or more types of forms or reports may have an "on/off"-type function button associated with it in the menu 1840 that disables access to the forms or reports. For example, when the "Time Tracking Settings" item 1846 has an on/off button associated with it for enabling and disabling time tracking, time tracking (e.g., access to time logs) may be turned off or disabled, for example, when the ELO administrator is editing time tracking pages or configuring the time log settings. Such on/off buttons can also be found in the student placement process item 1850 where an option to hide the "Place" button can disable the visibility of the Place button on the Student Dashboard (see, e.g., FIG. 10, item 1024), for example, when the ELO's program requires faculty to create placements.

The ELO program editing and settings page 1800 includes a field 1820 for the program name and a field 1830 for the program type. The fields 1820 and 1830 may be auto-filled (e.g., as a result of one or more selections on a previous page or screen), or may be selected from a pull-down menu. The selection of a particular program name or type in the fields 1820 and 1830 may function as a filter for the items that appear in the forms and notices menu 1840 or in pages or screens linked thereto.

The student placement process menu 1850 includes a list of functions for configuring settings for various pages or screens in the student placement process (e.g., student-accessible pages or screens and/or faculty-accessible pages or screens) with an on/off or disable/enable button 1852 next to each configuration function. The list of configuration functions may include students placing (directly) with the program named in 1820, students identifying a course after creating a placement (i.e., completing a placement request form), faculty managing placements without a course, asking students to estimate their service or work hours (e.g., per week, total for the placement, etc.) and/or to select the ELO supervisor (site staff) during sign-up, and hiding "Browse" and/or "Place" buttons. As shown in FIG. 18, asking students to estimate their service or work hours and to select the ELO supervisor during sign-up have been turned on or enabled for ELOs in the community engagement (e.g., community service) program. The other configuration functions are turned off or disabled. More, less, or different configuration functions may be present in the student placement process menu 1850. The student placement process menu 1850 is generally the same for each different program or program type, but the choice of individual configuration functions listed in the menu 1850 may also depend on the program type in 1830 and/or the program named in 1820.

The outcomes and assessments button or icon 1860 is a link to a page or screen for configuring forms for assessing student performance and the ELO itself (e.g., using feedback from the student, faculty and optionally the ELO administrative staff). For example, the teacher credentialing program generally requires assessment of teaching performance expectations (TPEs), which are standardized (e.g., uniformly specified and required) in California. Therefore, a student assessment form for the teacher credentialing program may uniformly capture the standard TPEs for each student in the program, and students can enter data in the student assessment form without concern about missing any of the required TPEs. The page or screen to which the outcomes and assessments button or icon 1860 navigates may also allow the ELO administrator to configure certain types of reports. The general information button or icon 1870 is a link to a page or screen for configuring general information to different types of users. For example, using a link on the page or screen to which the "General Info" link navigates when selected, the ELO administrator can edit information that is displayed to student users prior to sign-up or a placement request, to public users, to faculty and/or ELO sponsor users prior to participation in an ELO, etc., as well as configure settings on such general information pages or screens.

Figure 19:
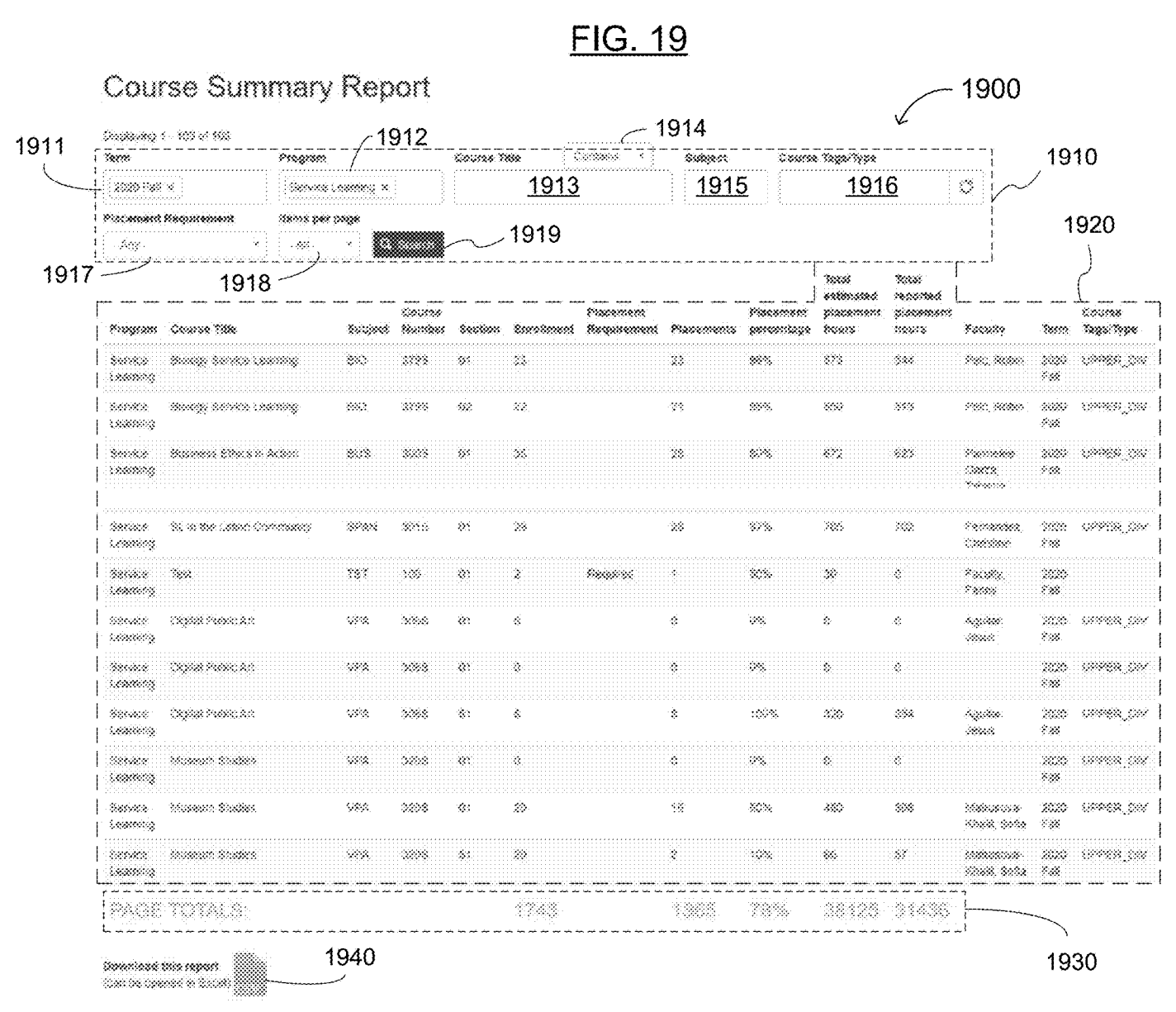

FIG. 19 is a graphic illustration of a course summary report page 1900 accessible by ELO administrators from an embodiment of the CalState S4 ELO system, according to the present invention. Other users may not have permission to access course summary reports or associated pages, although in some embodiments, faculty users may have or obtain permission to view summary reports for courses in which they are a named faculty. In other embodiments, campus/university administrative users may have access to course summary reports and associated pages.

The course summary report page 1900 includes a filter section 1910, a summary report 1920, a totals section 1930, and a downloading function button or icon 1940. The course summary report page 1900 is used by ELO administrators/ program staff to quickly see statistics for courses offering ELOs within a given term 1911 (e.g., Fall 2020, Spring 2021), and can use essentially all data in the ELO database in its report. However, when a university includes multiple campuses, a campus ELO administrator may have access through the ELO system only to ELO data for that campus.

The filter section 1910 includes various fields for filtering the data in the ELO database (which may be pre-filtered by campus, if the ELO administrator is an administrator for a single campus). As shown in FIG. 19, the filter fields may include academic term 1911, ELO program type 1912, course title 1913, academic subject 1915 (e.g., Computer Science, Sociology, Education, Public Administration, Public Policy, Social Work, Library Science, etc.), course tags or type 1916, placement requirement 1917, and items per page 1918. Fewer or additional fields may be present, as desired. The term filed 1911, ELO program field 1912, placement requirement field 1917, and items per page field 1918 may comprise a pulldown menu with a plurality of selectable items thereon, each having a known meaning or function. The course title field 1913 may be further functionalized to find and/or filter course titles with a search function menu 1914, which in one example is a pull-down menu. The search function menu 1914 may include selections for identifying and/or filtering the data by course titles that contain the term or terms in the field 1913 (e.g., "Contains," as shown in FIG. 19), that include any of the term or terms in the field 1913 (e.g., "Or"), that include all of the terms in the field 1913 (e.g., "And"), that do not include any of the terms in the field 1913 (e.g., "Not"), etc. In another example, it is a "function on/function off" button, with only a single search function available. After filling or selecting one or more fields 1911-1913 and 1915-1918

The summary report 1920 provides basic course details (e.g., ELO program, title, academic subject, course number, section, total enrollment, name of faculty, academic term, and course tag/type) and calculated course values (e.g., the raw number of placements, percentage of students placed, total estimated placement hours, and reported placement hours). However, not all such information is required to be displayed or be made available for inclusion in a summary report 1920, and the ELO administrator can, in a separate window or on a separate page, configure the summary report 1920 to include only the desired information.

In some embodiments, the ELO system is configured to calculate totals for certain numerical entries in the report 1920, such as enrollment, raw number of placements, percentage of students placed, total estimated placement hours, and reported placement hours. The report 1920, when viewing in an Internet browser, displays totals at the bottom of the report 1920. In such embodiments, when the ELO administrator/program staff choose the "All" option in the items per page field 1918, they can quickly obtain statistics on all courses in a program or programs that they are managing, for certain academic term(s). This is useful information for internal and external reports relating to public service contributions of the university and its students, highlighting the benefits of the ELO program for the community. In further embodiments, the ELO system is configured to calculate as average for such numerical entries (e.g., percentage of students placed), but percentage of students placed can also be calculated from the total numbers of placements and enrollment.

Also, the data in the summary report 1920 can be exported (e.g., as a CSV file or data file in another format) be selecting or clicking on the export button or icon at 1940. The data can be manipulated further, for example, graphs and charts can be made in a standard spreadsheet program using the data, as desired.

Figure 20:
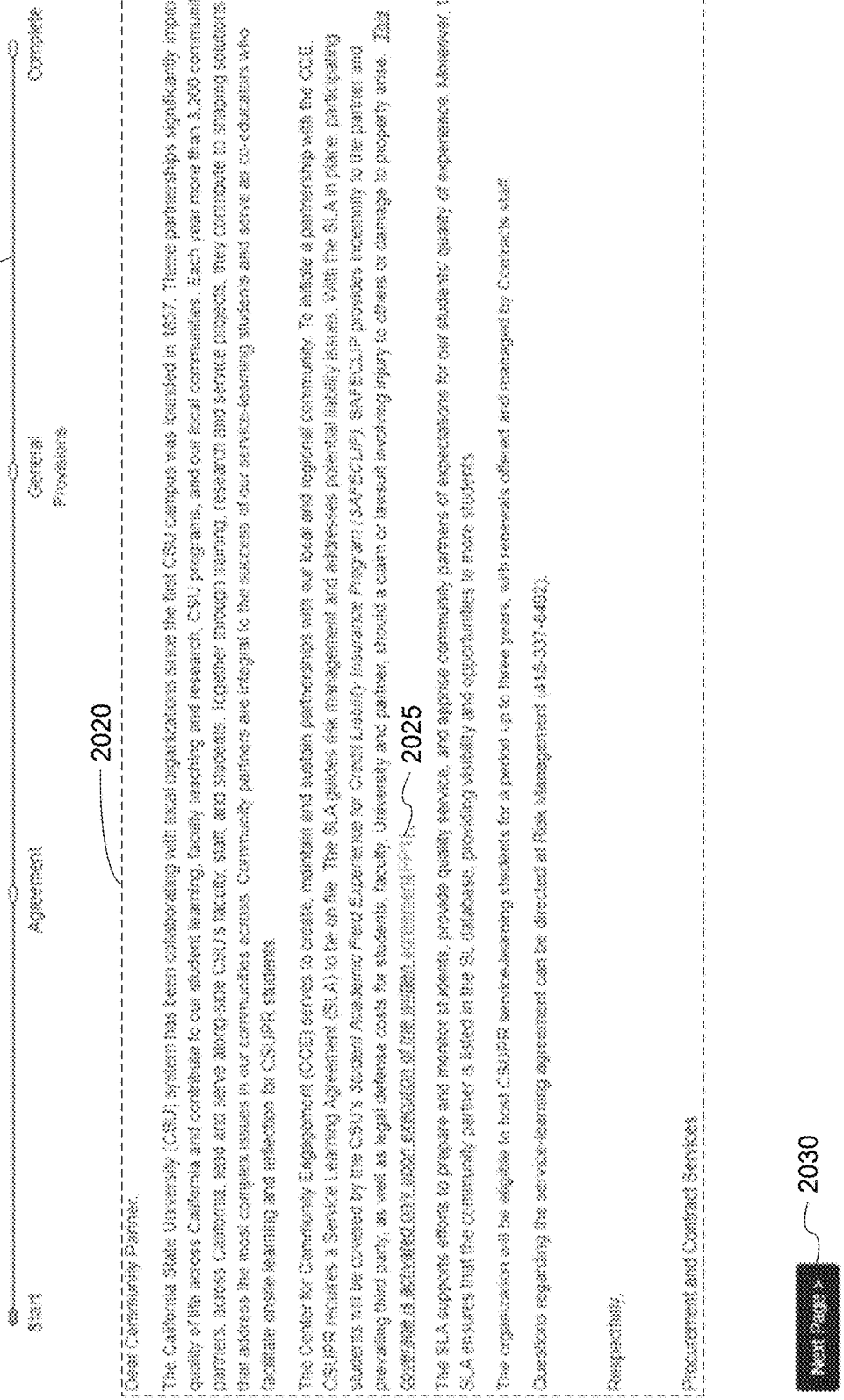
Figure 21:
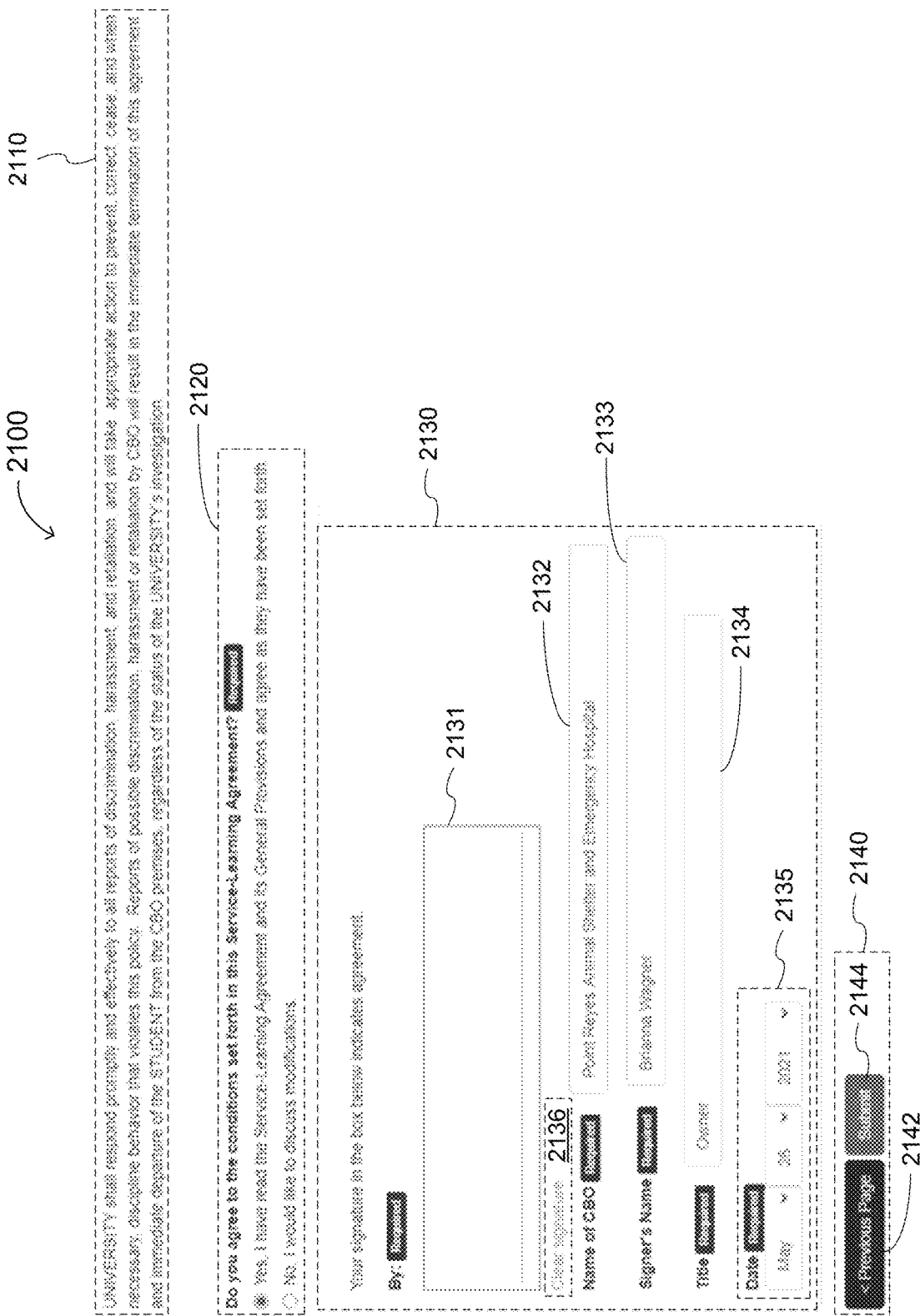

An example of the contract negotiation and agreement process in an embodiment of the CalState S4 ELO system according to the present invention and can be explained with regard to FIGS. 20-22. For example, FIG. 20 shows a university-agency agreement page 2000 accessible by ELO administrators and ELO site sponsors and supervisors, but generally not by other users, although campus/university administrative users may have access to university-agency agreement pages in some embodiments. In this example, an "agency" refers to any outside ELO site, host or sponsor, including a commercial enterprise or business, a government agency or bureau, a non-profit organization, etc. In embodiments for a multi-campus university, the contract form template and the pages of the ELO contract negotiation and agreement process in the ELO system may be customized or customizable for each campus.

The university-agency agreement page 2000 contains a progress bar 2010, an introduction notice or section 2020, and a button, icon or link 2030 to a successive or "next" page or site in the ELO contract negotiation and agreement process. Optionally, the agreement page 2000 may include the same of the ELO host/sponsor, which may be auto-populated as a result of a selection on a previous page (e.g., of the ELO host/sponsor) or the login process (e.g., when the ELO host/sponsor log in to the ELO system). In some embodiments, the ELO system loads or navigates to the university-agency agreement page 2000 from a page or a link that is dedicated to that ELO host/sponsor, so that predetermined details (e.g., ELO host/sponsor name, address, contact information, etc.) are pre-populated in the pages of the ELO contract negotiation and agreement process in the ELO system, as well as in the contract form itself.

In the example shown in FIG. 20, the university-agency agreement page 2000 is the first page of the contract form for the CSU or the CSU campus. The progress bar 2010 indicates four form pages (or general stages of the contract negotiation and agreement process), a start page 2000 or starting phase, an agreement page or phase, a general provisions page or phase, and a completion page or signature phase, the completion of which completes the contract negotiation and agreement process. In some embodiments, a similar progress bar may be provided for all multipage forms in the ELO system.

The introduction notice or section 2020 provides background information to the ELO host/sponsor relating to the university/campus, one or more goals of the ELO program, contact information for the party at the university/campus responsible for negotiating and/or managing the contract/ agreement, and some terms and conditions of the contract between the ELO host/sponsor and the university/campus that are common to all such contracts/agreements. The introduction notice or section 2020 may also include one or more links 2025 to additional documents, such as the contract itself, an insurance rider or other exhibit that is incorporated into the contract, etc. After reviewing the agreement page 2000, the user may move to the next page by selecting or clicking on the "Next Page" button, icon or link 2030.

In general, the next page includes the contract form (not shown), which includes a contract template and optionally a plurality of pre-populated or auto-filled fields therein for terms and conditions of the contract. In some embodiments, there may be one or more fillable fields for certain negotiable terms of the contract that were not covered by other forms (e.g., the ELO proposal form, the ELO host/sponsor information form, etc.). This next page corresponds to the "Agreement" stage in the progress bar 2010 in FIG. 20. The auto-populated or auto-filled fields of the contract may include the names and addresses of the parties, contact information for the parties, academic term for one or more specific ELOs, effective date of the contract, location of the ELO site, name of the ELO supervisor, description of the work or services to be provided, hours to be worked by the student, the names and titles of the persons signing the contract, etc. The fillable fields of the contract may include compensation to be paid to the student (if any), special accommodations to be made for the student (e.g., when the student has special needs), etc. Other terms of the contract, such as confidentiality, termination conditions, jurisdiction and venue, applicable law, warranties, warranty disclaimers, representations, assignability/transferability, etc., may be included in the template for the contract form, in which case they cannot be modified at this stage. Such unmodifiable terms are indicated as "General Provisions" in FIGS. 20-22, and may be on a separate page or screen from the contract template.

FIG. 21 shows an agreement review and signature page 2100 accessible by ELO administrators and ELO site sponsors and supervisors, but generally not by other users. The agreement review and signature page 2100 loads when a user indicates on the contract form that the contract form is complete (e.g., by clicking on a button or icon labeled "Finish," "Complete," "Next Page," etc.), and may correspond to the "Completion" stage in the progress bar 2010 in FIG. 20. The agreement review and signature page 2100 includes an equal opportunity (EO) notice or section 2110, an agreement confirmation section 2120, a signature section 2130, and a navigation section 2140. The EO notice or section 2110 is optional, but may be required for compliance with certain laws.

The agreement confirmation section 2120 typically asks the user whether they agree with the conditions of the ELO contract (i.e., the "Service-Learning Agreement" in FIG. 21). When the user does not wish or intend to modify the ELO contract, the user may select or click on the radio button next to the word "Yes," which may also indicate that the user has read and agrees with the terms and conditions of the ELO contract.

After the user selects or clicks on the radio button next to the word "Yes" in the agreement confirmation section 2120, the fields for the name of the ELO host/sponsor 2132, signer's name 2133, signer's title 2134, and date 2135 are filled in (if not pre-populated or auto-filled, for example with information from the request to initiate placement), then the signer signs electronically in the signature field 2131. The electronic signature may be any conventionally acceptable electronic signature (e.g., "/s/ Signer Name, a separately drawn and superimposed e-signature such as that used in the DOCUSIGN® document signing process, etc.) or any other mark indicating an intent to agree to the terms and conditions of the contract.

After electronically signing in the signature field 2131, the user submits the signed ELO contract form by selecting or clicking on the "Submit" button or icon 2144 in the navigation section 2140. The agreement review and signature page 2100 also has a "Previous Page" button or icon 2144 in the navigation section 2140, enabling the user to return to the most recently-visited page in the ELO system if desired.

FIG. 22 shows modifications 2200 to the agreement review and signature page 2100 in FIG. 21 when the radio button next to the word "No" in the agreement confirmation section 2120 is selected. Selecting "No" in the agreement confirmation section 2120 means that the user would like to discuss modifications to the ELO contract being negotiated. In the embodiment of CalState S4 ELO system shown in FIGS. 21-22, the user who would like to discuss modifications to the ELO contract submits the form by selecting or clicking on the "Submit" button or icon 2144 in the navigation section 2140, without signing the agreement review and signature page 2100. The parties to the ELO contract then discuss and/or further negotiate the modifications to the contract, update the terms of the contract as needed or as agreed, then sign the agreement review and signature page 2100 when no further modifications are needed or desired. In some embodiments, the modifications to and/or updated terms of the ELO contract may take the form of an addendum to the contract, which can be on a separate page of the ELO system.

During the 2019-20 academic year, at a single campus, the CalState S4 system helped 194 faculty to teach experiential learning courses. 7,470 students enrolled in those experiential learning courses. The students served an estimated 87,889 hours in those experiential learning courses.

With external collaborators, there were 149 active community partnerships. The primary focus areas in these partnerships included education, health and medicine, and food and housing security. A total of 647 experiential learning courses were offered through 29 different departments at the campus. Assuming a 2019 value of time in the independent sector of $25.43/hour, a total of $2,235,017 was invested in the community through the experiential learning courses administered and managed by the one CSU campus using the CalState S4 system.

Figure 23B:
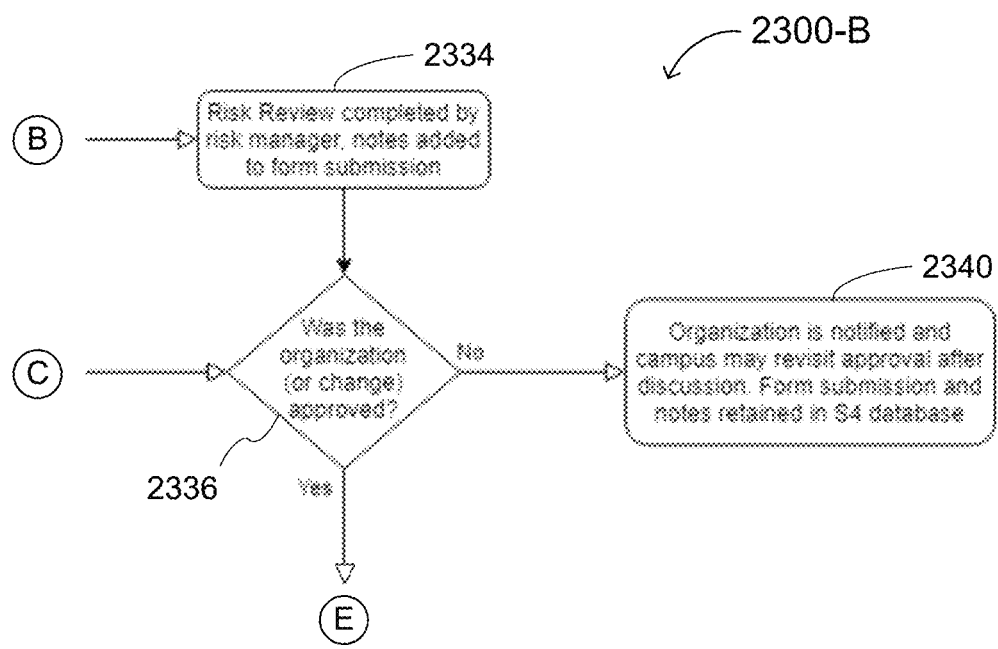
Figure 23C:
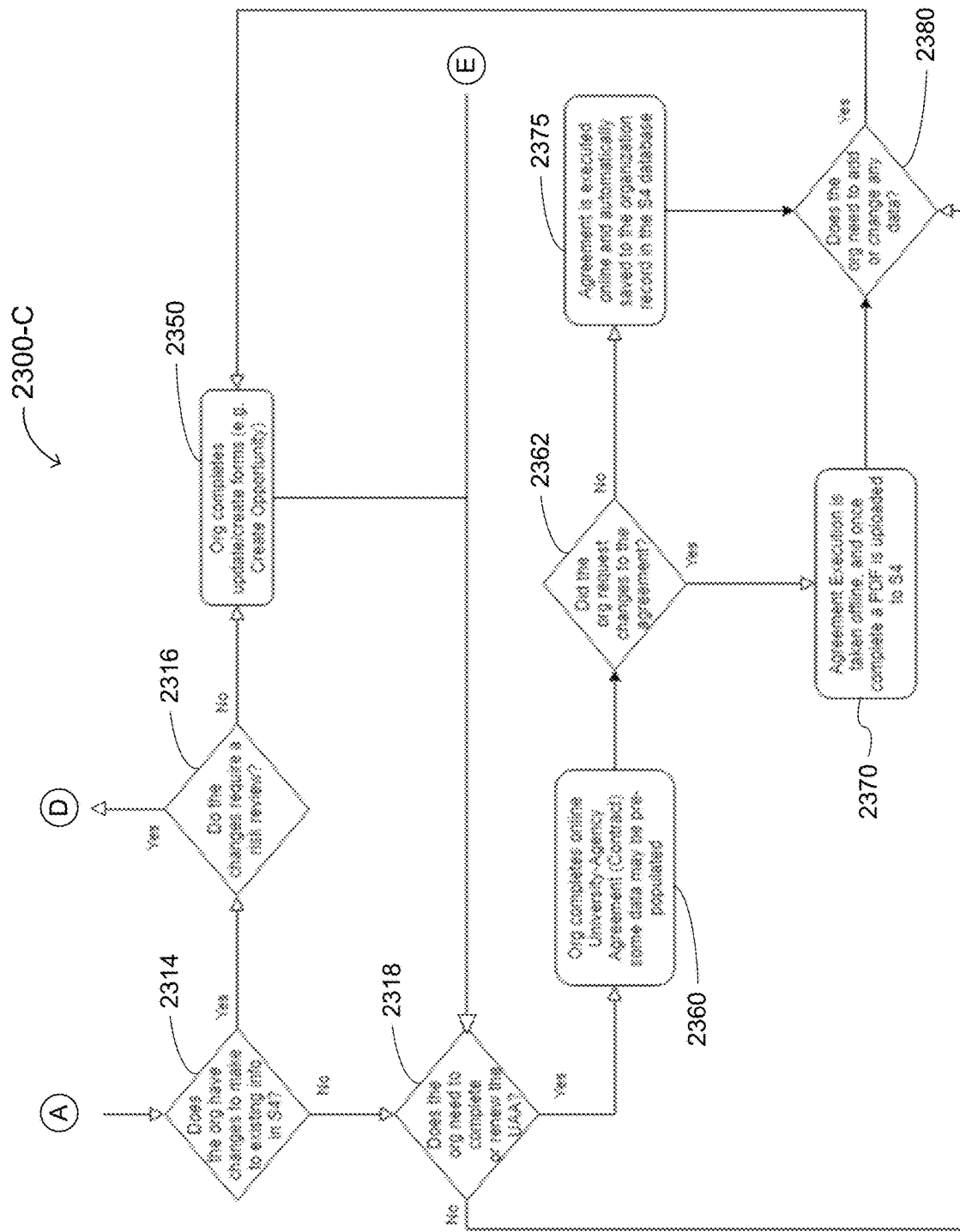

An Exemplary System and Method of Assessing and Managing Risk and Forming Contracts in Experiential Learning Opportunities FIGS. 23A-C are parts of a flow chart 2300-A through 2300-C for an exemplary method of managing risk and forming a contract in experiential learning opportunities. FIGS. 23A-B focus on risk analysis, and FIG. 23C primarily concerns contract formation. FIGS. 24-27 show examples of pages of a version of the CalState S4 system that implement the risk management method.

The method starts at 2310 when the ELO host/sponsor (the "Organization" or "Org" in the flow chart 2300-A through 2300-C) wants to offer an ELO to a student at the university or campus. Typically, the ELO host/sponsor contacts the ELO administrative office at the university or campus, by telephone or in writing (e.g., letter or email) to inform the university or campus that the ELO host/sponsor has an ELO to offer. At 2312, the ELO administrator checks the ELO database to determine whether the ELO host/sponsor is already present or entered in the ELO database. An ELO host/sponsor may also find instructions on the departmental website that include a link to the Request to Initiate Partnership form. When this occurs, the ELO administrator checks the ELO database for the existence of any records for the ELO host/sponsor when reviewing the completed form submission.

Figure 24:
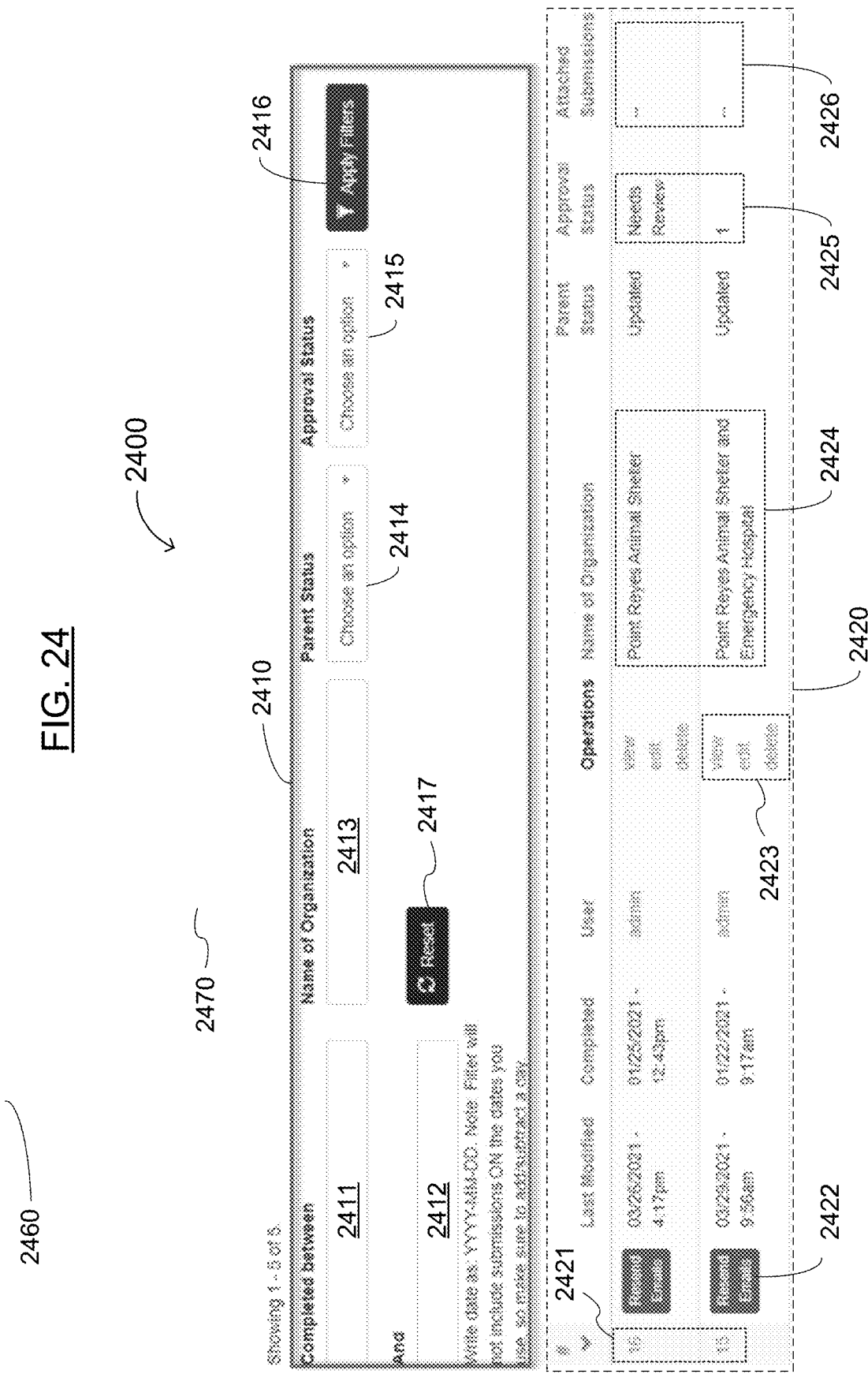

FIG. 24 shows a page 2400 from the CalState S4 system that shows a list of Request to Initiate Partnership (RTIP) form submissions from one or more particular ELO host(s)/sponsor(s) in the ELO database. The page 2400 includes a search fields section 2410 and a search results section 2420. The search fields section 2410 includes a beginning date field 2411 and an ending date field 2412 for searching dates on which a form or contract was completed, the ELO host/sponsor (e.g., "Organization" in FIG. 24) name field 2413, a parent status field 2414, and an approval status field 2415. In the embodiment shown in FIG. 24, the dates specified in the beginning and ending date fields 2411 and 2412 limit the search results to only those submissions of a form that were completed between the provided dates. The parent and approval status fields 2414 and 2415 may comprise a pull-down menu of selectable terms, although they may comprise a fillable text field in some embodiments. The search fields 2411-2415 may function as a filter in the search of the ELO database. The search fields may include additional fields, such as ELO program, ELO host/sponsor address fields, etc., or fewer fields (e.g., without the parent status field 2414 and/or the approval status field 2415). Such additional fields may also (or alternatively) be on a different search page, such as one that searches parent organizations. The search fields section 2410 also includes a button or icon 2416 for applying the search terms (e.g., "Filters" in FIG. 24) and a button or icon 2417 for resetting or clearing the search fields.

The search results section 2420 may include a table of ELO hosts/sponsors in the ELO database identified in a search. The table may include the ELO host/sponsor identification number 2421, the ELO host/sponsor name 2424, the parent status, the contract approval status 2425, and a name of any attachments or addenda 2426 submitted with the contract and/or risk evaluation form(s). The ELO identification number 2421 may be assigned by the ELO administrator, or it may be automatically assigned by the ELO system or database. The "parent status" refers to the status of information for a parent organization for the corresponding ELO host/sponsor named in column 2424. The "approval status" refers to the status of any contract(s) with the corresponding ELO host/sponsor named in column 2424. In the example shown in FIG. 24, "Needs review" means that someone with the university or campus (e.g., an ELO administrator, a university or campus administrator, and/or a university or campus risk manager) has an unmet obligation to review a pending, unexecuted contract or risk assessment form.

The search results section 2420 also includes two columns, each with a series of repeated function blocks. One such column in the example page 2400 in FIG. 24 is a "Resend emails" button or icon 2422, and the other is an "Operations" block 2423. One such button/icon 2422 and operations block 2423 is in each row of the table. These columns are optional, but beneficial, in the ELO system. The "Resend emails" button or icon 2422 typically resends one or more emails to the relevant participants for the corresponding form (e.g., a risk assessment or contract form). In some embodiments, "Resend emails" button or icon 2422 opens a new window or navigates to a new page displaying a list of all emails sent from the ELO system relating to the identified form, and the emails to be resent can be selected from the list. The functions in each operations block 2423 include viewing, editing and deleting the information page for the corresponding ELO host/sponsor. Clicking on one of the labels (i.e., "view," "edit" or "delete") navigates to the information page for the corresponding ELO host/sponsor. ELO hosts/sponsors may be able to view information pages for themselves and their parent organization(s) and subsidiaries/departments, but not edit or delete information for themselves, their parent organization(s), or their subsidiaries/departments.

In the example shown in FIG. 24, the search may have been for ELO hosts/sponsors with "Point Reyes Animal Shelter" in the name. Optionally, the search may have limited the parent status to "Updated." This search identified two ELO hosts/sponsors in the ELO database, "Point Reyes Animal Shelter" and "Point Reyes Animal Shelter and Emergency Hospital." There may be a concern about whether the two ELO hosts/sponsors are actually the same organization, in which case information for one or both of the ELO hosts/sponsors may need updating. Alternatively, one host/sponsor (e.g., the animal shelter and emergency hospital) may be a parent organization for the other. Thus, in some embodiments of the ELO system, information for a parent organization can be automatically updated based on information submitted in an RTIP form by a subsidiary or department thereof. In the case where the animal shelter and emergency hospital is the parent organization for the animal shelter, then the animal shelter is in the ELO system at the ELO site level, and the animal shelter and emergency hospital is the parent organization.

Referring back to FIG. 23A, if for example the ELO host/sponsor who wants to offer an ELO at 2310 is either "Point Reyes Animal Shelter" or "Point Reyes Animal Shelter and Emergency Hospital," then the ELO host/sponsor is in the ELO database. When the ELO host/sponsor is already in the ELO database, the method (FIG. 23A) proceeds to (A) in FIG. 23C.

If the ELO host/sponsor is not in the ELO database at 2310, the ELO administrator asks the ELO host/sponsor to complete a Request to Initiate Partnership (RTIP) form in the university/campus ELO system, and the ELO host/sponsor completes the RTIP form at 2320. The RTIP form includes a plurality of risk-related questions and text boxes for completion by the ELO host/sponsor (which may include questions relating to insurance coverage for ELO-related risks), which helps the university, campus and/or ELO administrator(s) to determine the risks for the ELO being offered by the new ELO host/sponsor and raise any specific concerns they may have for a given ELO program, potential ELO host/sponsor, or specific ELO.

At 2322, a university/campus administrator reviews and/or evaluates the risks of the ELO at the proposed ELO site of the new ELO host/sponsor. The university/campus risk review is conventional, and is conducted (or waived) in accordance with (i) a standard risk review process conducted by a typical university or campus before offering any similar educational opportunity or academic program to its students and/or (ii) an established process at the university or campus. As part of the university/campus risk review at 2332, the university/campus administrator submits a written entry in the ELO risk review log and provides written notes on the original RTIP relating to the risks identified and/or evaluated in the university/campus risk review.

At 2324, the university, campus and/or ELO administrator(s) determine whether the new ELO and ELO host/sponsor require review by the academic program director (who is part of the university/campus administration and/or management). If so, the program director conducts the risk review at 2330, and adds their notes to the RTIP form or submits their notes to the ELO system as part of the overall ELO risk assessment.

Thereafter, or if a risk review by the academic program director is not required at 2324 (e.g., the risk level does not meet established threshold[s] for such high-level risk analysis), then the method determines whether the ELO requires a review at 2332 by the individual campus risk manager. When a university has only a single campus, the campus risk manager may also by the university risk manager. The campus risk manager is also part of the university/campus administration and/or management, but in a different role than the academic program director, who supervises essentially all aspects of the academic program. By contrast, the campus risk manager's primary role is to evaluate all risks above a certain threshold for the campus (or university).

Figure 25:
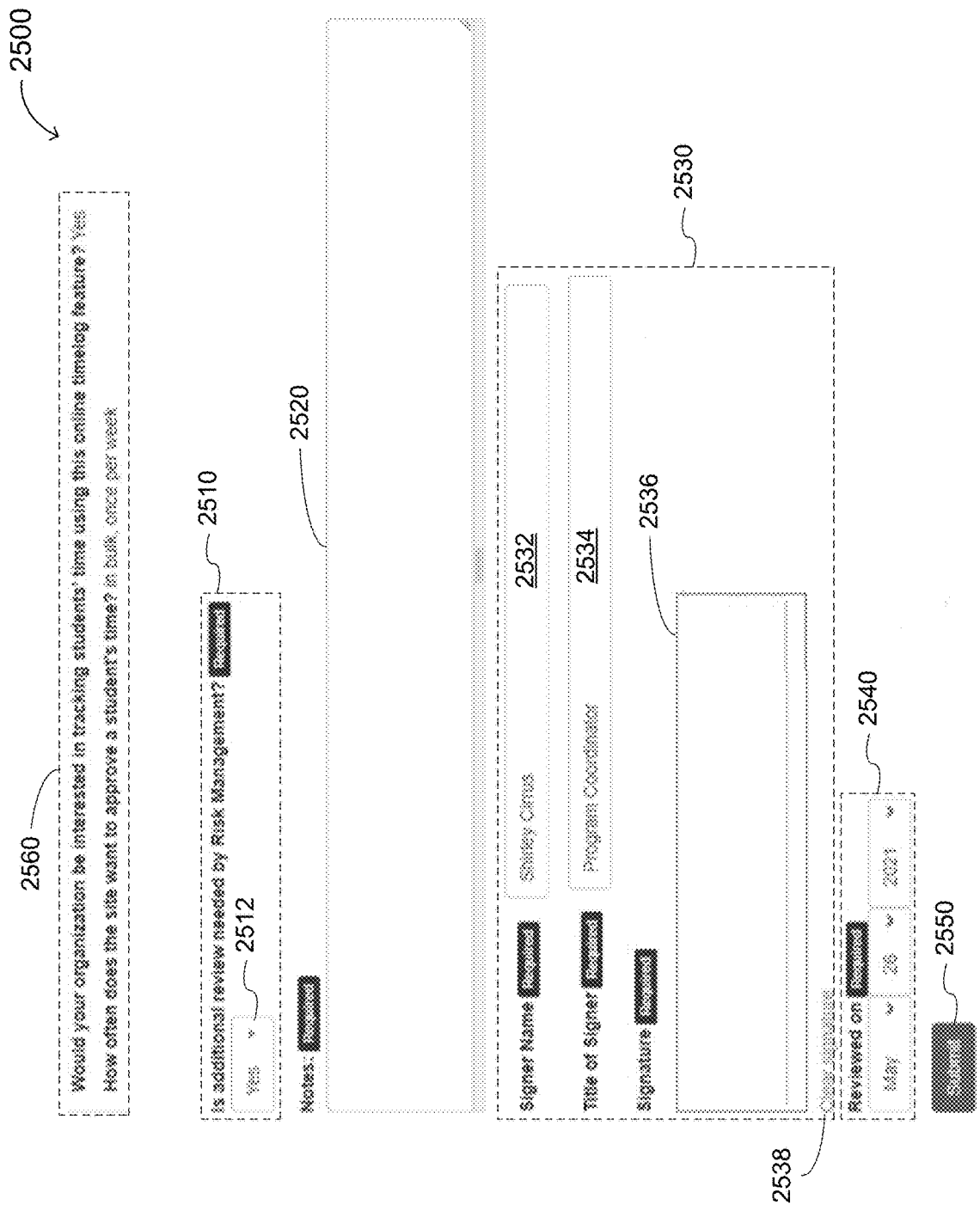

FIG. 25 shows a page 2500 from the CalState S4 system that may be used by an ELO administrator or a university/campus administrator (e.g., the academic program director) to indicate whether additional risk review by the university/campus risk manager is needed. The risk management page 2500 includes a further risk review section 2510, a notes section 2520, a signature section 2530, and a date field 2540. The further risk review section 2510 includes a "Yes/No" pull-down menu 2512. Alternatively, the further risk review section 2510 may comprise separate "Yes" and "No" radio buttons (or an equivalent mechanism) for indicating whether additional risk review by the university/campus risk manager is needed.

The notes section 2520 is completed by either the ELO administrator or the university/campus risk manager. The ELO administrator completes the notes section 2520 when the ELO administrator's risk analysis notes are not included elsewhere and/or the university/campus risk manager's risk analysis notes are to be included as an addendum or as a separate form. The university/campus risk manager completes the notes section 2520 when the ELO administrator's risk analysis notes are included elsewhere (e.g., in the risk analysis form or as an addendum or a separate form), and/or the university/campus risk manager's risk analysis notes are not included elsewhere.

The signature section 2530 includes the signer's name 2532, the signer's title 2534, the signature block 2536, and a signature-clearing button or icon 2538. The singer is the person providing the notes in the notes section 2520. The signer's name and title 2532 and 2534 may auto-fill or pre-populate, based on information collected earlier in the method. The signer provides an electronic signature in the signature block 2536, as discussed herein. Alternatively, the signer's name, title, and signature can be combined into a single text block, optionally with separate lines for the signature, name, and title.

In the embodiment shown in FIG. 25, the date is specified in the date field 2540 by selecting the month, day and year from separate pull-down menus of selectable terms. However, in some embodiments, the date field 2540 may comprise a single field in which the entry is selected from a calendar, or a fillable date-format field in other embodiments.

When all of the fields and sections on the risk management page 2500 are completed, the signer may select a "Submit" button or icon 2550 to submit the risk management page 2500 (or corresponding form including the page 2500) to the ELO database. The page 2500 as shown in FIG. 25 also includes an ELO host/sponsor timelog participation dialog block 2560, which asks the ELO host/sponsor whether they want to track the time spent by the ELO participant (i.e., the student) at the ELO site using the ELO timelog feature, and if so, how frequently the ELO host/sponsor wants to approve the student's time. Answers to these questions may be selected from pulldown menus, text or number boxes/fields, or a combination thereof. The timelog participation dialog block 2560 is accessed and the questions answered by the ELO host/sponsor.

Referring back to FIG. 23A, when the university has only a single campus, the risk review may be performed by the university risk manager, or skipped if risk review by the ELO administrator and (if conducted) the program director are deemed sufficient. When a risk review is required from the campus risk manager, the flow chart 2300-A proceeds to (B) in FIG. 23B. When a risk review is not required from the campus risk manager, the flow chart 2300-A proceeds to (C) in FIG. 23B.

Referring now to FIG. 23B, when a risk review is required from the campus risk manager (i.e., (B)), the campus risk manager completes the campus risk review at 2334, then adds their notes to the RTIP form or submits their notes to the ELO system as part of the overall ELO risk assessment. Thereafter, or when the campus risk review is not required (i.e., (C)), the ELO administrator determines whether the ELO host/sponsor and the ELO are approved on the basis of risk (but not necessarily on the academic merits of the ELO) at 2336. This approval is generally based on predetermined criteria being met, such as approval or waiver from each reviewer (i.e., the ELO administrator, the campus administrator, the academic program director, and [if applicable] the campus/university risk manager). The individual approvals may also be based on predetermined criteria being met, such as insurance coverage for the identified risks, ELO host/sponsor compliance with all applicable laws and regulations, etc.

When the ELO host/sponsor and the ELO are approved for risks (e.g., pass the risk analysis), the flow chart 2300-B proceeds to (E) in FIG. 23C. When the ELO host/sponsor or the ELO are not approved for risks (e.g., either the ELO host/sponsor or the ELO present one or more risks that are too great for the university or campus to tolerate or allow), the ELO host/sponsor is notified of the negative decision at 2340. The university or campus may re-evaluate its decision after receiving additional information about the risks (e.g., after discussing the reasons for the negative decision with the ELO host/sponsor, and receiving feedback [oral or in writing] from the ELO host/sponsor). In addition, the ELO host/sponsor may resubmit a new or updated RTIP form after taking corrective action or otherwise mitigating the risk(s) and/or risk factor(s) that caused the negative decision. The ELO administrator retains the RTIP form and all risk assessment notes in the ELO database, whether approved or not. This enables current ELO system users to recall, and subsequent users to learn and understand, information that was submitted and events that occurred in past RTIPs.

Referring now to FIG. 23C, when the ELO host/sponsor is already in the ELO database at (A) (see FIG. 23A), the method determines whether the ELO host/sponsor has changes to make to the existing information for it in the ELO database/system at 2314. For example, the mailing address, name of the contact person, type of business or general business activities, etc., may have changed since the last time the information was reviewed. If changes to the existing information for the ELO host/sponsor in the ELO database/system are to be made, then the ELO administrator determines (e.g., according to certain predetermined criteria) whether the changes require a risk review at 2316. For example, the addition of shipping functions or on-site manufacturing will almost certainly require a risk review. On the other hand, an address change may not, depending on the zoning type of the land/property at the new address.

When the ELO host/sponsor information change(s) require a risk review, the flow chart 2300-C returns to (D) in FIG. 23A, where the ELO host/sponsor completes an RTIP form (with the risk-related questions and text boxes or fields therein) in the university/campus ELO system at 2320. However, when the ELO host/sponsor information changes do not require a risk review, the ELO host/sponsor updates one or more existing forms and/or generates one or more new forms in the ELO system at 2350. The forms to be updated or generated are generally forms for creating a new ELO (i.e., the RTIP forms in the CalState S4 system), which can be taken from a prior ELO if the new ELO is the same or substantially the same as the prior ELO. Otherwise, new form(s) for creating an ELO are generated at 2350.

After the ELO host/sponsor updates the existing form(s) and/or generates the new form(s) at 2350, or when the ELO host/sponsor has no changes to make to the existing information for it in the ELO database/system at 2314, the method determines whether the ELO host/sponsor needs to complete or renew a contract (e.g., a University-Agency Agreement in the CalState S4 system) at 2318. The determination is usually made by the ELO host/sponsor, but it can also be made by the ELO administrator. For example, when there is no contract between the ELO host/sponsor and the university, or the most recent contract between the ELO host/sponsor and the university has terminated or expired, then either the ELO host/sponsor or the ELO administrator can make the determination at 2318. When the ELO administrator makes the determination, the ELO administrator should also notify the ELO host/sponsor of the need to complete or renew the contract.

When there is no contract, the ELO host/sponsor then completes all necessary contract forms in the ELO system at 2360 to initiate the ELO partnership between the university and the ELO host/sponsor. Similarly, when the ELO host/sponsor wishes to modify or add one or more terms or conditions in an existing, unterminated contract (e.g., they wish to offer a new ELO or one that differs from the ELO[s] in an existing, unterminated contract), then the ELO host/sponsor makes the determination to renew the contract, and proceeds to 2360 to review and (to the extent necessary or possible) modify the form(s) for the existing contract.

Some data and many of the fillable fields in the contract may be pre-populated or auto-filled. Many terms and conditions in the contract are standardized or in a template, and cannot be modified online at 2360. However, if desired or necessary, the ELO host/sponsor can request changes or modifications to the contract at 2362 (see, e.g., FIG. 22 and the discussion thereof for an example of a request for modifications).

When the ELO host/sponsor requests changes or modifications to the contract, the process or act of signing the contract (see, e.g., FIG. 22 and the discussion thereof for an example of the contract signature form and process) can be taken offline at 2370. For example, the ELO administrator or the ELO host/sponsor will contact (or will notify one or more appropriate university/campus administrators to contact) the other party to discuss the contract modifications. If necessary or desired, the ELO administrator, the academic program director, one or more university or campus administrators (e.g., members of the legal team and/or their staff), and/or the university/campus risk manager may work together to evaluate the contract modifications. When the university/campus and the ELO host/sponsor agree on the contract terms and conditions, a paper copy of the contract can be signed by hand, then scanned and uploaded into the system. If the university/campus and the ELO host/sponsor agree to sign the agreement using electronic signatures as exemplified in FIG. 21 (see, e.g., electronic signature block 2131), then the modifications can be uploaded as a separate document or filled in in a contract addendum form, and the contract can be signed electronically.

At this point, the method is essentially complete, but in some embodiments, there may be an ongoing obligation for the ELO host/sponsor to update its data in the ELO system and/or the ELO contract when changes occur that trigger such an obligation. For the university or campus, one form may correspond to one piece of content in the ELO system, but for the ELO host/sponsor, each ELO, ELO supervisor, etc., is a separate piece of content in the system. Thus, at 2380, there is a continuous step of determining whether the ELO host/sponsor needs to add or change any data pertaining to it in the ELO system, or any terms or conditions of one or more of its ELO contracts. If such additions or changes are needed, the method returns to 2350, and the ELO host/sponsor completes or updates the required and/or appropriate form(s). If not, the method simply holds at 2380.

When the ELO host/sponsor does not request and changes or modifications to the contract, the contract is signed electronically by authorized representatives of both the ELO host/sponsor and the university or campus at 2375. The electronically signed contract is saved automatically in the university/campus ELO system at 2375. Here, the method also is essentially complete, but when the ELO host/sponsor has an ongoing obligation at 2380 to add or change any data pertaining to it in the ELO system, or modify any ELO contract to which it is a party, the ELO host/sponsor does so at 2350.

Referring back to 2318, if there is no need to complete or renew a contract (e.g., the ELO is covered under an existing, unterminated contract), the flow chart 2300-C goes directly to 2380, and the ELO host/sponsor adds and/or changes data pertaining to it in the ELO system or requests a modification to any ELO contract to which it is a party at 2350, when a change or event occurs at 2380 that triggers an obligation to do so.

The exemplary method of managing risk and forming a contract in experiential learning opportunities in the flow diagram of FIGS. 23A-C has additional safeguards to ensure that all applicable forms are completed and all applicable opportunities for risk analysis are performed. For example, referring now to FIG. 26, a partial Request to Initiate Partnership (RTIP) submission 2600 (e.g., from a corresponding completed framework form) is shown. The partial RTIP submission 2600 includes a standard or template statement 2610 of criteria for participation in the ELO program for review by the ELO host/sponsor, at least one of which is a requirement to state or disclose all activities or work that may pose a health or safety risk to the student. In the embodiment shown in FIG. 26, the statement 2610 also includes an ongoing obligation for the ELO host/sponsor to disclose or communicate additional unforeseen risks as they become known. Other criteria for participation in the statement 2610 include an on-site orientation that includes an overview of the ELO host/sponsor's programs, policies, procedures and clients/customers (at least as they relate to the work or service to be provided by the student), a description of the work or service that the student is expected to provide (including all information relating to potential hazards or risks to the student), an obligation to provide the student with supervision, and a list of potential legal obligations that the ELO host/sponsor has towards the student (e.g., if the student is considered an employee in the relevant jurisdiction). However, the statement 2610 may include less or more than the criteria exemplified in the statement 2610 in FIG. 26, although the risk disclosure obligations are an important and distinguishing feature of the present ELO system. Before the ELO host/sponsor can proceed with the remainder of the RTIP form, the ELO host/sponsor must acknowledge and agree to the criteria in the statement 2610 at 2620.

The partial RTIP submission 2600 also includes a number of other functional sections, some of which relate to risk assessment and management. For example, the partial RTIP submission 2600 includes a risk review section or window 2630 that includes a parent status field 2632 similar or identical to the parent status fields in other pages (e.g., 2414 in FIG. 24), an approval status field 2634 similar or identical to the approval status fields in other pages (e.g., 2415 in FIG. 24), and a text box 2636 for the ELO administrator's notes on risk analysis and management for the ELO host/sponsor. The parent status field is automatically set based on criteria met or determined when the ELO host/sponsor completes the form 2632, and the ELO administrator sets the approval status field 2634 for the RTIP form in the risk review section or window 2630. The ELO administrator may record their notes in the text box 2636 as part of the risk review and contract formation process for submission and/or recordation in the ELO database. Alternatively, the text box 2636 may auto-fill or pre-populate with any notes previously added by the ELO administrator(s). In some embodiments, the ELO administrator may save updated notes by editing existing notes and/or entering new notes in the text box 2636 and selecting the "Update" button or icon 2638. In other or further embodiments, the risk review section or window 2630 may be accessible by or viewable to the ELO host/sponsor later in the contract formation process (e.g., after selecting or clicking on the "Submit" button 2144 in FIG. 21 or FIG. 22, executing the contract at 2375 in FIG. 23C, or requesting changes to the contract at 2362 in FIG. 23C), if at all.

Referring back to FIG. 26, the partial RTIP submission 2600 also includes an ELO site risk assessment audit section 2640, which lists the various supplemental ELO site risk assessment forms to be completed by various personnel at the university. For example, the supplemental ELO site risk assessment forms may include an ELO staff site assessment form 2642, an academic program director site assessment form 2644, and a risk manager site assessment form 2646. In the embodiment shown in FIG. 26, when a supplemental ELO site risk assessment form is completed, the completion status is indicated (e.g., by a color change, such as from red to green, or by the appearance of a "completed" indicator, such as an "X" mark or a check mark next to the form name). When one or more of the supplemental ELO site risk assessment forms are waived (e.g., it is determined at 2324 and/or 2332 in FIG. 23A that a risk review/assessment by the academic program director and/or the risk manager is not necessary), it is similarly indicated aby being complete in the ELO site risk assessment audit section 2640.

The partial RTIP submission 2600 also includes a content creation section 2650 that enable an ELO administrator to create content (e.g., to pre-populate) in other forms by selecting a function button in the section 2650. For example, content about the ELO site can be created (e.g., pre-populated or auto-filled in other forms in the ELO system) by selecting or clicking on a "Create Site" button or icon 2652. Content about the ELO itself can be created by selecting or clicking on a "Create Opportunity" (or "Create ELO") button or icon 2654. Content about the ELO supervisor(s) can be created by selecting or clicking on an optional "Create Site Staff" button or icon 2656. Additional content, such as for the university and/or campus, ELO administrative staff, university and/or campus administration, academic program, etc., can be similarly created. Further, existing ELO content may be updated (e.g. pre-populated or auto-filled in content edit forms in the ELO system) by clicking on an optional "Update Content" button.

The content creation section 2650 is accessible to and viewable by ELO administrators. The content creation section 2650 advantageously eliminates or reduces errors in form and contract completion by avoiding any need to manually fill in text and number fields, or cut-and-paste text and numbers into such fields, as well as eliminating possible errors of omission (e.g., overlooking entering data in one or more fields in one or more forms).

The partial RTIP submission 2600 also includes an ELO host/sponsor ("Organization") information section 2660. The ELO host/sponsor information section 2660 is incomplete, but the portion thereof shown in FIG. 26 shows an acceptable format and some of the types of information that is collected from the ELO host/sponsor in this section. For example, the ELO host/sponsor provides their name, a description of their mission and purpose, their physical and mailing addresses, their organization type (e.g., corporation, non-profit, government agency, etc.), a general telephone number and email, The ELO supervisor's name and contact information (e.g., phone number, email address, and if different, physical address), and some background information on themselves (e.g., hours of operation, demographics of clients/customers, etc.).

Figure 27:
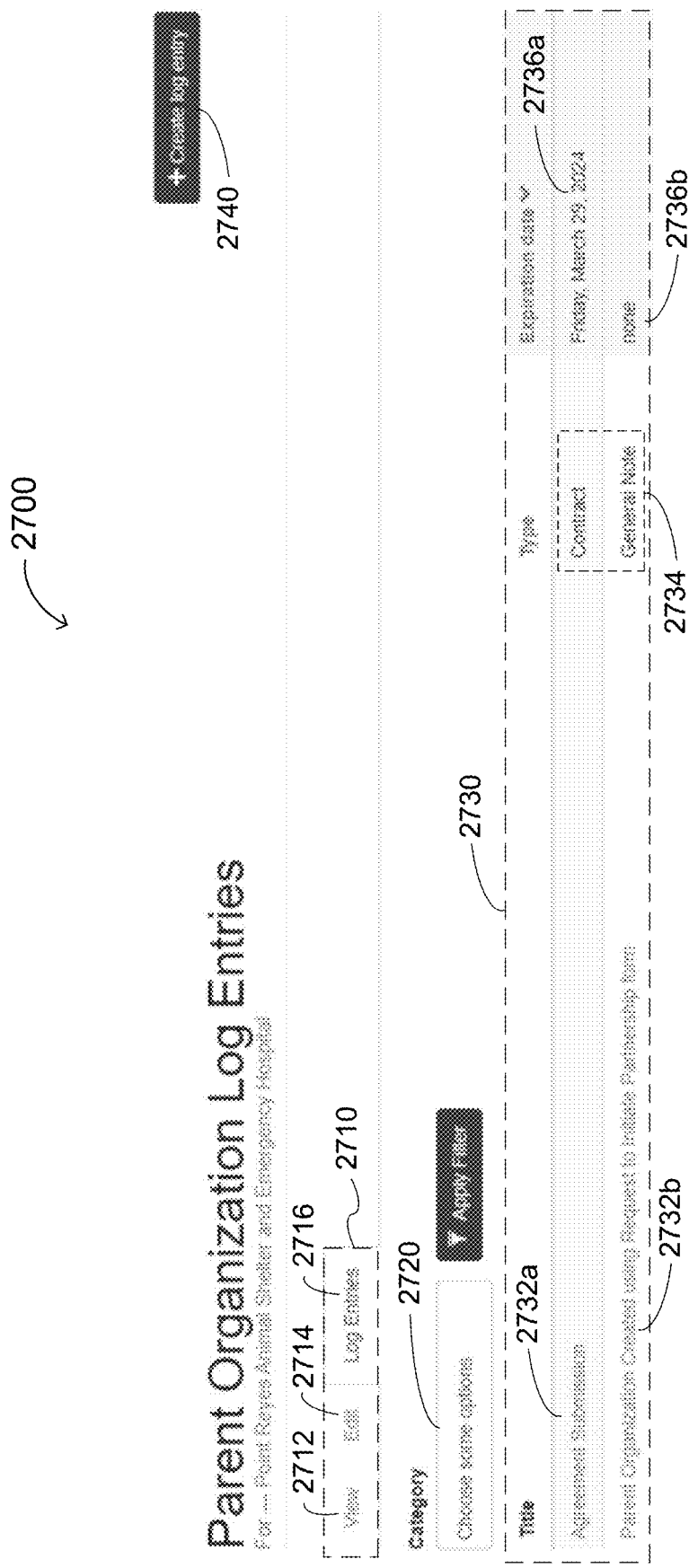

FIG. 27 is a graphic illustration of a parent organization information page 2700 from the CalState S4 ELO system. The parent organization information page 2700 may be accessed by an ELO administrator by selecting or clicking on "view" or "edit" in the operations block 2423 for "Point Reyes Animal Shelter and Emergency Hospital." In this case, "Point Reyes Animal Shelter and Emergency Hospital" may be a parent organization for "Point Reyes Animal Shelter." The parent organization information page 2700 includes a tab section 2710, which contains a first tab 2712 for a page on which the information in the ELO database for the parent organization can be viewed, a second tab 2714 for a page on which the information in the ELO database for the parent organization can be edited, and a third tab 2716 for a page on which a log of entries in the ELO database for the parent organization can be viewed. The page 2700 is the page for the entry log for a parent organization in the ELO database, "Point Reyes Animal Shelter and Emergency Hospital." The page 2700 also includes a category selection section or filter 2720, a list of forms or contracts 2730 specifically associated with the identified parent organization, and a button or icon 2740 for creating a new log entry for the named parent organization.

Completed and/or submitted forms that are directly connected to the parent organization (or, when the ELO host/sponsor is not the parent organization, to an ELO host/sponsor, information for which is on a different page) are automatically saved in the ELO database as a log entry in the list of forms or contracts 2730 with a link 2732a-b that navigates back to the form or contract. Optionally, the list of forms or contracts 2730 includes form/contract type information 2734 and a corresponding expiration date 2736a-b. An expiration date 2736a-b is automatically assigned to each contract, based on the settings for the relevant form(s) and the date that the contract was submitted.

In general, access to and retention of documents in the ELO system and database is designed to comply with university and (when applicable) campus policies. When the university and (applicable) campus policies are implemented automatically in the ELO system and database, both the ELO administration and the university/campus administration benefits from a reduced workload relating to policy compliance and enforcement efforts. Information and documents may still be entered manually into the present ELO system and database, but compliance with university and (applicable) campus policies may need to be confirmed.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for administering and managing experiential learning opportunities (ELOs) for a university or campus, comprising:
   a) at least one database server storing a relational database containing ELO placement data and records, wherein the at least one database server further comprises an interface configured to communicate or exchange data with a university computer having a student information database thereon, and the ELO placement data and records comprise student names, academic term(s), student course enrollment, student contact information, student accommodations, university name, university or campus location(s), course names or identifier numbers, course faculty, faculty contact information, names of ELO hosts or sponsors, ELO site locations, ELO placement proposals including identification of risks at corresponding one(s) of the ELO site locations and coverage for such risks, ELO participation agreements between (i) the university or campus and (ii) the ELO hosts or sponsors, at least one agreement form or template for the ELO participation agreements, background information for each of the ELO hosts or sponsors, ELO host or sponsor contact information, program types, safety information, risk analysis notes, student liability waivers, and student timelog data,
   b) at least one website server, configured to host an ELO website through which users interact with the relational database, wherein the users comprise student users, faculty users, one or more ELO administrators, university or campus administrators, and the ELO hosts or sponsors, and
   c) a memory in the at least one website server, storing a content management system (CMS) that comprises a plurality of modules and a data pool stored in or on storage nodes on the at least one website server, wherein the data pool includes at least a subset of the ELO placement data, and the plurality of modules comprise:
      a forms module accessible by (i) the student users to input the student names, the student contact information, and the student accommodations, and to sign and submit student placement requests and liability waivers, (ii) the one or more ELO administrators to input the risk analysis notes and other risk assessment information, and (iii) the ELO hosts or sponsors to provide and edit their background information, their name and contact information, the ELO site locations, and to complete and submit the ELO placement proposals and the ELO participation agreements, and
      a timelog module accessible by the student users, the ELO hosts or sponsors, and the faculty users to collect and store timelog data and to manage a timelog approval process.

2. The system of claim 1, wherein each of said plurality of modules comprises a set of computer-readable instructions that provides functions of the corresponding module to the ELO website, and is turned on by installing the corresponding module in the CMS and turned off by uninstalling the corresponding module from the CMS.

3. The system of claim 1, wherein said plurality of modules further comprises one or more of a context module, a display suite module, an entity module, a features module, a feeds module, a relation module, a token module, a views module, and a webform module.

4. The system of claim 3, wherein:
   the context module displays content and/or blocks based on a user role, a selected one of the program types, and/or a location on the ELO website,
   the display suite module is configured for the one or more ELO administrators to customize one or more displays of fields, menus, and/or content on content pages of the ELO website, and/or customize a corresponding edit form of the content,
   the entity module is configured for the one or more ELO administrators to modify non-fieldable content to function as a node,
   the features module is configured to retain a configuration of the ELO website or a subset of pages of the ELO website,
   the feeds module is configured to import university and/or campus data from external sources,
   the relation module is configured to combine related entities into a single unique record,
   the token module is configured to insert specific data in the relational database into one or more predetermined fields using a corresponding site-wide variable,
   the views module is configured to generate lists, tables, and exportable reports to predetermined pages of the ELO website to allow an interacting one of the users to view captured and/or filtered data, and
   the webform module is configured to create customized or customizable online forms.

5. The system of claim 1, wherein the CMS further comprises:
   a blocks and menus layer, configured to provide output from each of the plurality of modules, place the output in predetermined locations or regions in the ELO website, provide links to all of the pages on the ELO website, and define (i) a plurality of paths for placement of the output in the ELO website and (ii) the content in the output available in each of the paths, a user permissions layer, configured to determine which of a plurality of different ones of the users have permission to access, enter data in, and/or edit each of pages of the ELO website and each of the fields in predetermined ones of the pages of the ELO website, and a site theme layer, comprising a computer code or computer language description of the pages of the ELO website, so that the content is placed in the corresponding predetermined locations or regions on the ELO website.

6. The system of claim 1, wherein the plurality of modules further comprises one or more of a data and document archiving module, a content creation module, a complex content creation module configured to permit access to one or more predetermined forms or fields therein based on one or more attributes of the users, a data importing module, a user notification module, a campus settings and permissions module, a safety module that includes one or more templates for safety information, and a risk module that generates a risk management report when an emergency or other safety event arises and/or that manages student safety risk, University liability risk, and ELO host or sponsor liability risk, and an emergency notification module accessible by the one or more ELO administrators and optionally the university or campus administrators and/or the ELO hosts or sponsors to monitor student location and time information and to provide emergency notifications to students in an emergency event.

7. The system of claim 1, wherein:
said ELO placement data further comprises student personal data, campus program, ELO host or sponsor site location, ELO site supervisor name, the campus academic term in which an ELO placement will be performed, signup form data, and end of placement form data,
said safety information comprises safety orientation information and/or data,
said timelog data comprises ELO work or service dates, ELO work or service times, ELO work or service hours, ELO work or service text descriptions, timelog submission status, and timelog approval data,
said faculty contact information comprises a faculty name and a faculty email address,
said student contact information comprises a student name and a student email address, and
the background information for each of the ELO hosts or sponsors comprises a telephone number, an email address, and a physical address for each of the ELO host or sponsors.

8. A computer-implemented method for administering and managing student experiential learning opportunities (ELOs) for a university or campus, comprising:
a) receiving ELO placement data into a relational database in a database server, the database server further comprising an interface configured to communicate or exchange data with a university computer having a student information database thereon, the ELO placement data comprising student names, academic term(s), student course enrollment, student contact information, student accommodations, university name, university or campus location(s), course names or identifier numbers, course faculty, faculty contact information, names of ELO hosts or sponsors, ELO site locations, background information for each of the ELO hosts or sponsors, ELO host or sponsor contact information, program types, safety information, and risk analysis notes;

b) providing a plurality of fillable forms from a plurality of modules in a content management system (CMS) on a website server to a plurality of users, the website server being configured to host an ELO website through which the plurality of users interact with the relational database, wherein the plurality of users comprise student users, faculty users, one or more ELO administrators, university or campus administrators, and the ELO hosts or sponsors, and the plurality of fillable forms including ELO placement proposals including identification of risks at corresponding ones of the ELO site locations and ELO host/sponsor coverage for such risks, ELO participation agreements between (i) the university or campus and (ii) the ELO hosts or sponsors, at least one agreement form or template for the ELO participation agreements, student liability waivers, and fields configured to receive the ELO placement data and information identifying and assessing risks at corresponding one(s) of the ELO site locations and coverage for such risks;

c) storing in the relational database the plurality of fillable forms completed by one or more of the plurality of users, wherein the ELO placement data and the completed plurality of fillable forms in the relational database are searchable by permitted ones of the plurality of users; and d) providing a timelog from a first one of the plurality of modules to the student users, the ELO hosts or sponsors, and the faculty users to collect and store timelog data, and to manage a timelog approval process.

9. The method of claim 8, wherein providing the plurality of fillable forms comprises executing a set of computer-readable instructions in one or more of the plurality of modules, the computer-readable instructions being adapted to provide functions of the corresponding one or more modules to the ELO website, and the method further comprises installing the corresponding one or more modules in the CMS.

10. The method of claim 8, further comprising:
providing output from each of the plurality of modules, placing the output in predetermined locations or regions in the ELO website, providing links to all of the pages on the ELO website, and defining (i) a plurality of paths for placement of the output in the ELO website and (ii) the content in the output available in each of the paths,
granting or denying permission to different ones of the users to access, enter data in, and/or edit each of pages of the ELO website and each of the fields in predetermined ones of the pages of the ELO website, and
creating or providing a computer code or computer language description of the pages of the ELO website, so that the content is placed in the corresponding predetermined locations or regions on the ELO website.

11. The method of claim 8, wherein said plurality of modules comprises one or more of a context module, a display suite module, an entity module, a features module, a feeds module, a relation module, a token module, a views module, and a webform module.

12. The method of claim 11, further comprising one or more of:
displaying content and/or blocks based on a user role, a selected one of the program types, and/or a location on the ELO website, customizing one or more displays of fields, menus, and/or content on content pages of the ELO website, and/or customizing a corresponding edit form of the content, modifying non-fieldable content to function as a node, retaining a configuration of the ELO website or a subset of pages of the ELO website, importing university and/or campus data from external sources into the relational database, combining related entities into a single unique record, inserting specific data in the relational database into one or more predetermined fields using a corresponding site-wide variable, generating lists, tables, and exportable reports to predetermined pages of the ELO website to allow an interacting one of the users to view captured and/or filtered data, and creating customized or customizable online forms.

13. The method of claim 8, wherein:

the plurality of modules further comprises one or more of a data and document archiving module, a content creation module, a complex content creation module configured to permit access to one or more predetermined forms or fields therein based on one or more attributes of the users, a data importing module, a user notification module, a campus settings and permissions module, a safety module that includes one or more templates for safety information, a risk module that generate(s) risk management reports when an emergency or other safety event arises and/or that manages student safety risk, university liability risk, and ELO host or sponsor liability risk, and an emergency notification module accessible by the one or more ELO administrators and optionally the university or campus administrators and/or the ELO hosts or sponsors to monitor student location and time information and to provide emergency notifications to students in an emergency event; and when the method includes the emergency notification module, the method further comprises monitoring the student location and time information and providing emergency notices to students in the emergency event.

14. The method of claim 8, wherein:

said ELO placement data further comprises student personal data, campus program, ELO host or sponsor site location, ELO site supervisor name, the campus academic term in which an ELO placement will be performed, signup form data, and end of placement form data, said safety information comprises safety orientation information and/or data, said timelog data comprises ELO work or service dates, ELO work or service times, ELO work or service hours, ELO work or service text descriptions, timelog submission status, and timelog approval data, said faculty contact information comprises a faculty name and a faculty email address, said student contact information comprises a student name and a student email address, and the background information for each of the ELO hosts or sponsors comprises a telephone number, an email address, and a physical address for each of the ELO host or sponsors.

15. A non-transitory computer-readable medium, comprising a set of instructions encoded thereon and adapted to administer and manage student experiential learning opportunities (ELOs) for a university or campus, the set of instructions which, when executed by a processing device, is configured to:

a) receive ELO placement data through a secure website on a website server that includes a content management system (CMS) with a plurality of modules therein into a relational database in a database computer, the database computer further comprising an interface configured to communicate or exchange data with a university computer having a student information database thereon, the ELO placement data comprising student names, student program, academic term(s), student course enrollment, student contact information, student accommodations, university name, university or campus location(s), course names or identifier numbers, course faculty, faculty contact information, names of ELO hosts or sponsors, ELO site locations, background information for each of the ELO hosts or sponsors, ELO host or sponsor contact information, program types, safety information, and risk analysis notes;

b) provide a plurality of fillable forms from a plurality of modules in a content management system (CMS) on the website server to a plurality of users, the website server being configured to host an ELO website through which the plurality of users interact with the relational database, wherein the plurality of users comprise student users, faculty users, one or more ELO administrators, university or campus administrators, and the ELO hosts or sponsors, and the plurality of fillable forms including ELO placement proposals, ELO participation agreements between (i) the university or campus and (ii) the ELO hosts or sponsors, at least one agreement form or template for the ELO participation agreements, student liability waivers, and fields configured to receive the ELO placement data and information identifying risks at corresponding one (s) of the ELO site locations and coverage for such risks;

c) store in the relational database the plurality of fillable forms completed by one or more of the plurality of users;

d) permit predetermined ones of the plurality of users to search the ELO placement data and the completed plurality of fillable forms in the relational database; and e) provide a timelog from a first one of the plurality of modules to the student users, the ELO hosts or sponsors, and the faculty users to collect and store timelog data, and to manage a timelog approval process.

16. The non-transitory computer-readable medium of claim 15, wherein said plurality of modules comprises one or more of a context module, a display suite module, an entity module, a features module, a feeds module, a relation module, a token module, a views module, and a webform module.

17. The non-transitory computer-readable medium of claim 16, wherein:

the context module displays content and/or blocks based on a user role, a selected one of the program types, and/or a location on the ELO website, the display suite module is configured for the one or more ELO administrators to customize one or more displays of fields, menus, and/or content on content pages of the ELO website, and/or customize a corresponding edit form of the content, the entity module is configured for the one or more ELO administrators to modify non-fieldable content to function as a node, the features module is configured to retain a configuration of the ELO website or a subset of pages of the ELO website, the feeds module is configured to import university and/or campus data from external sources, the relation module is configured to combine related entities into a single unique record, the token module is configured to insert specific data in the relational database into one or more predetermined fields using a corresponding site-wide variable, the views module is configured to generate lists, tables, and exportable reports to predetermined pages of the ELO web site to allow an interacting one of the users to view captured and/or filtered data, and the webform module is configured to create customized or customizable online forms.

18. The non-transitory computer-readable medium of claim 15, wherein the set of instructions is further adapted to:

provide output from each of the plurality of modules, place the output in predetermined locations or regions in the ELO website, provide links to all of the pages on the ELO web site, and define (i) a plurality of paths for placement of the output in the ELO website and (ii) the content in the output available in each of the paths, grant or deny permission to different ones of the users to access, enter data in, and/or edit each of pages of the ELO website and each of the fields in predetermined ones of the pages of the ELO website, and create or provide a computer code or computer language description of the pages of the ELO website, so that the content is placed in the corresponding predetermined locations or regions on the ELO website.

19. The non-transitory computer-readable medium of claim 15, wherein:

the plurality of modules further comprises one or more of a data and document archiving module, a content creation module, a complex content creation module configured to permit access to one or more predetermined forms or fields therein based on one or more attributes of the users, a data importing module, a user notification module, a campus settings and permissions module, a safety module that includes one or more templates for safety information, a risk module that generates a risk management report when an emergency or other safety event arises and/or that manages student safety risk, university liability risk, and ELO host or sponsor liability risk, and an emergency module accessible by the one or more ELO administrators and optionally the university or campus administrators and/or the ELO hosts or sponsors to monitor student location and time information and to provide emergency notices to students in an emergency event, and when the modules include the emergency notification module, the set of instructions is further adapted to monitor the student location and time information and provide emergency notices to students in the emergency event, based on the student location and time information in the relational database.

20. The non-transitory computer-readable medium of claim 15, wherein:

said ELO placement data further comprises student personal data, campus program, ELO host or sponsor site location, ELO site supervisor name, the academic term in which an ELO placement will be performed, signup form data, and end of placement form data, said safety information comprises safety orientation information and/or data, said timelog data comprises ELO work or service dates, ELO work or service times, ELO work or service hours, ELO work or service text descriptions, timelog submission status, and timelog approval data, said faculty contact information comprises a faculty name and a faculty email address, said student contact information comprises a student name and a student email address, and the background information for each of the ELO hosts or sponsors comprises a telephone number, an email address, and a physical address for each of the ELO host or sponsors.

* * * * *